(12) United States Patent
Machida

(10) Patent No.: US 11,598,940 B2
(45) Date of Patent: Mar. 7, 2023

(54) VARIABLE MAGNIFICATION OPTICAL SYSTEM, OPTICAL APPARATUS, AND METHOD FOR PRODUCING VARIABLE MAGNIFICATION OPTICAL SYSTEM

(71) Applicant: Nikon Corporation, Tokyo (JP)

(72) Inventor: Kosuke Machida, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/764,869

(22) PCT Filed: Nov. 20, 2017

(86) PCT No.: PCT/JP2017/041636
§ 371 (c)(1),
(2) Date: May 17, 2020

(87) PCT Pub. No.: WO2019/097716
PCT Pub. Date: May 23, 2019

(65) Prior Publication Data
US 2020/0341246 A1     Oct. 29, 2020

(51) Int. Cl.
*G02B 15/14*     (2006.01)
*G02B 13/02*     (2006.01)
(Continued)

(52) U.S. Cl.
CPC ........... *G02B 15/146* (2019.08); *G02B 13/02* (2013.01); *G02B 13/06* (2013.01); *G02B 13/18* (2013.01); *G02B 15/20* (2013.01)

(58) Field of Classification Search
CPC ...... G02B 15/146; G02B 13/02; G02B 13/06; G02B 13/18; G02B 15/20; G02B 15/24
See application file for complete search history.

(56) References Cited

U.S. PATENT DOCUMENTS

| 2004/0125462 A1 | 7/2004 | Misaka |
| 2012/0105683 A1 | 5/2012 | Yoshinaga et al. |

(Continued)

FOREIGN PATENT DOCUMENTS

| JP | 2000-047107 A | 2/2000 |
| JP | 2004-198529 A | 7/2004 |

(Continued)

OTHER PUBLICATIONS

Office Action dated Dec. 15, 2020, in Japanese Patent Application No. 2019-553666.

(Continued)

*Primary Examiner* — Alicia M Harrington
(74) *Attorney, Agent, or Firm* — SGPatents PLLC

(57) ABSTRACT

A variable magnification optical system comprising, in order from an object side, a first lens group and a plurality of lens groups; upon varying a magnification, a distance between the first lens group and the plurality of lens groups being varied, and distances between respective lens groups in the plurality of lens groups being varied; the plurality of lens groups comprising an object side focusing lens group which is moved upon carrying out focusing and at least one image side focusing lens group disposed in a more image side than the object side focusing lens group and moved with a trajectory differing from that of the object side focusing lens group, upon carrying out the focusing; and
the predetermined conditional expressions being satisfied, whereby variations in aberrations upon varying magnification from the wide angle end state to the telephoto end state as well as variations in aberrations upon carrying out focusing from an infinite distance object to a close distance object can be suppressed superbly.

8 Claims, 35 Drawing Sheets

(51) Int. Cl.
  *G02B 15/20* (2006.01)
  *G02B 13/06* (2006.01)
  *G02B 13/18* (2006.01)

(56) References Cited

U.S. PATENT DOCUMENTS

| | | |
|---|---|---|
| 2014/0139722 A1 | 5/2014 | Sugita |
| 2015/0146044 A1 | 5/2015 | Sugita |
| 2016/0209632 A1 | 7/2016 | Imaoka |
| 2017/0038566 A1* | 2/2017 | Shibayama ............ G02B 13/18 |
| 2017/0192212 A1 | 7/2017 | Yamamoto |
| 2017/0322399 A1* | 11/2017 | Sugita .................. G02B 15/163 |

FOREIGN PATENT DOCUMENTS

| | | |
|---|---|---|
| JP | 2011-180218 A | 9/2011 |
| JP | 2012-083726 A | 4/2012 |
| JP | 2014-021257 A | 2/2014 |
| JP | 2014-089385 A | 5/2014 |
| JP | 2014-102462 A | 6/2014 |
| JP | 2014-186098 A | 10/2014 |
| JP | 2015-102619 A | 6/2015 |
| JP | 2015-118141 A | 6/2015 |
| JP | 2015-197655 A | 11/2015 |
| JP | 2015-215438 A | 12/2015 |
| JP | 2016-139125 A | 8/2016 |
| JP | 2016-200772 A | 12/2016 |
| JP | 2017-129668 A | 7/2017 |
| WO | WO 2016/017727 A1 | 2/2016 |

OTHER PUBLICATIONS

International Search Report from International Patent Application No. PCT/JP2017/041636, dated Feb. 13, 2018.
Decision of Refusal dated Jun. 15, 2021, in Japanese Patent Application No. 2019-553666.
Office Action dated Jul. 13, 2021, in Chinese Patent Application No. 201780097019.4.
Office Action dated Apr. 5, 2022, in Japanese Patent Application No. 2021-117196.

* cited by examiner

Fig.2
Fig.2A
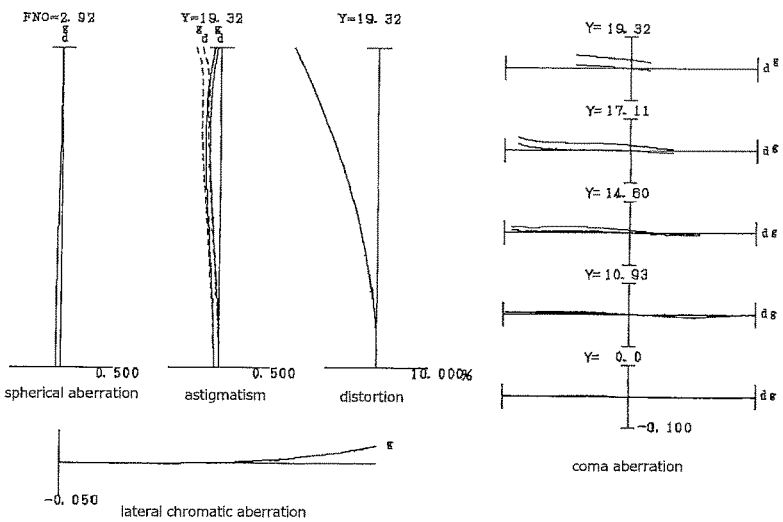
Fig.2B
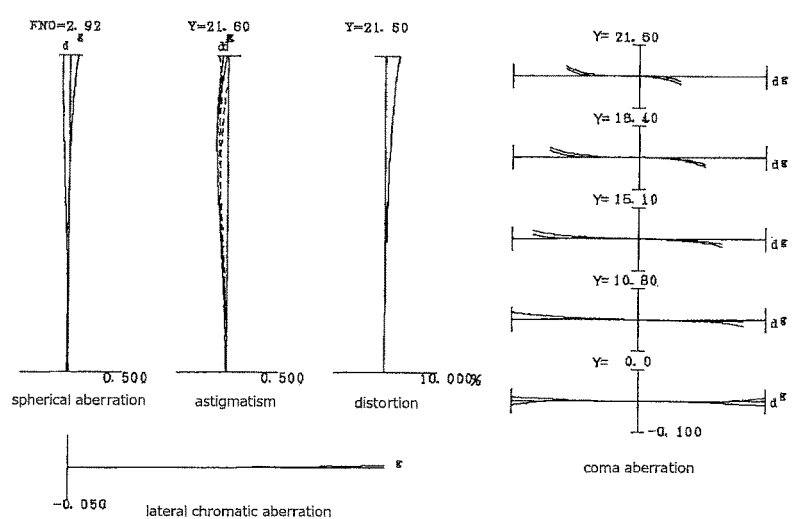
Fig.2C
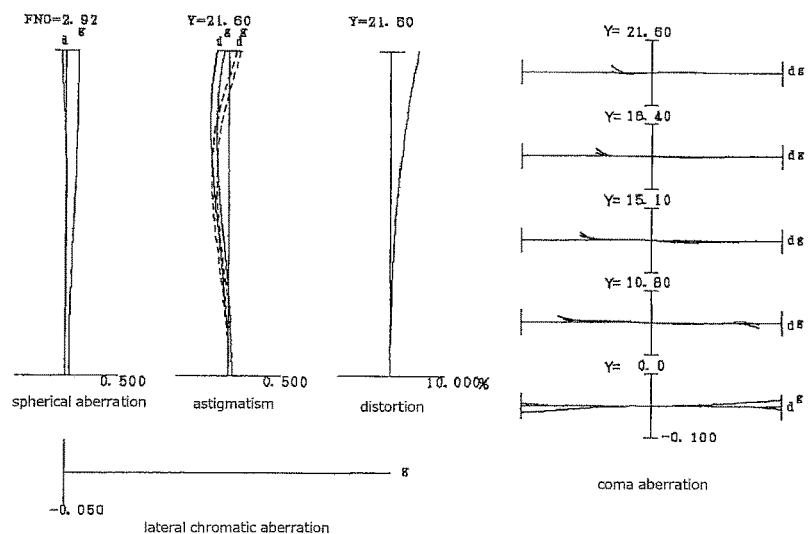

Fig.3
Fig.3A
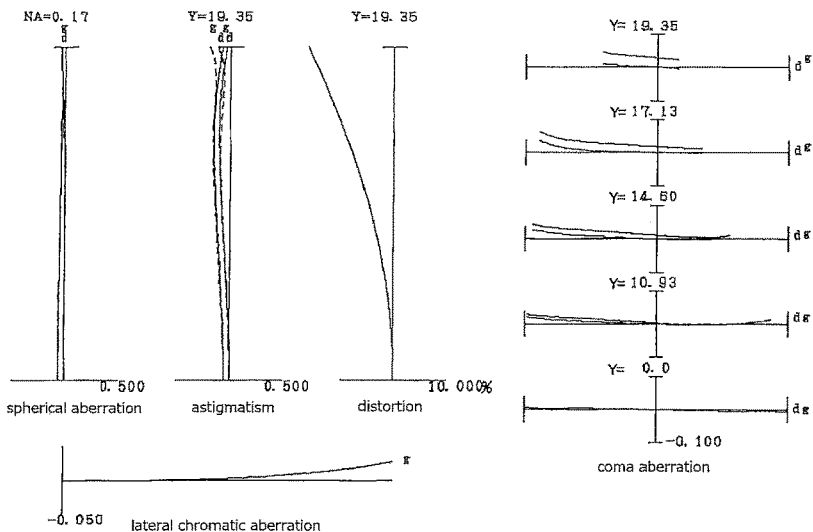
Fig.3B
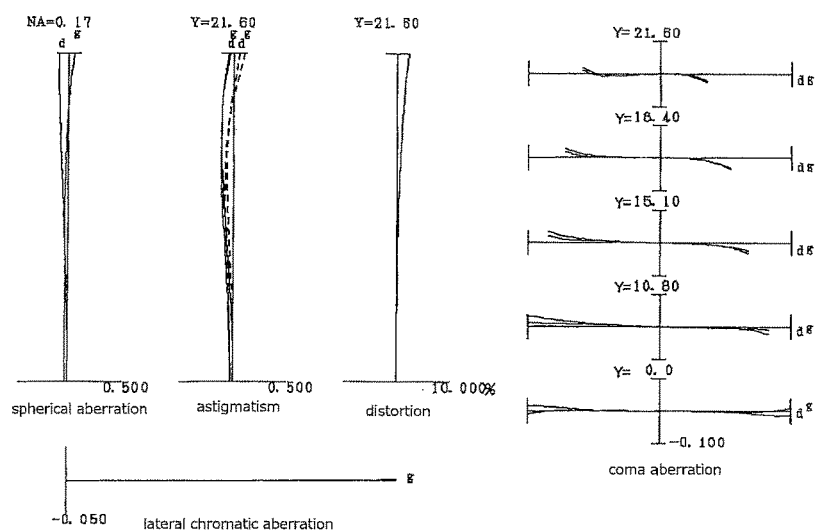
Fig.3C
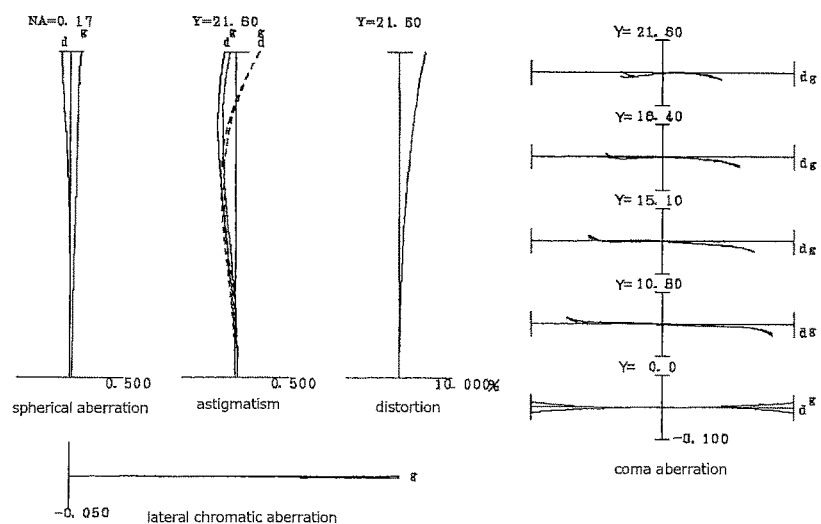

Fig.5
Fig.5A
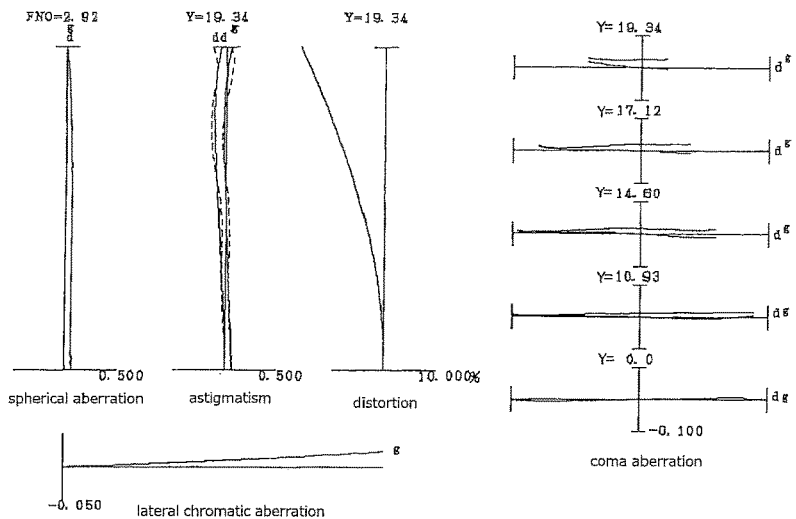
Fig.5B
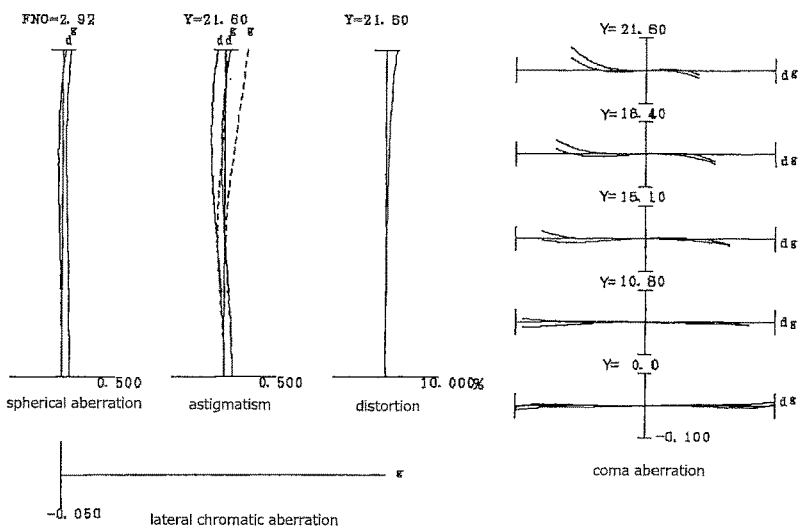
Fig.5C
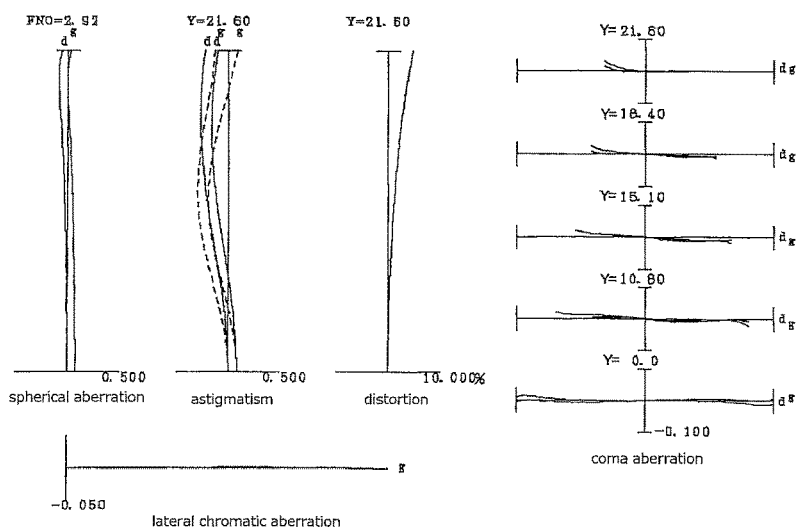

Fig.6
Fig.6A
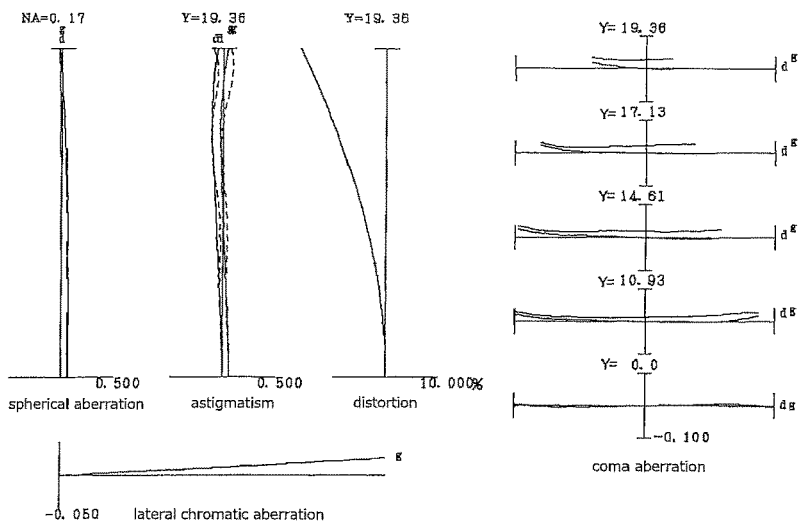
Fig.6B
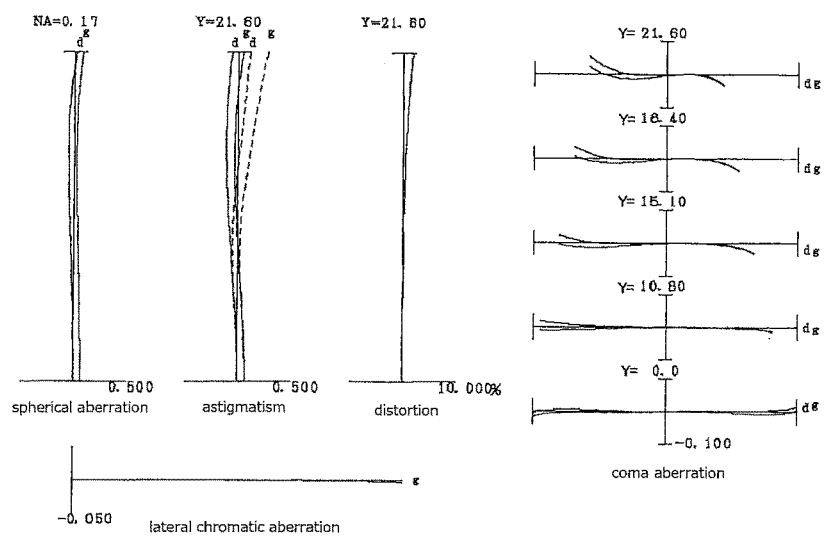
Fig.6C
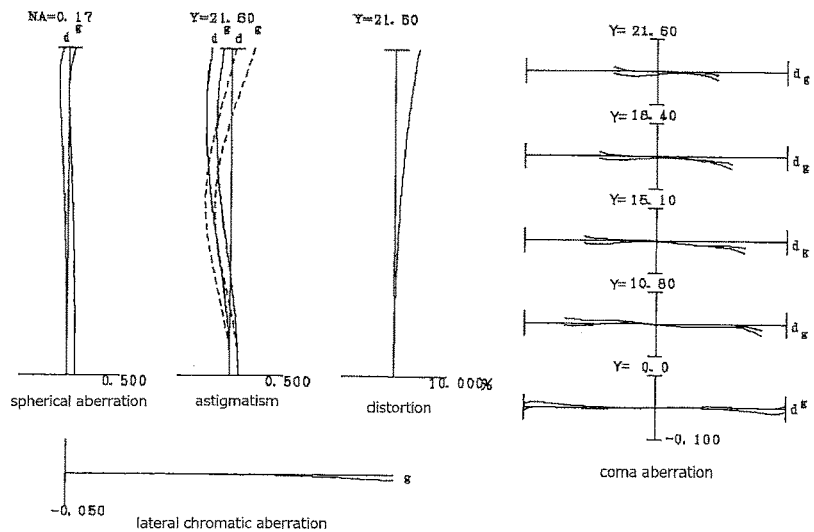

Fig.8
Fig.8A
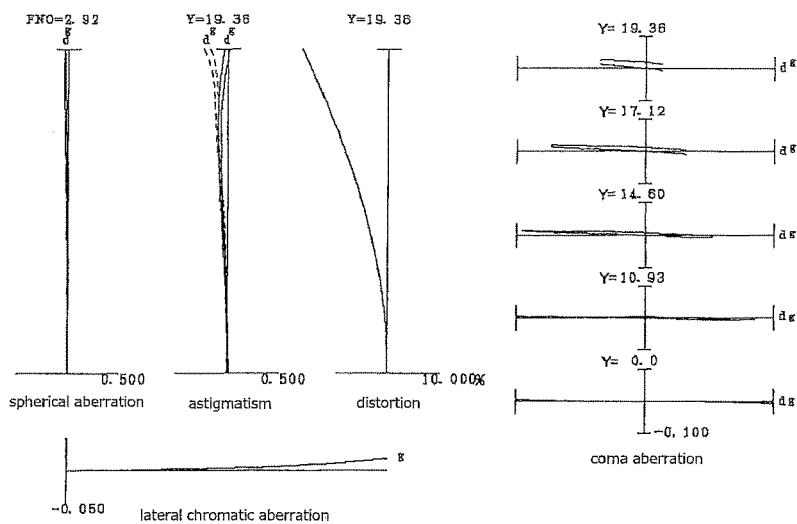
Fig.8B
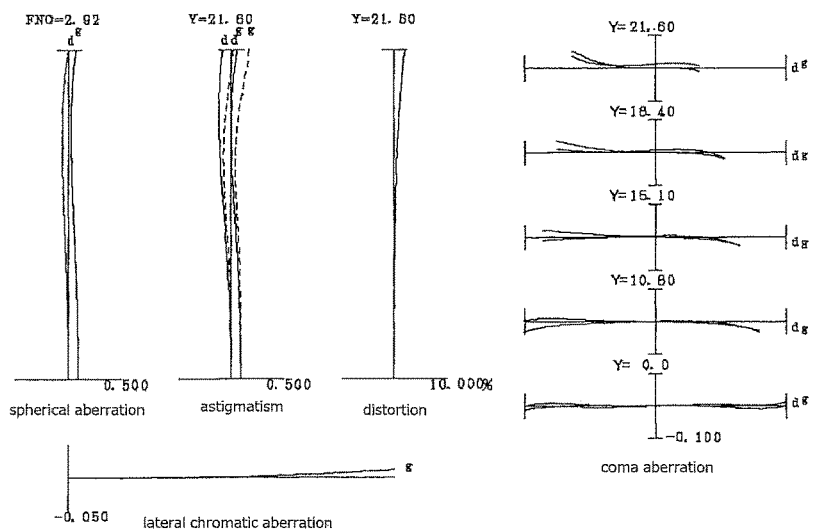
Fig.8C
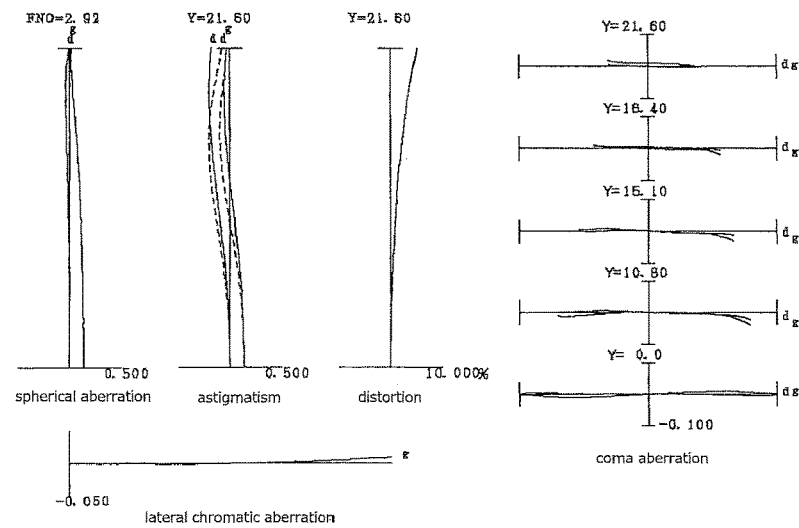

Fig.9
Fig.9A
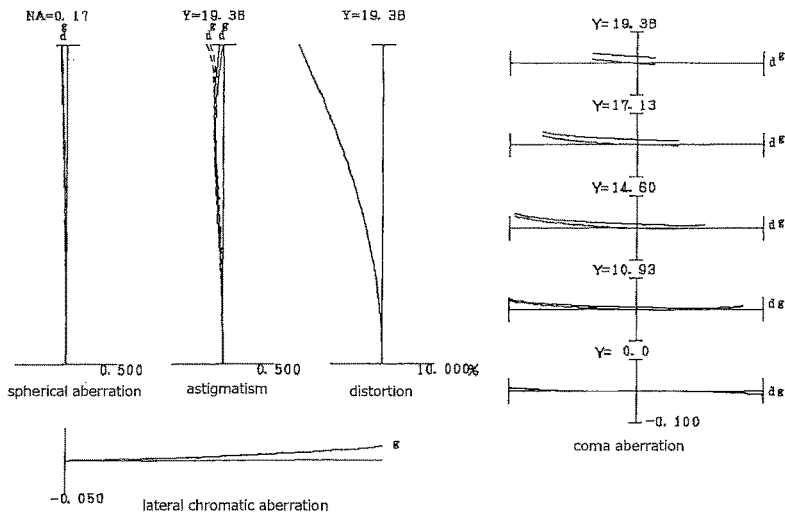
Fig.9B
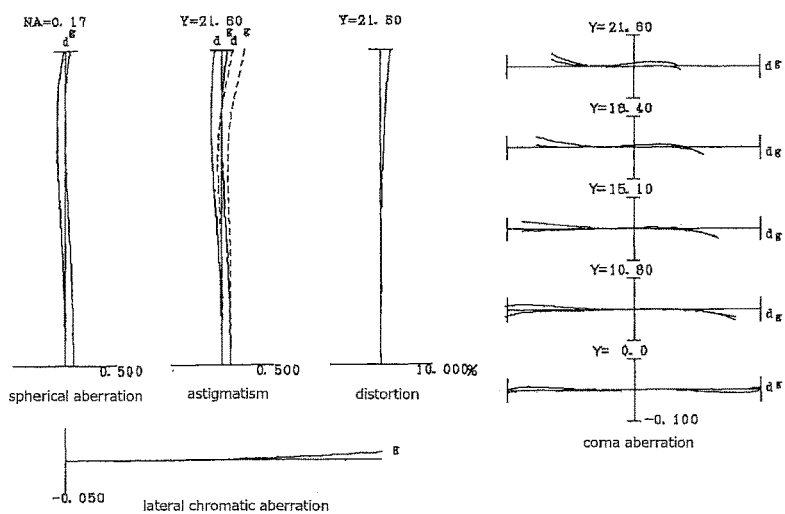
Fig.9C
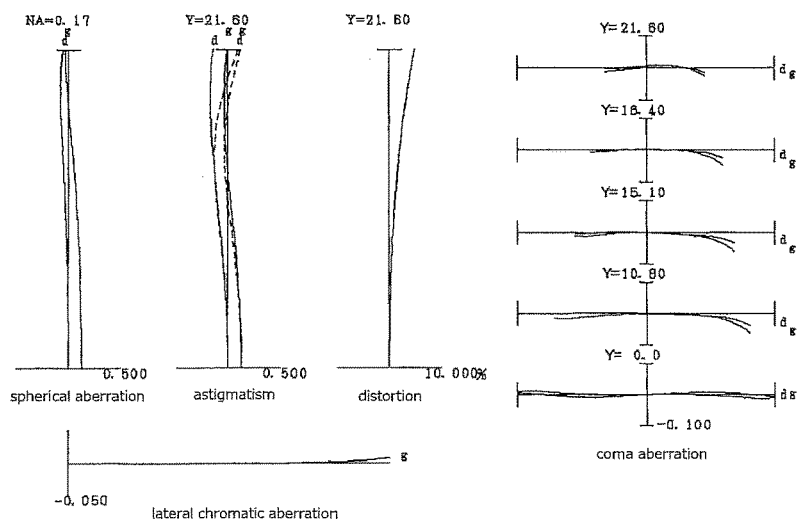

Fig.11
Fig.11A
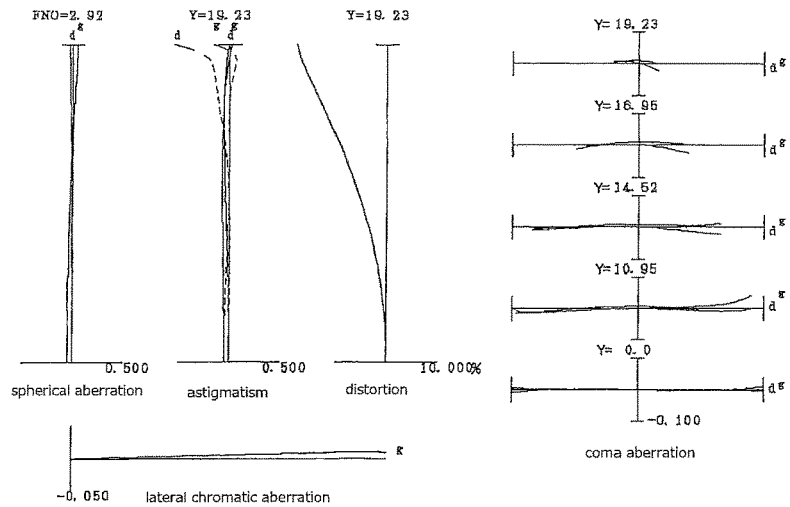
Fig.11B
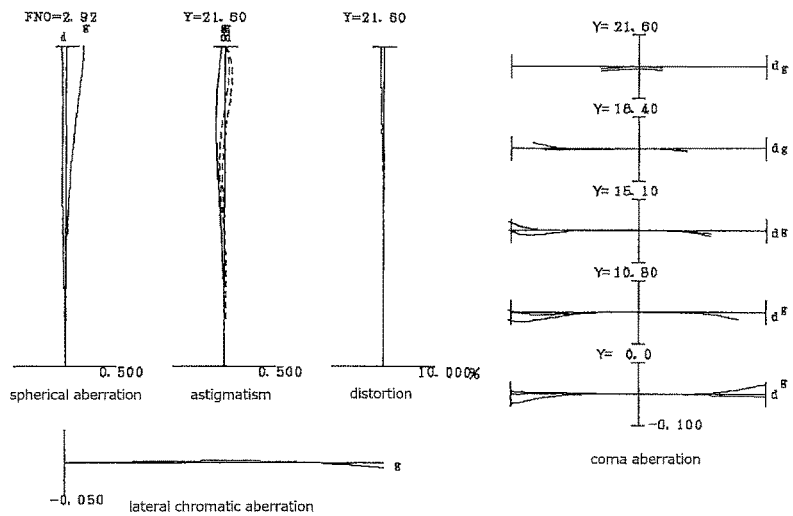
Fig.11C
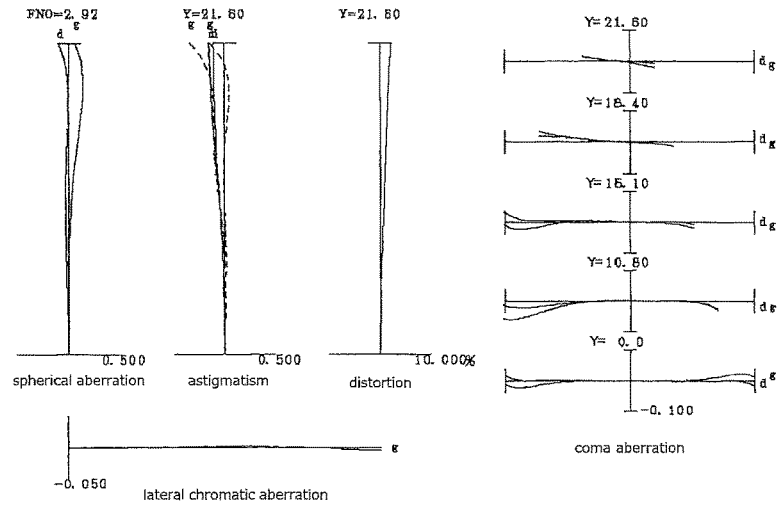

Fig.12
Fig.12A
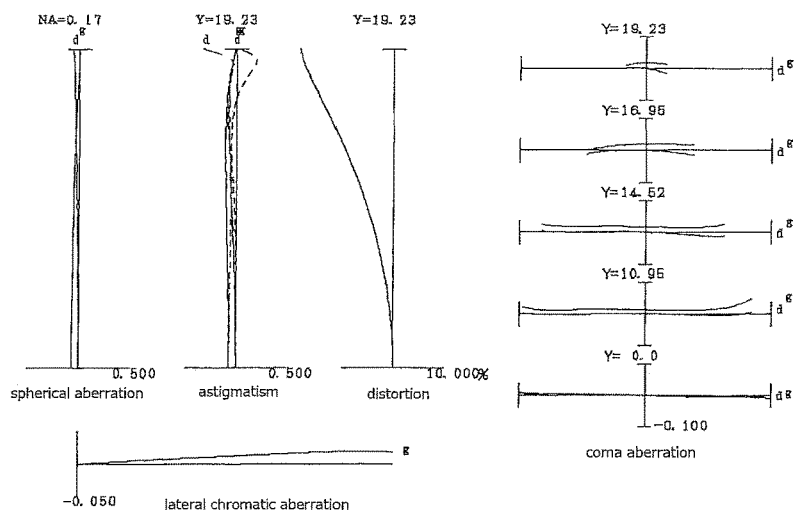
Fig.12B
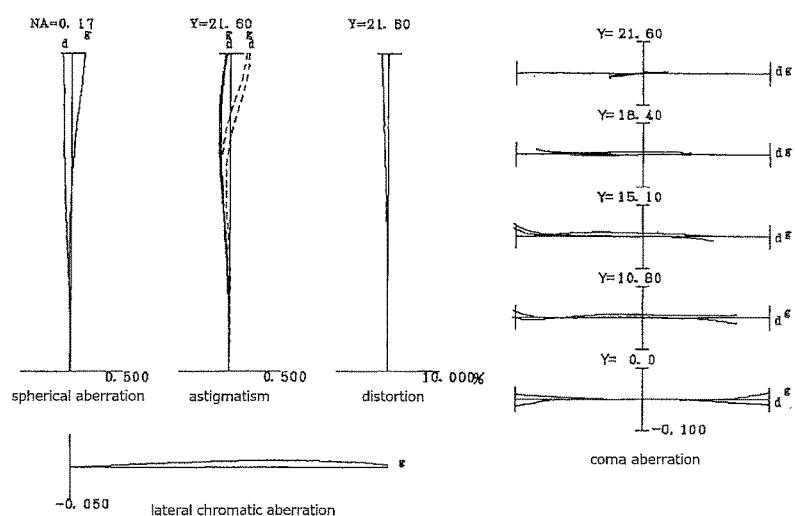
Fig.12C
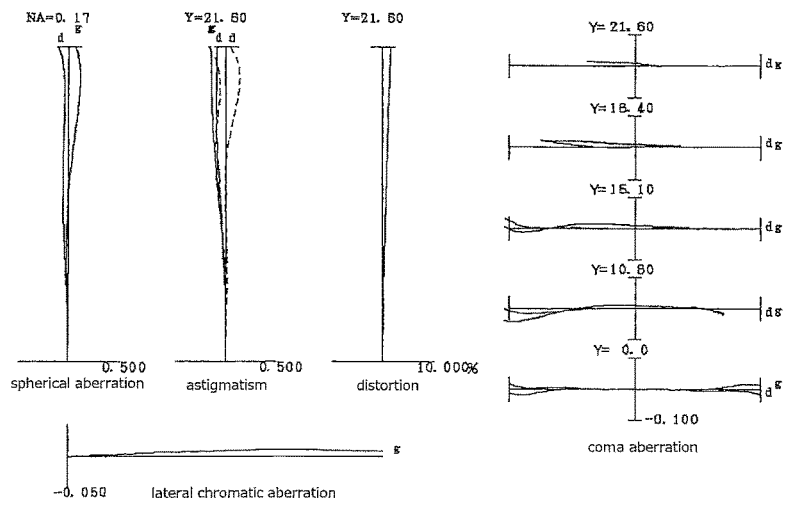

Fig.14
Fig.14A
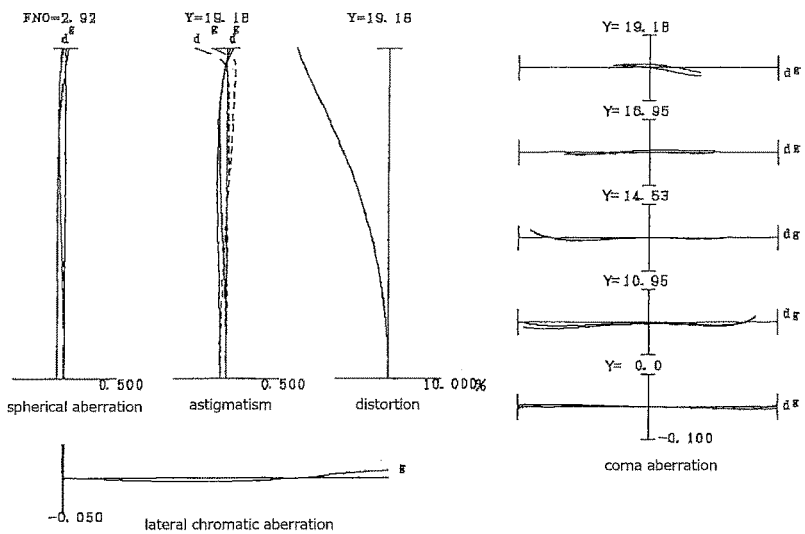
Fig.14B
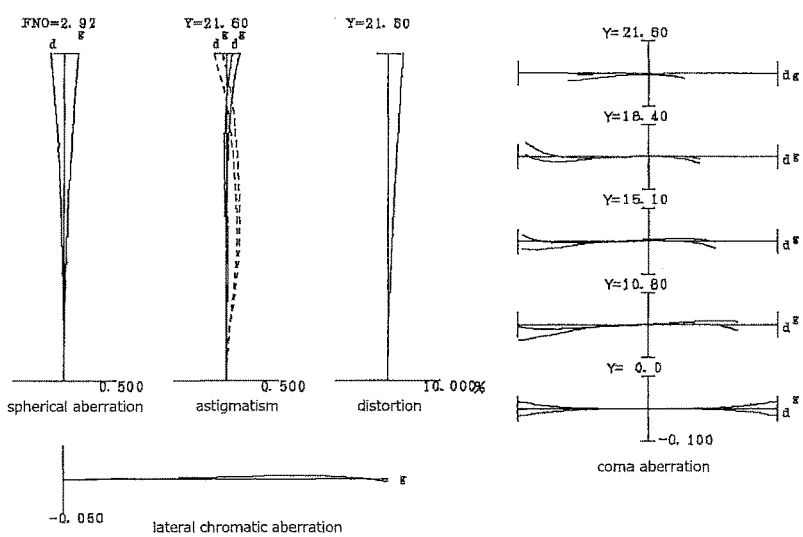
Fig.14C
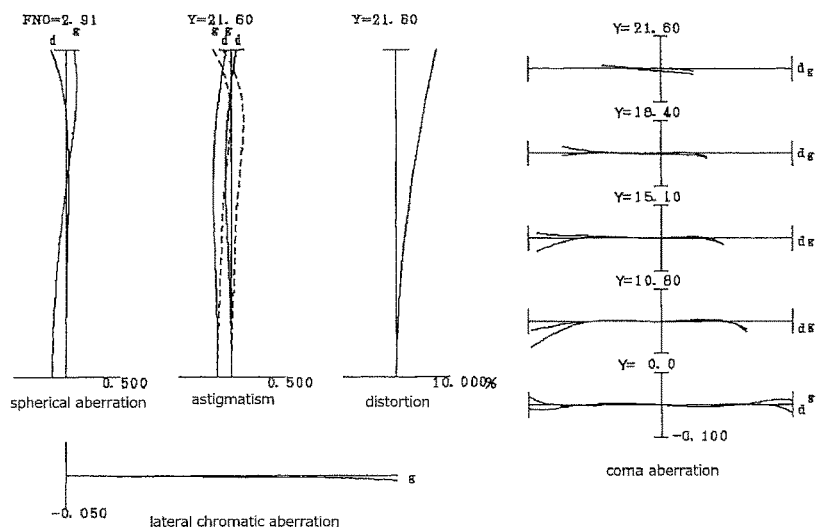

Fig.15
Fig.15A
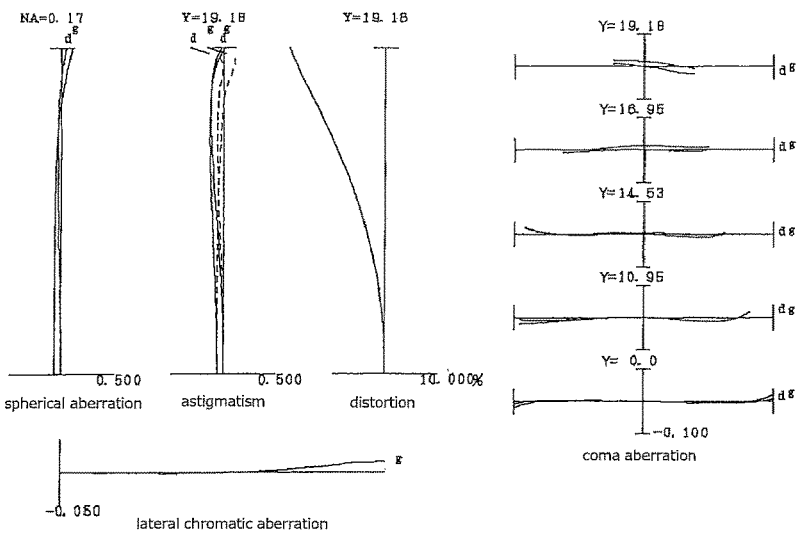
Fig.15B
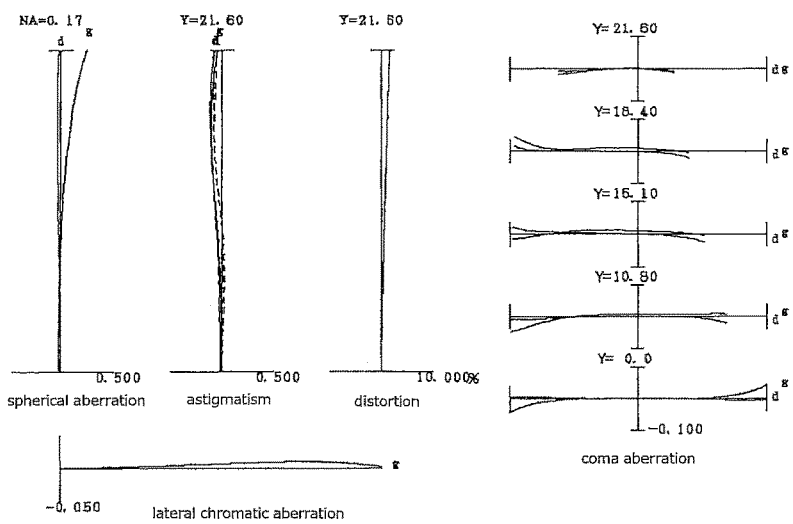
Fig.15C
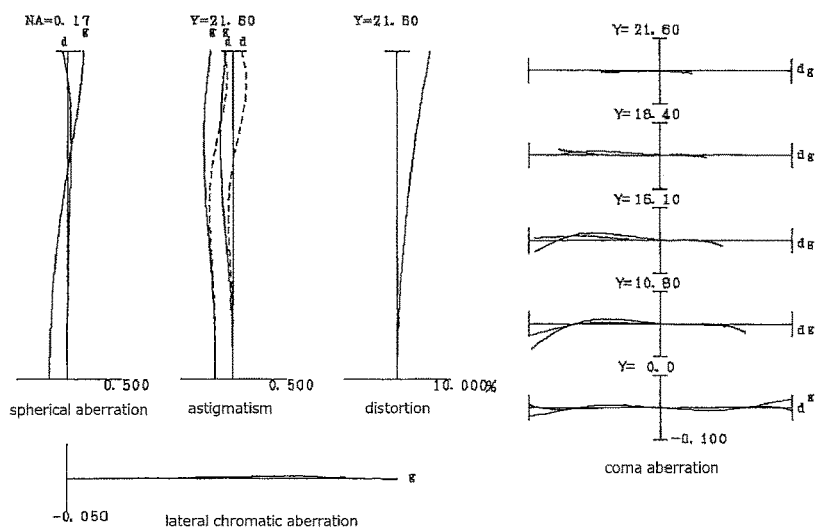

Fig.17
Fig.17A
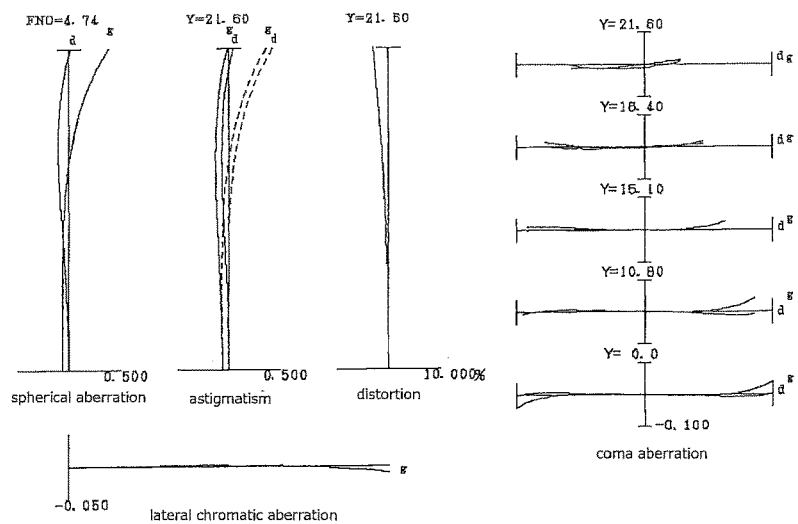
Fig.17B
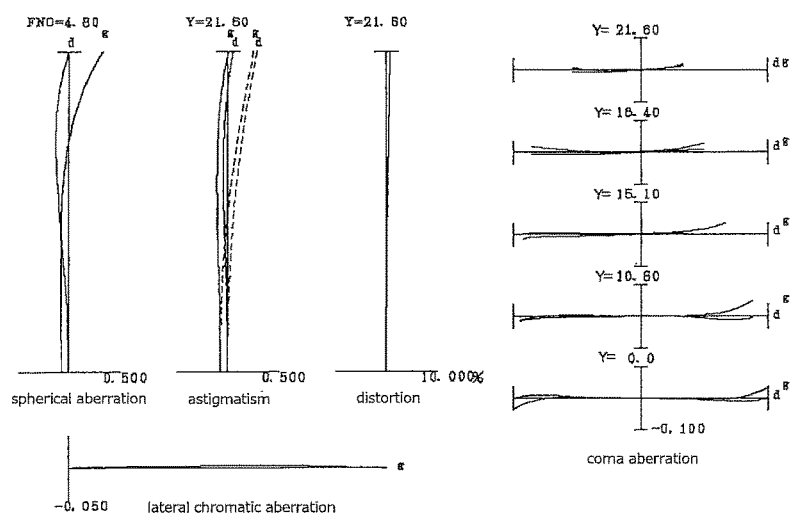
Fig.17C
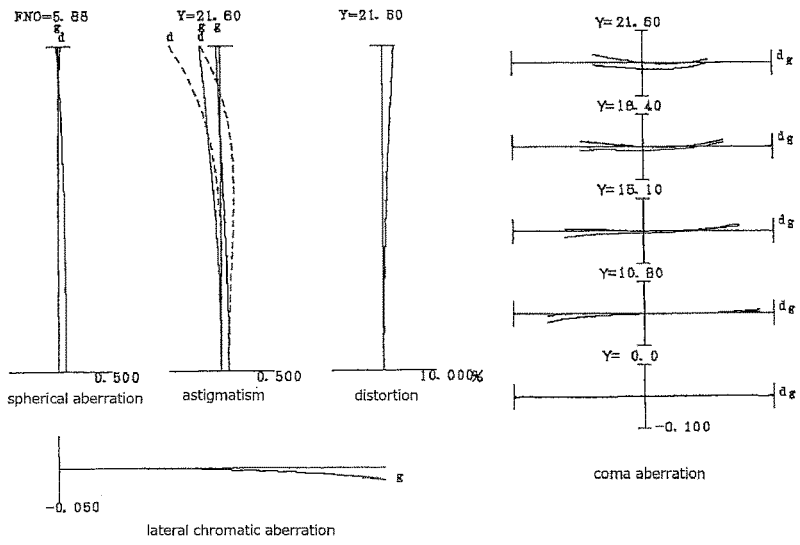

Fig.18
Fig.18A
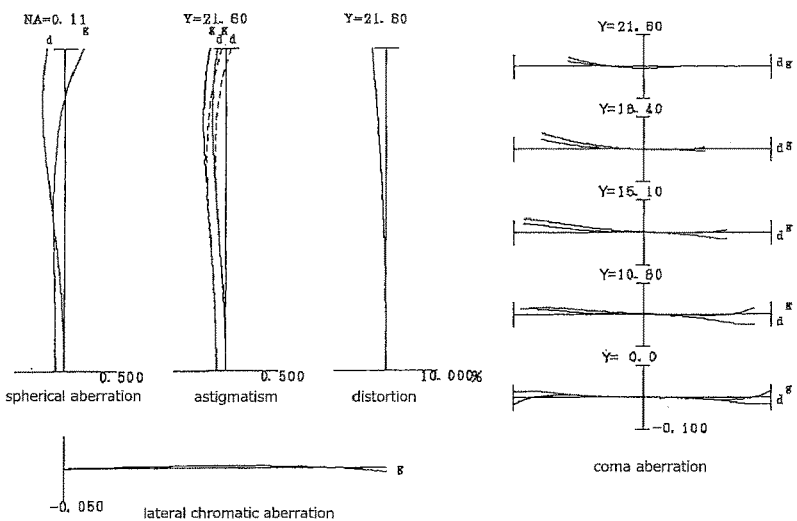
Fig.18B
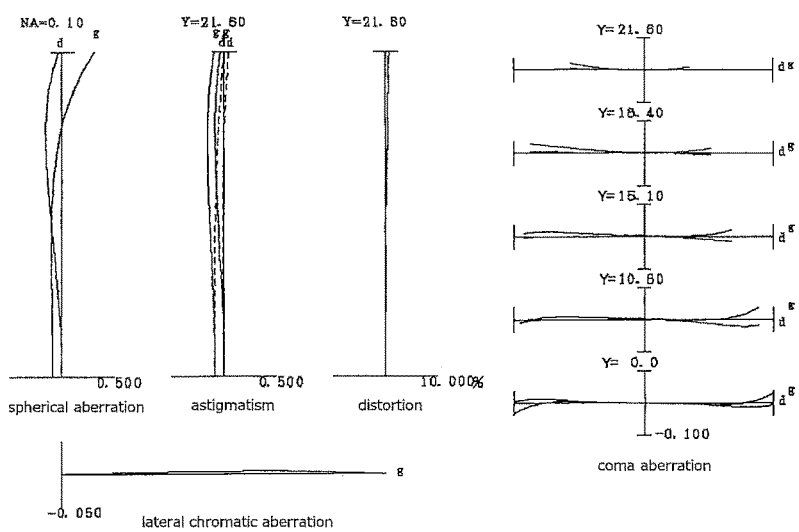
Fig.18C
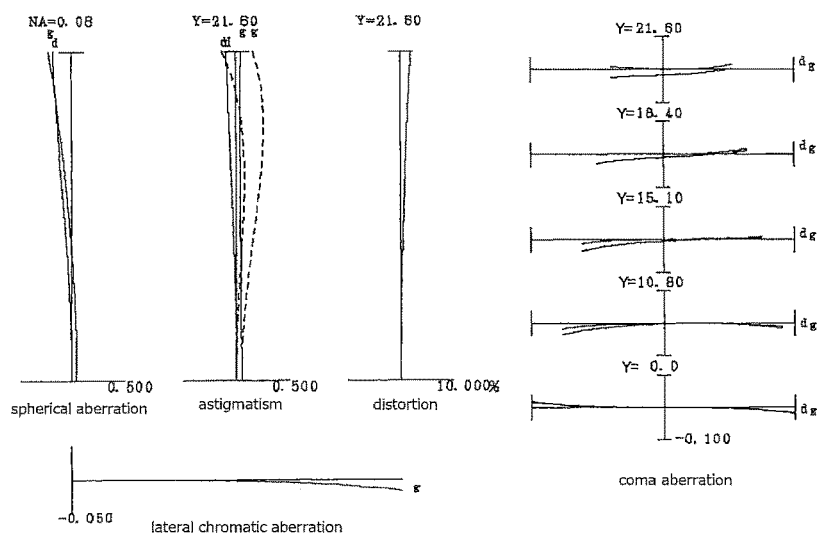

Fig.20
Fig.20A
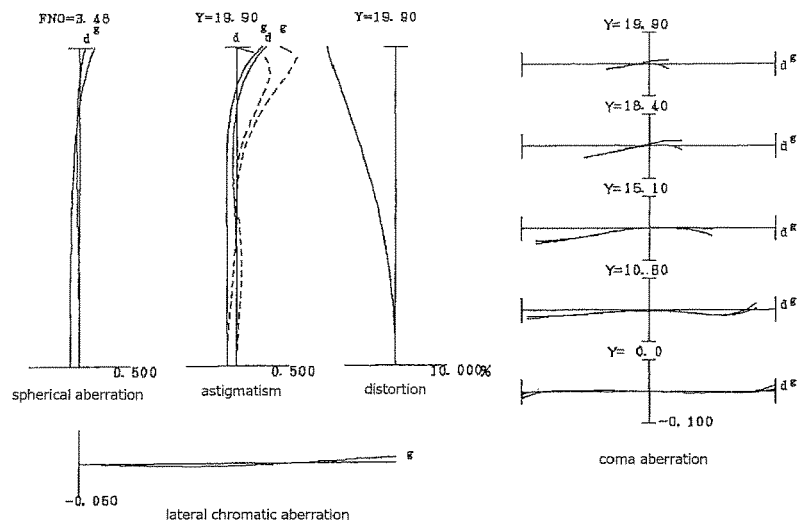
Fig.20B
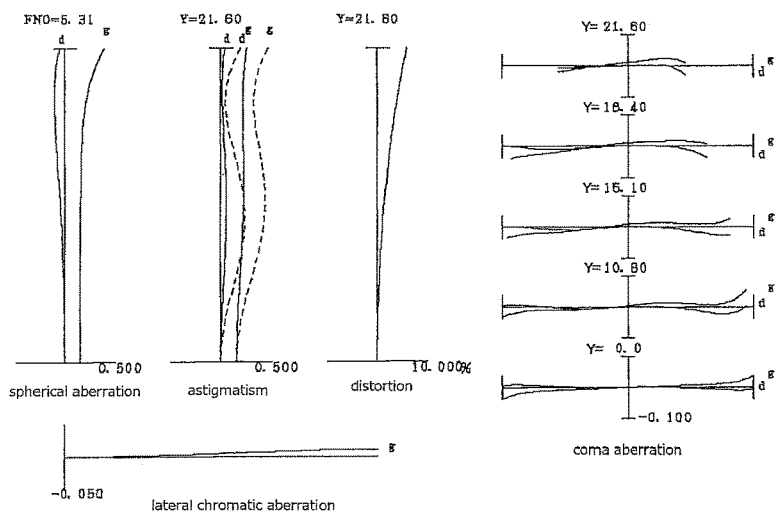
Fig.20C
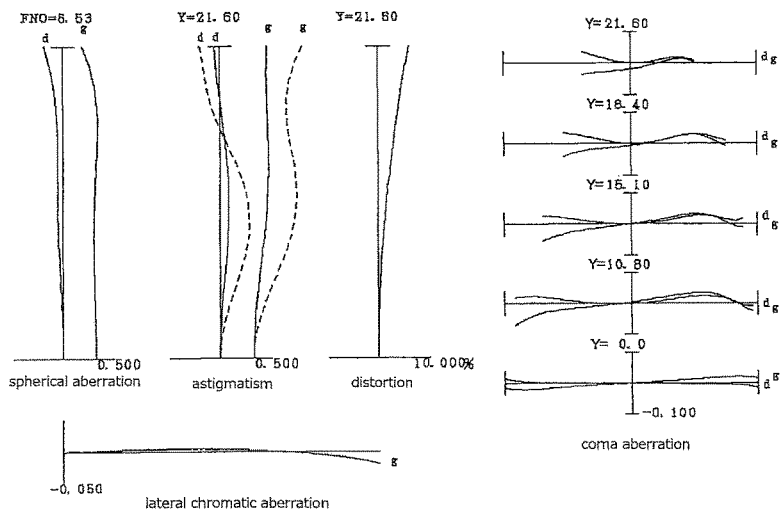

Fig.21
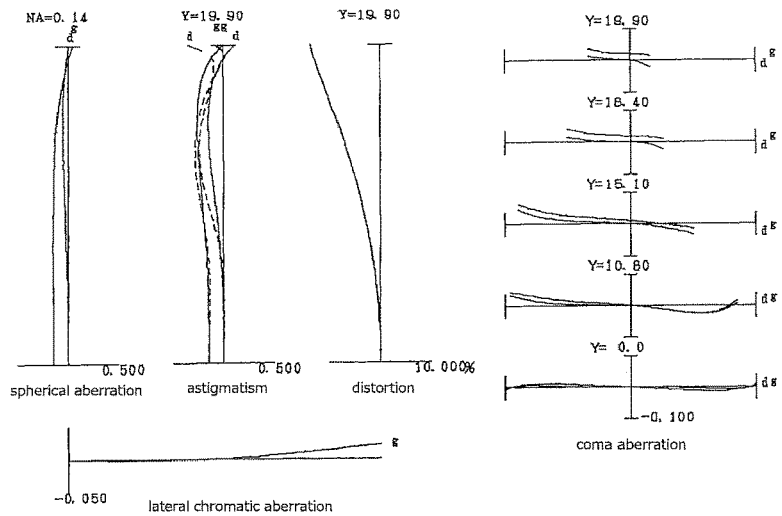
Fig.21A
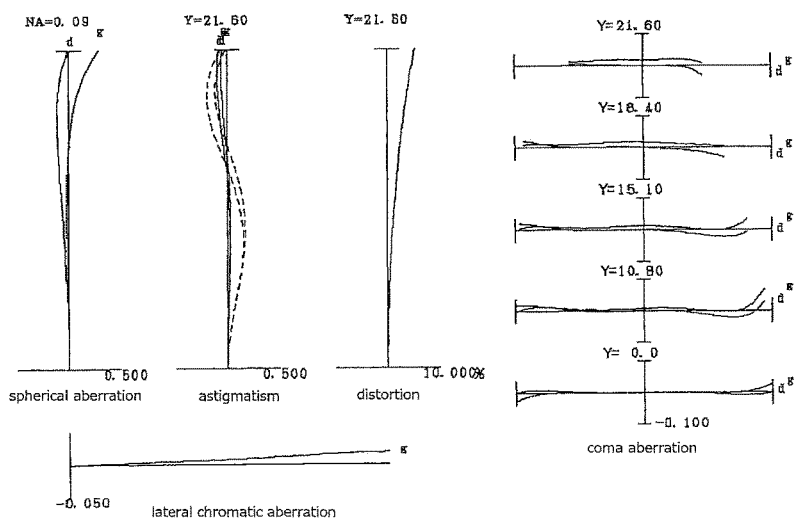
Fig.21B
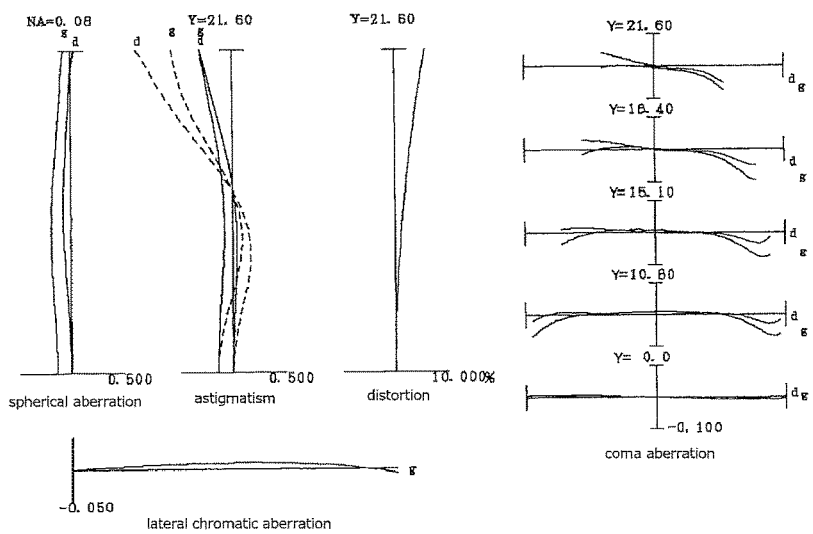
Fig.21C

Fig.23
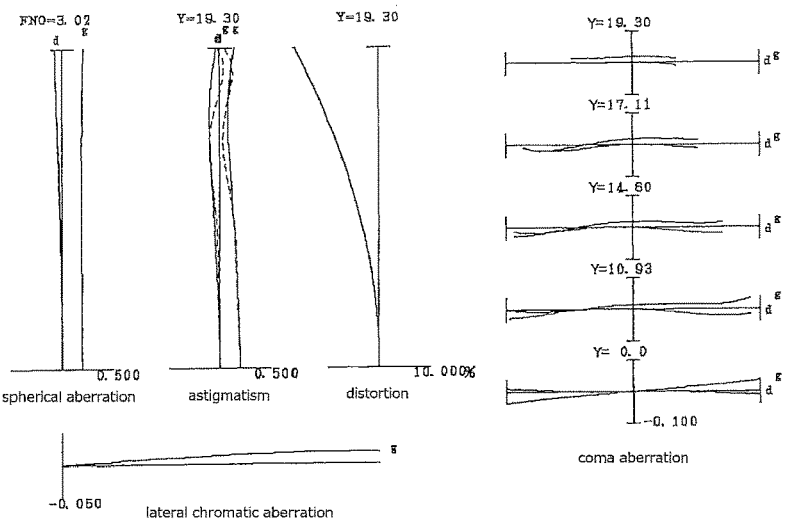
Fig.23A
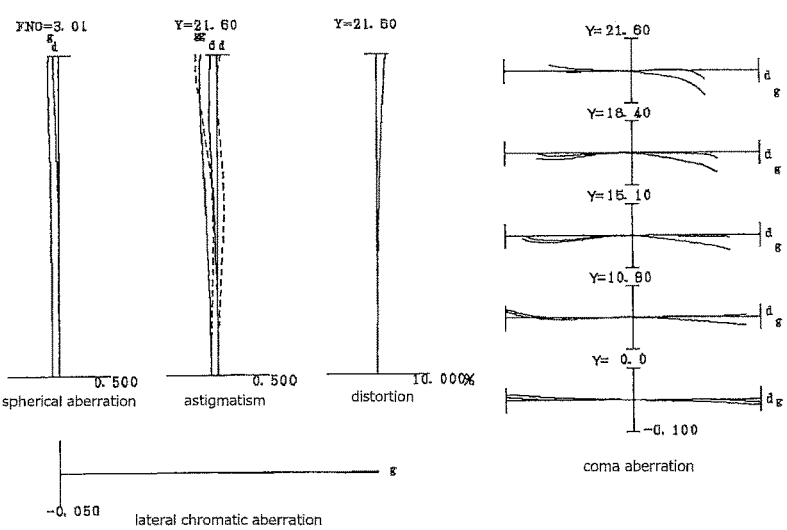
Fig.23B
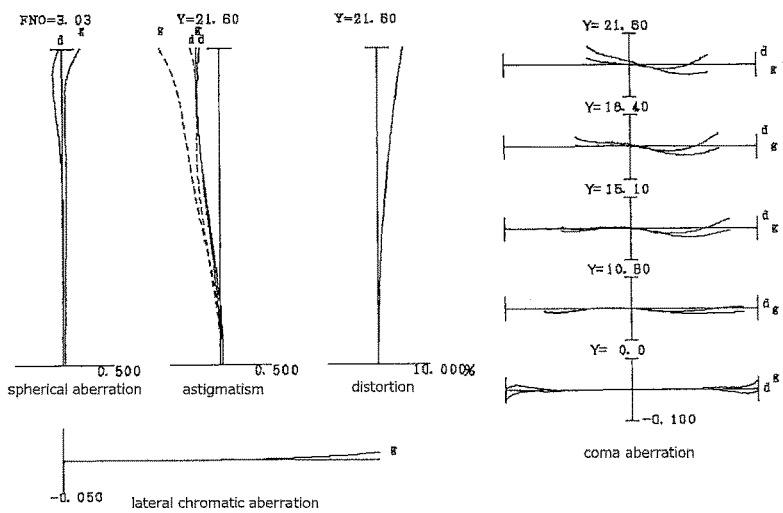
Fig.23C

Fig.24
Fig.24A
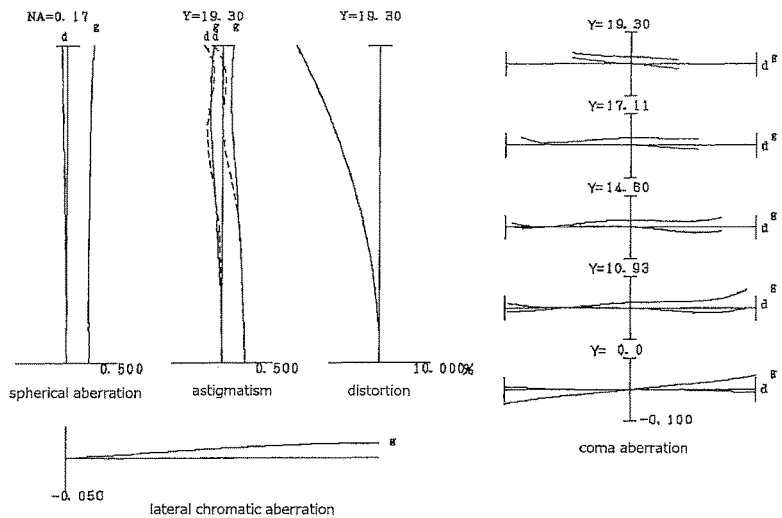
Fig.24B
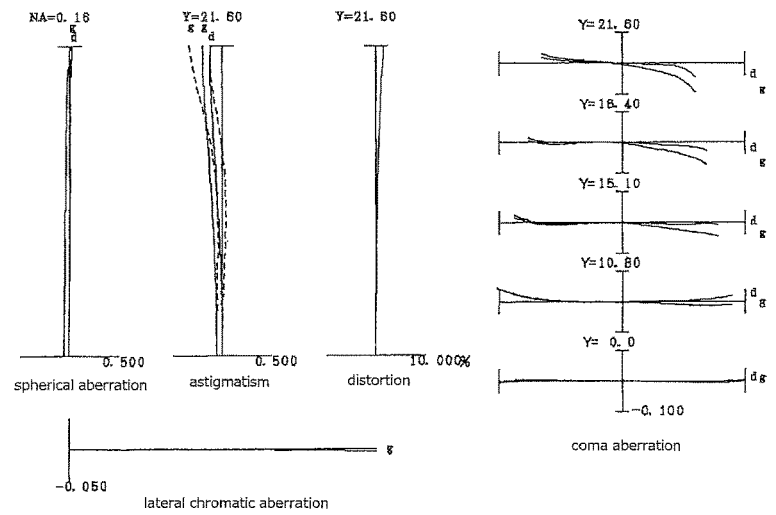
Fig.24C
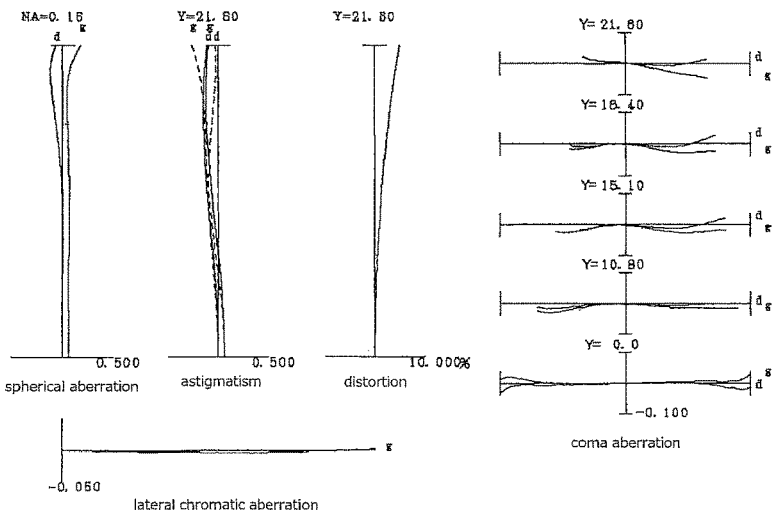

Fig.26
Fig.26A
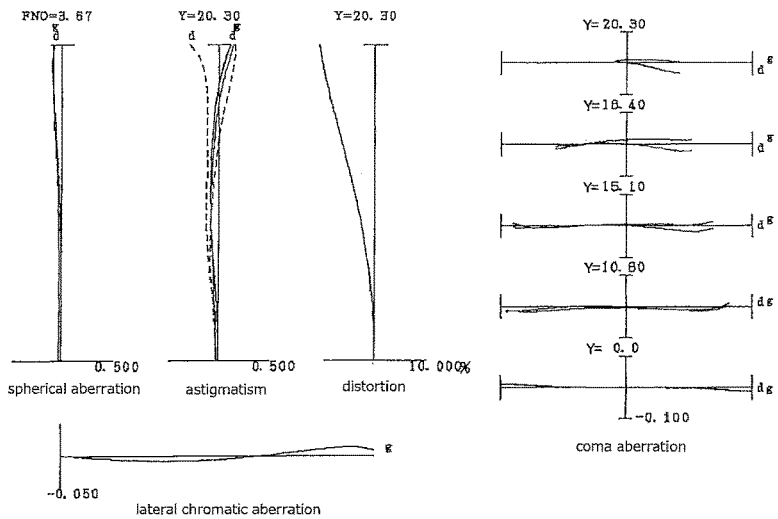
Fig.26B
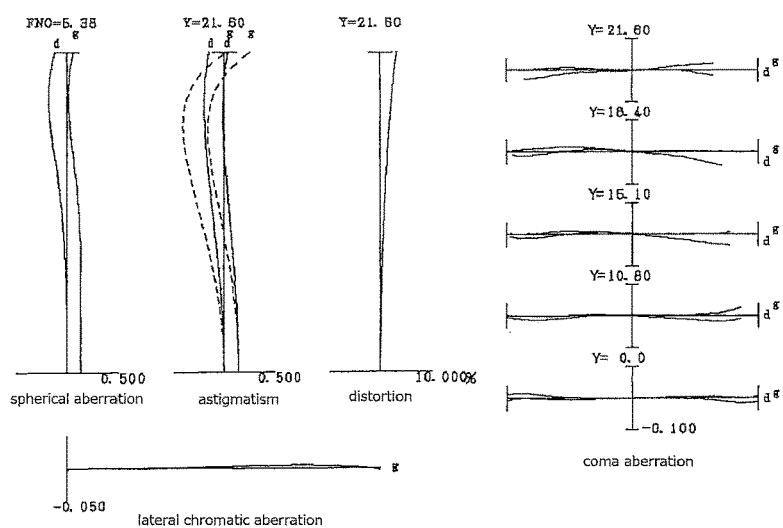
Fig.26C
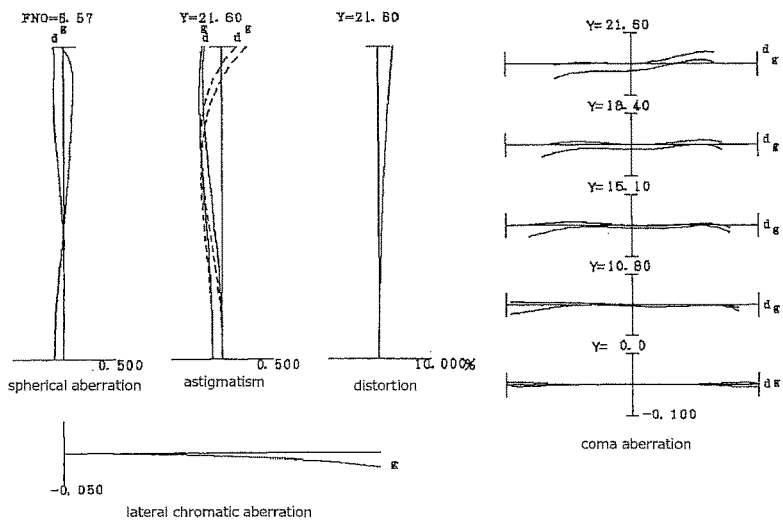

Fig.27
Fig.27A
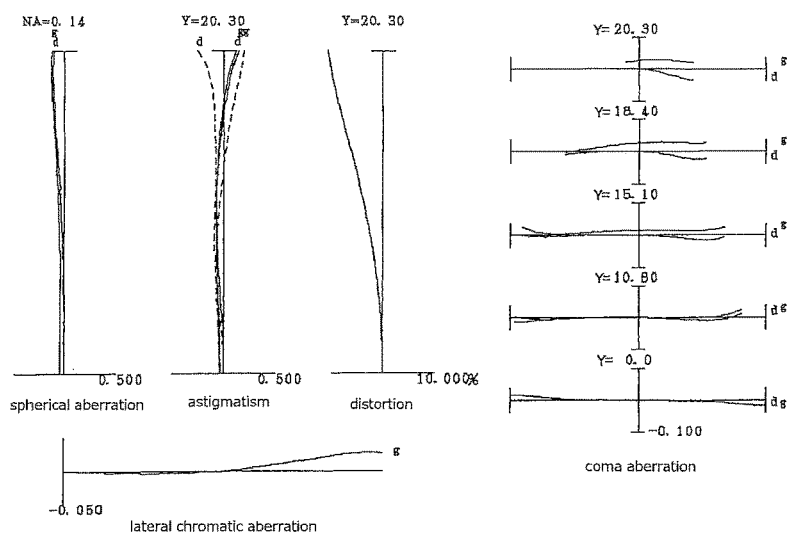
Fig.27B
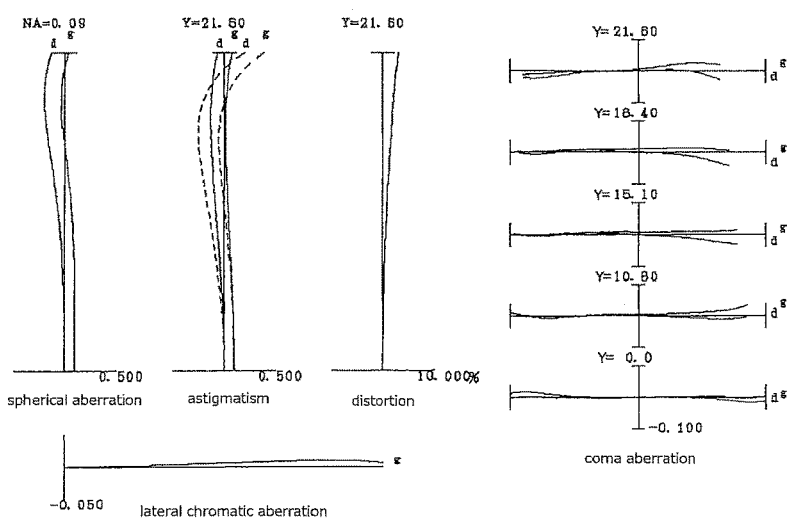
Fig.27C
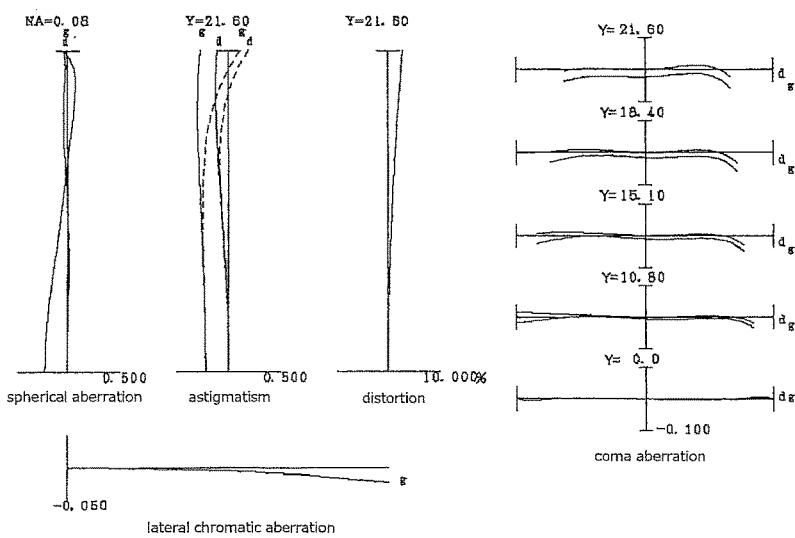

Fig.29
Fig.29A
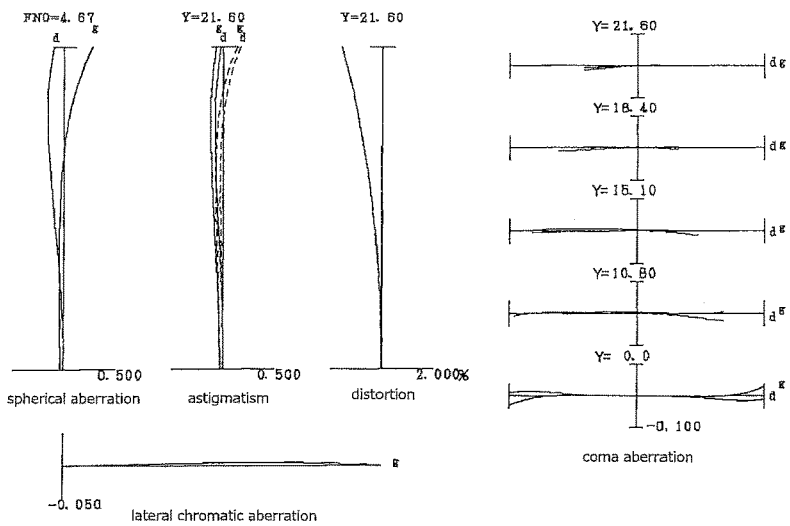
Fig.29B
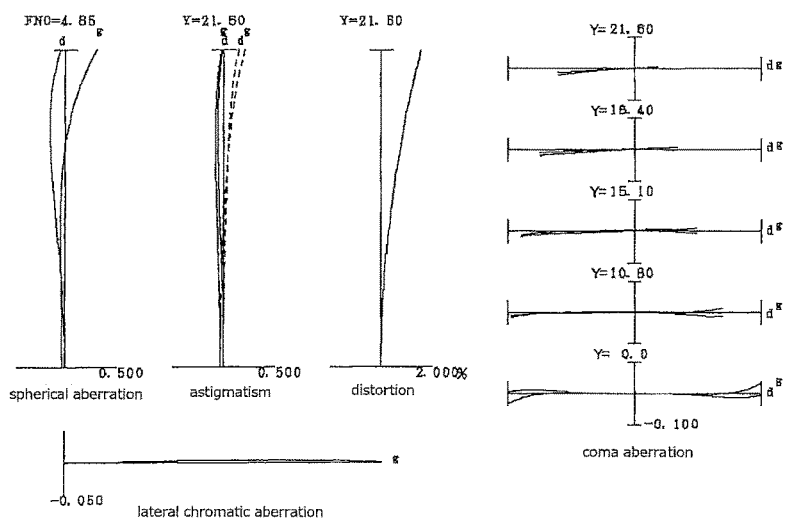
Fig.29C
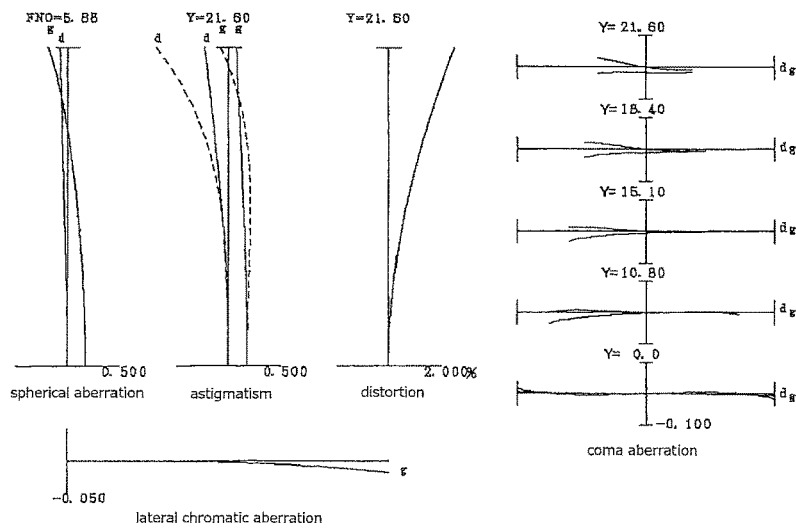

Fig.30
Fig.30A
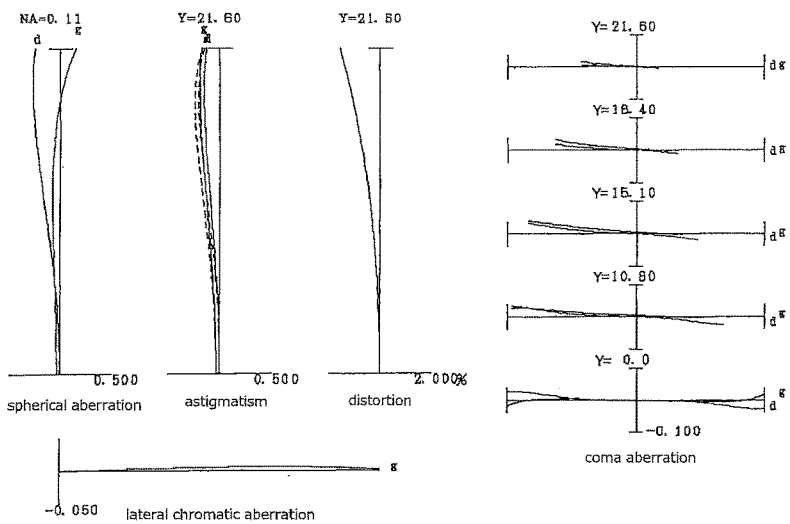
Fig.30B
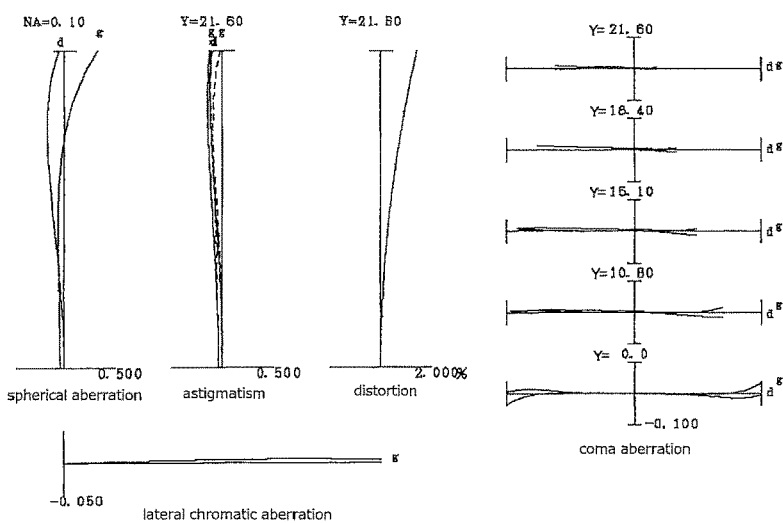
Fig.30C
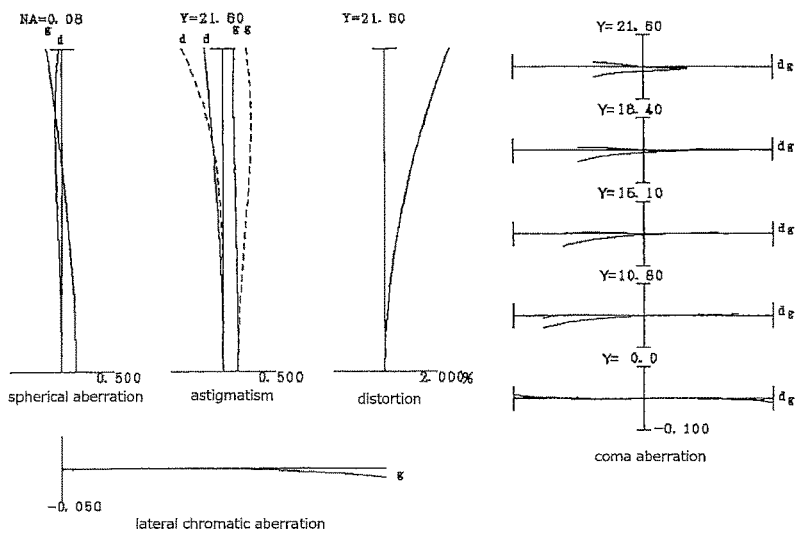

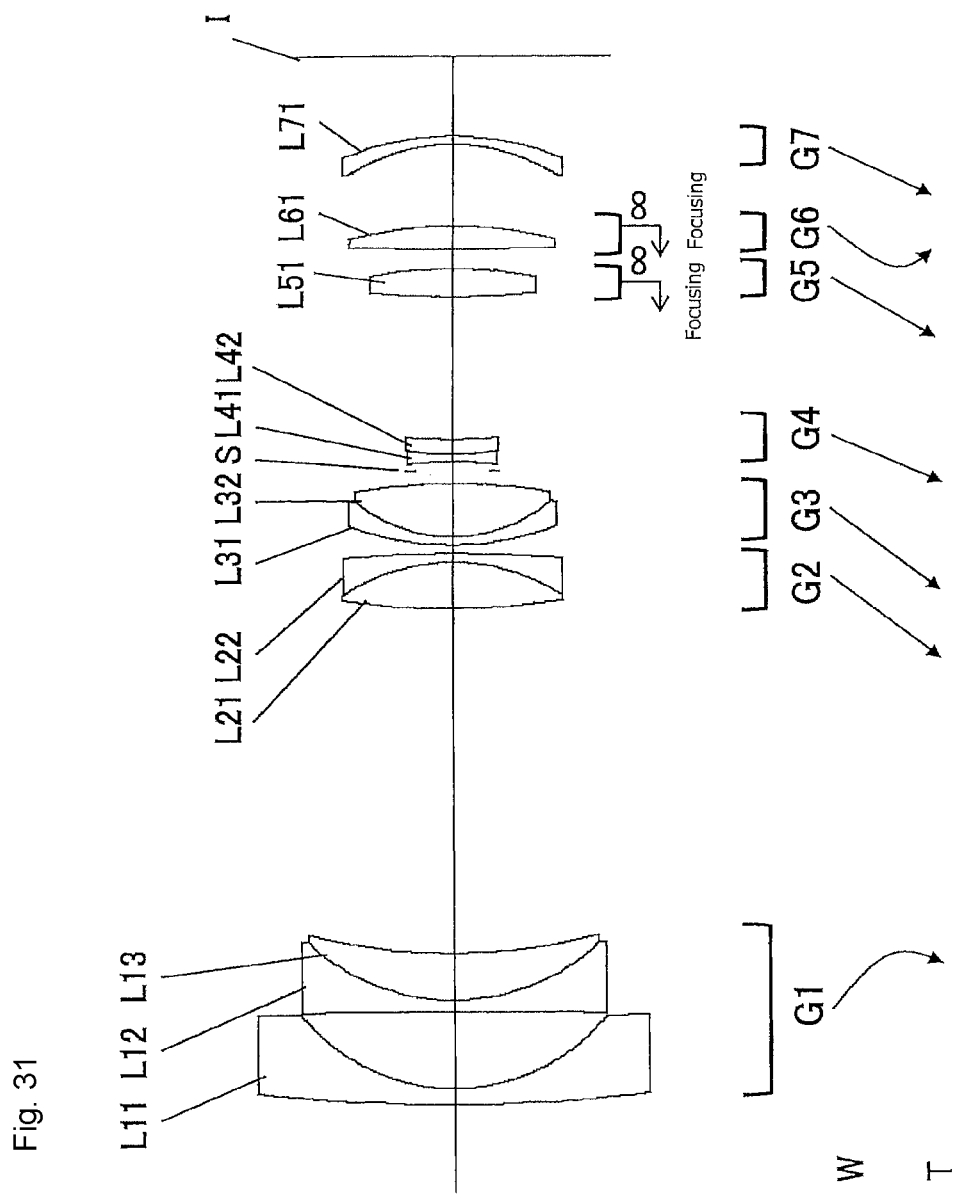

Fig.32
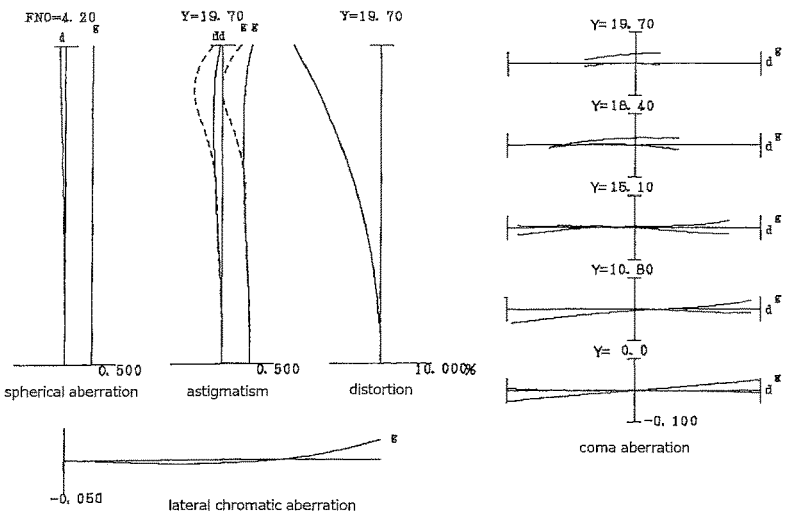
Fig.32A
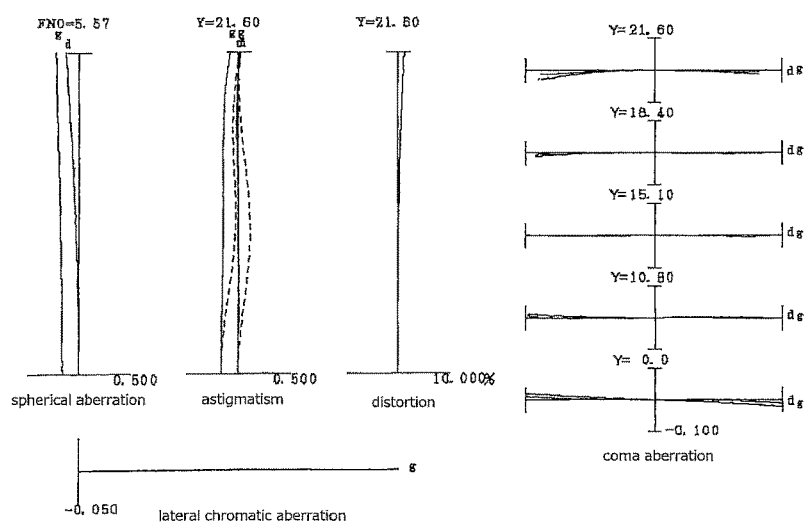
Fig.32B
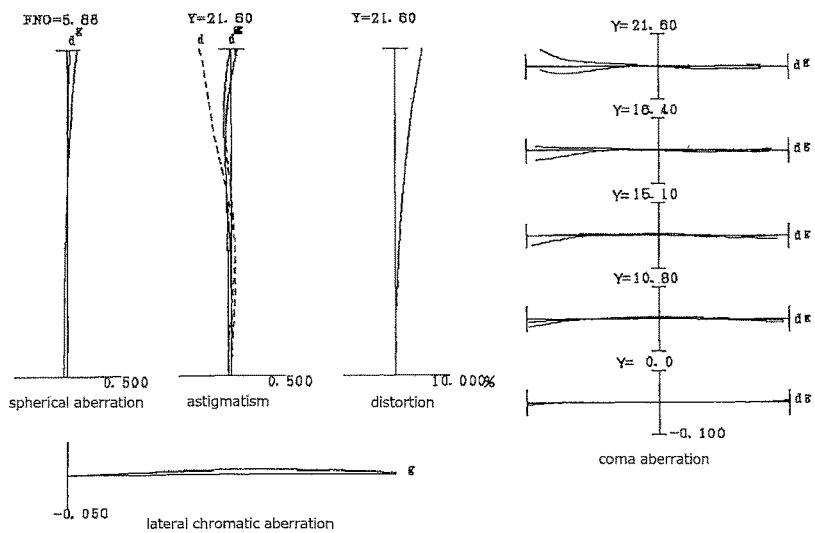
Fig.32C

Fig.33
Fig.33A
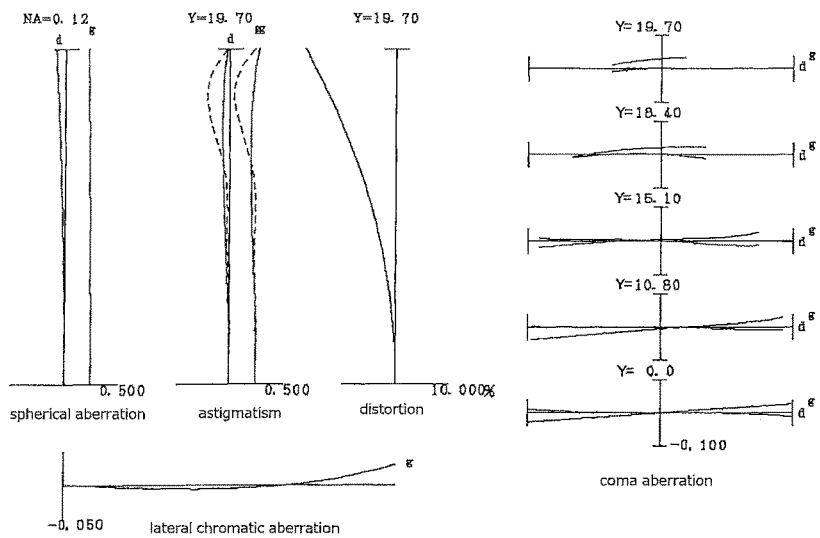
Fig.33B
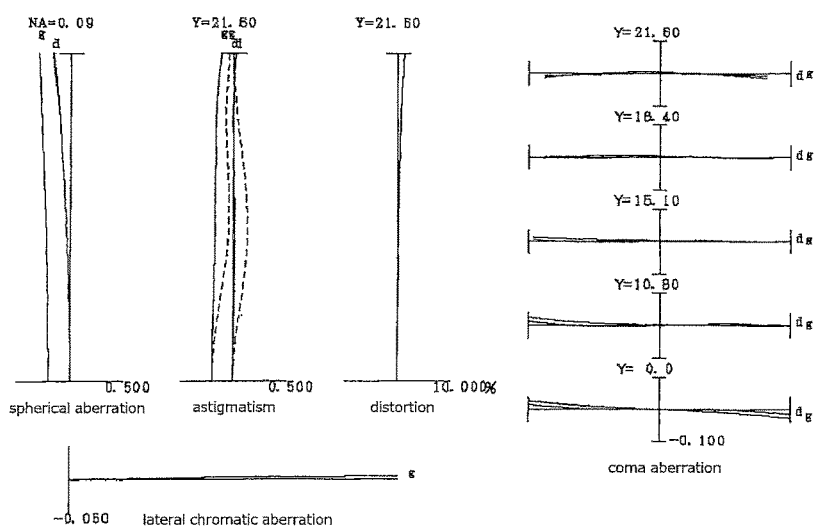
Fig.33C
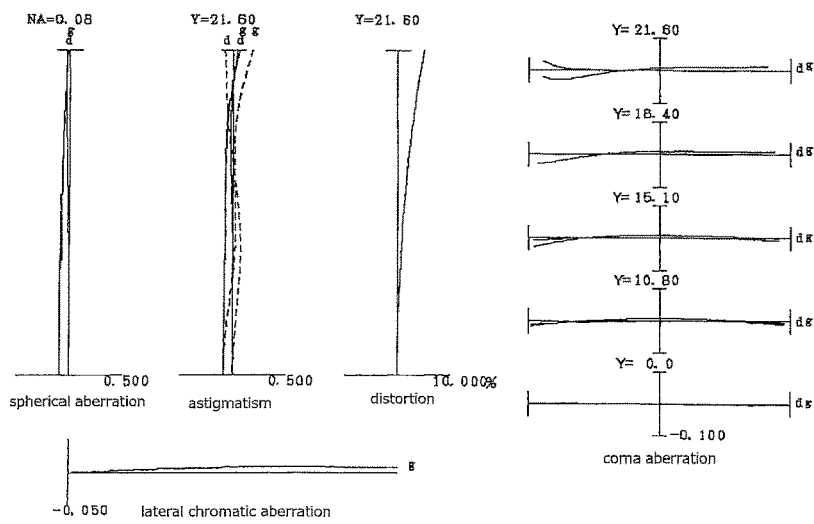

VARIABLE MAGNIFICATION OPTICAL SYSTEM, OPTICAL APPARATUS, AND METHOD FOR PRODUCING VARIABLE MAGNIFICATION OPTICAL SYSTEM

TECHNICAL FIELD

The present invention relates to a variable magnification optical system, an optical apparatus and a method for manufacturing the variable magnification optical system.

BACKGROUND ART

There has been proposed a variable magnification optical system that is suitable to be used for a photographic camera, an electronic still camera, a video camera or the like. For example, refer to Japanese Patent application Laid-Open Gazette No. 2004-198529. However, in the conventional variable magnification optical system a variable magnification optical system is not enough to suppress variations in various aberrations upon focusing.

PRIOR ART REFERENCE

Patent Document

Patent Document 1: Japanese Patent application Laid-Open Gazette No. 2004-198529.

SUMMARY OF THE INVENTION

According to a first aspect of the present invention, there is provided a variable magnification optical system comprising, in order from an object side, a first lens group and a plurality of lens groups;

upon varying a magnification, a distance between said first lens group and said plurality of lens groups being varied, and distances between respective lens groups in said plurality of lens groups being varied;

said plurality of lens groups comprising an object side focusing lens group which is moved upon carrying out focusing and at least one image side focusing lens group disposed in a more image side than the object side focusing lens group and moved with a trajectory differing from that of the object side focusing lens group, upon carrying out the focusing; and the following conditional expressions being satisfied:

$$0.60<(-f1N)/|f1|<1.80$$

$$0.2<BFw/fw<2.0$$

where f1N denotes a focal length of a lens which has a strongest negative refractive power in lenses in said first lens group, f1 denotes a focal length of said first lens groups, BFw denotes a back focus of said variable magnification optical system in the wide angle end state, and fw denotes a focal length of said variable magnification optical system in the wide angle end state.

Further, according to a second aspect of the present invention, there is provided a method for manufacturing a variable magnification optical system comprising, in order from an object side, a first lens group and a plurality of lens groups; comprising the steps of:

constructing such that, upon varying a magnification, a distance between said first lens group and said plurality of lens groups being varied, and distances between respective lens groups in said plurality of lens groups being varied;

constructing such that said plurality of lens groups comprises an object side focusing lens group which is moved upon carrying out focusing and at least one image side focusing lens group disposed at a more image side than the object side focusing lens group and moved with a trajectory differing from that of the object side focusing lens group upon carrying out the focusing; and constructing such that the following conditional expressions are satisfied:

$$0.60<(-f1N)/|f1|<1.80$$

$$0.2<BFw/fw<2.0$$

where f1N denotes a focal length of a lens which has a strongest negative refractive power in lenses in said first lens group, f1 denotes a focal length of said first lens groups, BFw denotes a back focus of said variable magnification optical system in the wide angle end state, and fw denotes a focal length of said variable magnification optical system in the wide angle end state.

BRIEF DESCRIPTION OF THE DRAWINGS

FIG. 2A, FIG. 2B and FIG. 2C are graphs showing various aberrations upon focusing on an infinite distance object, respectively, in the wide angle end state, in the intermediate focal length state, and in the telephoto end state, of the variable magnification optical system according to the First Example.

FIG. 3A, FIG. 3B and FIG. 3C are graphs showing various aberrations upon focusing on a close distance object, respectively, in the wide angle end state, in the intermediate focal length state, and in the telephoto end state, of the variable magnification optical system according to the First Example.

FIG. 5A, FIG. 5B and FIG. 5C are graphs showing various aberrations upon focusing on an infinite distance object, respectively, in the wide angle end state, in the intermediate focal length state, and in the telephoto end state, of the variable magnification optical system according to the Second Example.

FIG. 6A, FIG. 6B and FIG. 6C are graphs showing various aberrations upon focusing on a close distance object, respectively, in the wide angle end state, in the intermediate focal length state, and in the telephoto end state, of the variable magnification optical system according to the Second Example.

FIG. 8A, FIG. 8B and FIG. 8C are graphs showing various aberrations upon focusing on an infinite distance object, respectively, in the wide angle end state, in the intermediate focal length state, and in the telephoto end state, of the variable magnification optical system according to the Third Example.

FIG. 9A, FIG. 9B and FIG. 9C are graphs showing various aberrations upon focusing on a close distance object, respectively, in the wide angle end state, in the intermediate focal length state, and in the telephoto end state, of the variable magnification optical system according to the Third Example.

FIG. 11A, FIG. 11B and FIG. 11C are graphs showing various aberrations upon focusing on an infinite distance object, respectively, in the wide angle end state, in the intermediate focal length state, and in the telephoto end state, of the variable magnification optical system according to the Fourth Example.

FIGS. 12A, 12B and 12C are graphs showing various aberrations upon focusing on a close distance object, respectively, in the wide angle end state, in the intermediate focal length state, and in the telephoto end state, of the variable magnification optical system according to the Fourth Example.

FIG. 14A, FIG. 14B and FIG. 14C are graphs showing various aberrations upon focusing on an infinite distance object, respectively, in the wide angle end state, in the intermediate focal length state, and in the telephoto end state, of the variable magnification optical system according to the Fifth Example.

FIG. 15A, FIG. 15B and FIG. 15C are graphs showing various aberrations upon focusing on a close distance object, respectively, in the wide angle end state, in the intermediate focal length state, and in the telephoto end state, of the variable magnification optical system according to the Fifth Example.

FIG. 17A, FIG. 17B and FIG. 17C are graphs showing various aberrations upon focusing on an infinite distance object, respectively, in the wide angle end state, in the intermediate focal length state, and in the telephoto end state, of the variable magnification optical system according to the Sixth Example.

FIG. 18A, FIG. 18B and FIG. 18C are graphs showing various aberrations upon focusing on a close distance object, respectively, in the wide angle end state, in the intermediate focal length state, and in the telephoto end state, of the variable magnification optical system according to the Sixth Example.

FIG. 20A, FIG. 20B and FIG. 20C are graphs showing various aberrations upon focusing on an infinite distance object, respectively, in the wide angle end state, in the intermediate focal length state, and in the telephoto end state, of the variable magnification optical system according to the Seventh Example.

FIG. 21A, FIG. 21B and FIG. 21C are graphs showing various aberrations upon focusing on a close distance object, respectively, in the wide angle end state, in the intermediate focal length state, and in the telephoto end state, of the variable magnification optical system according to the Seventh Example.

FIG. 23A, FIG. 23B and FIG. 23C are graphs showing various aberrations upon focusing on an infinite distance object, respectively, in the wide angle end state, in the intermediate focal length state, and in the telephoto end state, of the variable magnification optical system according to the Eighth Example.

FIG. 24A, FIG. 24B and FIG. 24C are graphs showing various aberrations upon focusing on a close distance object, respectively, in the wide angle end state, in the intermediate focal length state, and in the telephoto end state, of the variable magnification optical system according to the Eighth Example.

FIG. 26A, FIG. 26B and FIG. 26C are graphs showing various aberrations upon focusing on an infinite distance object, respectively, in the wide angle end state, in the intermediate focal length state, and in the telephoto end state, of the variable magnification optical system according to the Ninth Example.

FIG. 27A, FIG. 27B and FIG. 27C are graphs showing various aberrations upon focusing on a close distance object, respectively, in the wide angle end state, in the intermediate focal length state, and in the telephoto end state, of the variable magnification optical system according to the Ninth Example.

FIG. 29A, FIG. 29B and FIG. 29C are graphs showing various aberrations upon focusing on an infinite distance object, respectively, in the wide angle end state, in the intermediate focal length state, and in the telephoto end state, of the variable magnification optical system according to the Tenth Example.

FIG. 30A, FIG. 30B and FIG. 30C are graphs showing various aberrations upon focusing on a close distance object, respectively, in the wide angle end state, in the intermediate focal length state, and in the telephoto end state, of the variable magnification optical system according to the Tenth Example.

FIG. 31 is a sectional view of a variable magnification optical system according to an Eleventh Example.

FIG. 32A, FIG. 32B and FIG. 32C are graphs showing various aberrations upon focusing on an infinite distance object, respectively, in the wide angle end state, in the intermediate focal length state, and in the telephoto end state, of the variable magnification optical system according to the Eleventh Example.

FIG. 33A, FIG. 33B and FIG. 33C are graphs showing various aberrations upon focusing on a close distance object, respectively, in the wide angle end state, in the intermediate focal length state, and in the telephoto end state, of the variable magnification optical system according to the Eleventh Example.

EMBODIMENT FOR CARRYING OUT THE INVENTION

Figure 1:
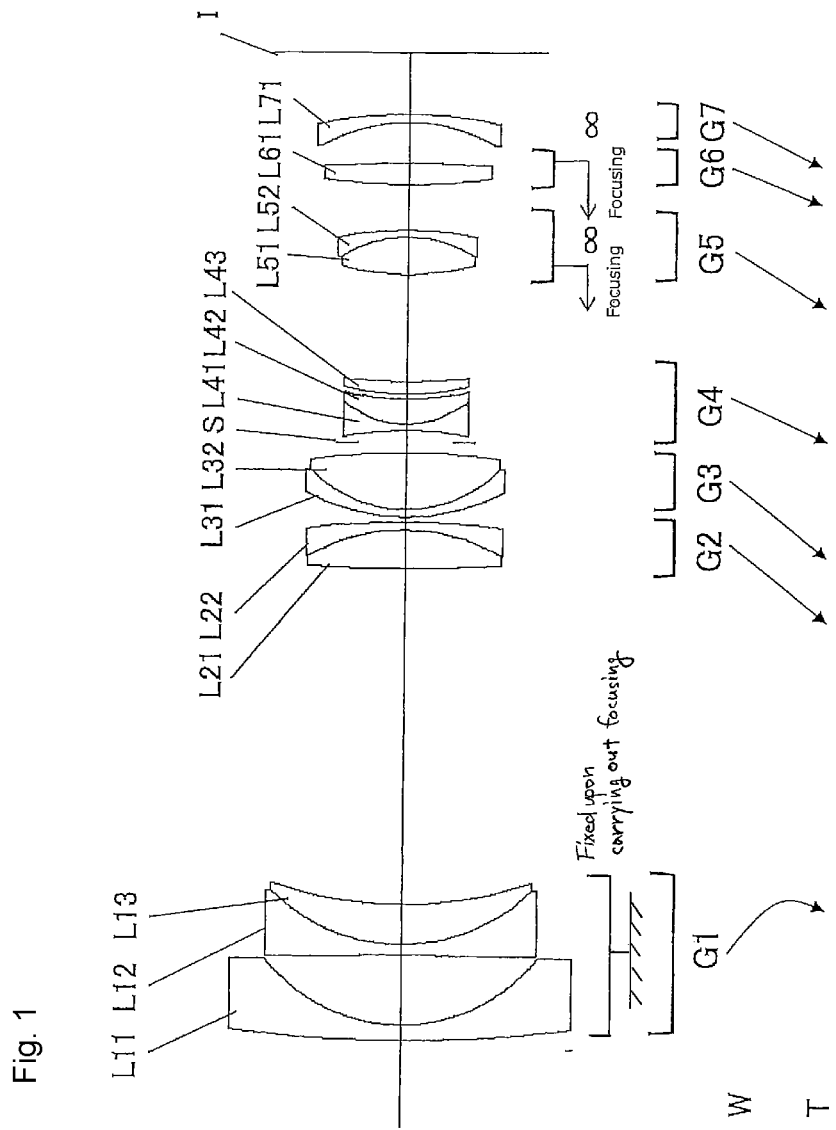
FIG. 1 is a sectional view of a variable magnification optical system according to a First Example.

Next, a variable magnification optical system according to the present embodiment, an optical apparatus and a method for producing the variable magnification optical system, will be explained.

The variable magnification optical system according to the present embodiment comprises, in order from an object side, a first lens group and a plurality of lens groups;

upon varying a magnification, a distance between said first lens group and said plurality of lens groups being varied, and distances between respective lens groups in said plurality of lens groups being varied;

said plurality of lens groups comprising an object side focusing lens group which is moved upon carrying out focusing and at least one image side focusing lens group disposed in a more image side than the object side focusing lens group and moved with a trajectory differing from that of the object side focusing lens group upon carrying out the focusing; and the following conditional expressions (1) and (2) being satisfied:

$$0.60 < (-f1N)/|f1| < 1.80 \tag{1}$$

$$0.2 < BFw/fw < 2.0 \tag{2}$$

where f1N denotes a focal length of a lens which has a strongest negative refractive power in lenses in said first lens group, f1 denotes a focal length of said first lens groups, BFw denotes a back focus of said variable magnification optical system in the wide angle end state, and fw denotes a focal length of said variable magnification optical system in the wide angle end state.

Here, in the variable magnification optical system according to the present embodiment which comprises, in order from the object side, the first lens group and a plurality of lens groups; upon varying the magnification from a wide angle end state to a telephoto end state, a distance between said first lens group and said plurality of lens groups being varied, and distances between respective lens groups in said plurality of lens groups being varied, thereby it being possible to attain superb correction of aberrations upon varying the magnification. Further, in the variable magnification optical system according to the present embodiment, the plurality of lens groups comprises an object side focusing lens group which is moved upon carrying out focusing and at least one image side focusing lens group disposed in a more image side than the object side focusing lens group and moved with a trajectory differing from that of the object side focusing lens group upon carrying out the focusing, whereby it is possible to suppress effectively variations in spherical aberration and other various aberrations upon carrying out focusing from an infinite distance object to a close distance object.

Meanwhile, in the present embodiment, a lens group means a portion which comprises at least one lens separated by an air space.

The conditional expression (1) defines a ratio of a focal length of a lens which has a strongest negative refractive power in lenses in the first lens group, relative to a focal length of the first lens group. With satisfying the conditional expression (1), the variable magnification optical system according to the present embodiment can correct effectively coma aberration and other various aberrations, and can suppress variations in spherical aberration and other various aberrations upon varying the magnification from the wide angle end state to the telephoto end state.

When the value of $(-f1N)/|f1|$ is equal to or exceeds the upper limit value of the conditional expression (1) of the variable magnification optical system of the present embodiment, refractive power of the first lens group becomes strong, and it becomes difficult to suppress variations in spherical aberration and other various aberrations upon varying the magnification from the wide angle end state to the telephoto end state. Meanwhile, by setting the upper limit value of the conditional expression (1) to 1.75, it is possible to secure the advantageous effect more surely. In order to secure the advantageous effect of the variable magnification optical system according to the present embodiment further more surely, it is preferable to set the upper limit value of the conditional expression (1) to 1.70.

Furthermore, it is preferable to set the upper limit value of the conditional expression (1) to 1.65, further to 1.60 and further to 1.50.

On the other hand, when the value of $(-f1N)/|f1|$ is equal to or falls below the lower limit of the conditional expression (1) of the variable magnification optical system of the present embodiment, refractive power of a lens having the strongest negative refractive power in lenses in the first lens group becomes strong, and it becomes difficult to suppress coma aberration and other various aberrations. Meanwhile, if the lower limit value of the conditional expression (1) is set to 0.65, it is possible to secure the advantageous effect more surely. In order to secure the advantageous effect of the variable magnification optical system according to the present embodiment further more surely, it is preferable to set the lower limit value of the conditional expression (1) to 0.70. Furthermore, it is preferable to set the lower limit value of the conditional expression (1) to 0.75, further to 0.80 and further to 0.85.

The conditional expression (2) defines a ratio of a back focus of the variable magnification optical system in the wide angle end state relative to a focal length of the variable magnification optical system in the wide angle end state. With satisfying the conditional expression (2), the variable magnification optical system according to the present embodiment can correct effectively coma aberration and other various aberrations in the wide angle end state.

Meanwhile, the term "back focus" means a distance along the optical axis from the most image side lens surface to the image plane.

When the value of BFw/fw is equal to or exceeds the upper limit of the conditional expression (2) of the variable magnification optical system of the present embodiment, the back focus in the wide angle end state relative to the focal length in the wide angle end state becomes large, and it becomes difficult to correct coma aberration and other various aberrations in the wide angle end state. Meanwhile, by setting the upper limit value of the conditional expression (2) to 1.70, it is possible to secure the advantageous effect of the present embodiment more surely. In order to secure the advantageous effect of the variable magnification optical system according to the present embodiment further more surely, it is preferable to set the upper limit value of the conditional expression (2) to 1.40. Furthermore, it is preferable to set the upper limit value of the conditional expression (2) to 1.20, further to 1.00 and further to 0.80.

On the other hand, when the value of BFw/fw is equal to or falls below the lower limit value of the conditional expression (2) of the variable magnification optical system of the present embodiment, the back focus in the wide angle end state relative to the focal length in the wide angle end state becomes small, and it becomes difficult to correct coma aberration and other various aberrations in the wide angle end state. Further, it becomes difficult also to arrange mechanical members of lens barrel. Meanwhile, by setting the lower limit value of the conditional expression (2) to 0.30 it is possible to secure the advantageous effect more surely. Further, it is preferable to set the lower limit value of the conditional expression (2) to 0.40. Furthermore, it is preferable to set the lower limit value of the conditional expression (2) to 0.45, further to 0.50, further to 0.55 and further to 0.60.

With the above mentioned configurations, it is possible to realize the variable magnification optical system which can suppress superbly variations in aberrations upon varying the magnification from the wide angle end state to the telephoto end state, and variations in various aberrations upon carrying out the focusing from an infinite distance object to a close distance object.

Further, in the variable magnification optical system according to the present embodiment, it is desirable that said object side focusing lens group has positive refractive power. With taking such a configuration, the variable magnification optical system can suppress variations in various aberrations such as spherical aberration and other various aberrations generated upon carrying out the focusing from an infinite distance object to a close distance object.

Further, in the variable magnification optical system according to the present embodiment, it is desirable that the focusing lens group disposed in the most image side in said image side focusing lens group has positive refractive power. With taking such a configuration, the variable magnification optical system can suppress variations in spherical aberration and other various aberrations generated upon carrying out the focusing from an infinite distance object to a close distance object.

Further, in the variable magnification optical system according to the present embodiment, it is desirable that said object side focusing lens group is composed of one or two lens components. With this configuration, the focusing lens group may be downsized and reduced in weight.

Further, in the variable magnification optical system according to the present embodiment, it is desirable that said image side focusing lens group is composed of one or two lens components. With this configuration, the focusing lens group may be downsized and reduced in weight.

Further, in the variable magnification optical system according to the present embodiment, it is desirable that said first lens group is fixed upon carrying out the focusing. With this configuration, lens barrel may be prevented from being large sized.

It is desirable that the variable magnification optical system according to the present embodiment comprises at least one lens component in a more image side than the focusing lens group disposed in the most image side in said image side focusing lens group, and that the following conditional expression (3) is satisfied:

$$0.05 < (-fRN)/ft < 4.50 \quad (3)$$

where fRN denotes a focal length of the lens having the strongest refractive power in lenses composing said lens components, and ft denotes a focal length of the variable magnification optical system in the telephoto end state.

The variable magnification optical system according to the present embodiment comprises at least one lens component in a more image side than the focusing lens group disposed in the most image side in the image side focusing lens group, thereby it being possible to suppress variations in coma aberration generated upon carrying out the focusing from the infinite distance object to the close distance object. Meanwhile, the term "lens component" means a single lens or a cemented lens.

The conditional expression (3) defines a ratio of a focal length of the lens having the strongest negative refractive power, in lenses composing the lens components located in more image side than the focusing lens group disposed in the most image side in the image side focusing lens group, relative to a focal length of the variable magnification optical system in the telephoto end state.

With satisfying the conditional expression (3), the variable magnification optical system according to the present embodiment can suppress variations in coma aberration and other various aberrations upon carrying out focusing from the infinite distance object to the close distance object.

When the value of (-fRN)/ft is equal to or exceeds the upper limit value of the conditional expression (3) of the variable magnification optical system according to the present embodiment, refractive power of the lens having the strongest negative refractive power, in lenses composing the lens components disposed in the more image side than the focusing lens group disposed in the most image side in the image side focusing lens group, becomes weak, and it becomes difficult to suppress variation in coma aberration caused upon carrying out the focusing from the infinite distance object to the close distance object.

Meanwhile, by setting the upper limit value of the conditional expression (3) to 4.20, it is possible to secure the advantageous effect more surely. Further, in order to secure the advantageous effect of the present embodiment more surely, it is preferable to set the upper limit value of the conditional expression (3) to 3.90. Furthermore, it is preferable to set the upper limit value of the conditional expression (3) to 3.50, further to 3.00 and further to 2.50.

On the other hand, when the value of (-fRN)/ft in the conditional expression (3) of the variable magnification optical system according to the present embodiment, is equal to or falls below the lower limit value, refractive power of the lens having the strongest negative refractive power, in lenses composing the lens components located in the more image side than the focusing lens group disposed in the most image side in the image side focusing lens group, becomes strong, and it becomes difficult to suppress variation in coma aberration caused upon carrying out the focusing from the infinite distance object to the close distance object.

Meanwhile, by setting the lower limit value of the conditional expression (3) to 0.06, it is possible to secure the advantageous effect more surely. Further, in order to secure the advantageous effect of the present embodiment more surely, it is preferable to set the lower limit value of the conditional expression (3) to 0.07. Furthermore, it is preferable to set the lower limit value of the conditional expression (3) to 0.10, further to 0.14, further to 0.65, further to 0.75, further to 0.85 and further to 0.95.

Further, in the variable magnification optical system according to the present embodiment, it is desirable that the following conditional expression (4) is satisfied:

$$MTF1/MTF2 < 5.0 \quad (4)$$

where MTF1 denotes an absolute value of a movement amount of said object side focusing lens group upon carrying out focusing from the infinite distance object to the close distance object in the tele photo end state, and MTF2 denotes an absolute value of a movement amount of the focusing lens group disposed in the most object side in said image side focusing lens group, upon carrying out the focusing from the infinite distance object to the close distance object in the tele photo end state.

The conditional expression (4) defines a ratio of an absolute value of a movement amount of the object side focusing lens group upon carrying out focusing from the infinite distance object to the close distance object in the tele photo end state relative to an absolute value of a movement amount of the focusing lens group disposed in the most object side in said image side focusing lens group, upon carrying out the focusing from the infinite distance object to the close distance object in the tele photo end state. With satisfying the conditional expression (4), the variable magnification optical system according to the present embodiment can effectively suppress variation in spherical aberration upon carrying out the focusing from the infinite distance object to the close distance object.

When the value of MTF1/MTF2 is equal to or exceeds the upper limit value of the conditional expression (4) of the variable magnification optical system according to the present embodiment, an amount of movement of the object side lens group relative to the focusing lens group disposed in the most object side in the image side focusing lens group, becomes too large, and it becomes difficult to correct variation in spherical aberration caused upon carrying out the focusing from the infinite distance object to the close distance object.

Meanwhile, by setting the upper limit value of the conditional expression (4) to 4.7, it is possible to secure the advantageous effect more surely. Further, in order to secure the advantageous effect of the present embodiment more surely, it is preferable to set the upper limit value of the conditional expression (4) to 4.5. Furthermore, it is preferable to set the upper limit value of the conditional expression (4) to 4.0, further to 3.5, further to 2.8, and further to 2.4.

In order to secure the advantageous effect of the present embodiment surely, it is preferable that the conditional expression (4) satisfies the following expression:

$$2.0 < MTF1/MTF2 < 5.0$$

By setting the lower limit value of the conditional expression (4) to 2.0, it is possible to suppress further effectively variation in spherical aberration upon carrying out the focusing.

Further, in the variable magnification optical system according to the present embodiment, it is desirable that at least one focusing lens group of said object side focusing lens group and said image side focusing lens group comprises at least one lens having negative refractive power and that the following conditional expression (5) is satisfied:

$$0.45 < (-fFN)/|fF| < 1.70 \qquad (5)$$

where fFN denotes a focal length of the lens having the strongest negative refractive power in lenses in said object side focusing lens group and said image side focusing lens group, and fF denotes a focal length of the focusing lens group having the strongest refractive power, in said object side focusing lens group and said image side focusing lens group.

In the variable magnification optical system according to the present embodiment, at least one focusing lens group in said object side focusing lens group and said image side focusing lens group comprises at least one lens having negative refractive power, thereby it being possible to suppress variations in spherical aberration as well as chromatic aberration upon carrying out focusing from the infinite distance object to the close distance object.

The conditional expression (5) defines a ratio of a focal length of the lens having the strongest negative refractive power in the lenses in the object side focusing lens group and the image side focusing lens group, relative to a focal length of the focusing lens group having the strongest refractive power in said object side focusing lens group and said image side focusing lens group. With satisfying the conditional expression (5), the variable magnification optical system according to the present embodiment can suppress variations in spherical aberration and other various aberrations, upon carrying out focusing from the infinite distance object to the close distance object.

When the value of $(-fFN)/|fF|$ is equal to or exceeds the upper limit value of the conditional expression (5) of the variable magnification optical system according to the present embodiment, refractive power of the focusing lens group having the strongest refractive power, in the object side focusing lens group and the image side focusing lens group, becomes too strong, and it becomes difficult to suppress variations in spherical aberration and other various aberrations caused upon carrying out the focusing from the infinite distance object to the close distance object. Meanwhile, by setting the upper limit value of the conditional expression (5) to 1.60, it is possible to secure the advantageous effect of the present embodiment more surely. Further, in order to secure the advantageous effect of the present embodiment more surely, it is preferable to set the upper limit value of the conditional expression (5) to 1.50. Furthermore, it is preferable to set the upper limit value of the conditional expression (5) to 1.40, further to 1.30 and further to 1.25.

On the other hand, when the value of $(-fFN)/|fF|$ in the conditional expression (5) of the variable magnification optical system according to the present embodiment, is equal to or falls below the lower limit value, refractive power of the lens having the strongest negative refractive power, in the lenses in the object side focusing lens group and the image side focusing lens group, becomes too strong, and it becomes difficult to suppress variations in spherical aberration and other various aberrations caused upon carrying out the focusing from the infinite distance object to the close distance object. Meanwhile, by setting the lower limit value of the conditional expression (5) to 0.47, it is possible to secure the advantageous effect of the present embodiment more surely. Further, in order to secure the advantageous effect of the present embodiment more surely, it is preferable to set the lower limit value of the conditional expression (5) to 0.50. Furthermore, it is preferable to set the lower limit value of the conditional expression (5) to 0.54 and further to 0.60.

Further, in the variable magnification optical system according to the present embodiment, it is desirable that at least one focusing lens group in said object side focusing lens group and said image side focusing lens group, comprises at least one lens having negative refractive power, and that the following conditional expression (6) is satisfied:

$$0.65 < nP/nN < 1.10 \qquad (6)$$

where nP denotes refractive index of the lens having the strongest positive refractive power in lenses in said object side focusing lens group and said image side focusing lens group, and nN denotes refractive index of the lens having the strongest negative refractive power in the lenses in said object side focusing lens group and said image side focusing lens group.

In the variable magnification optical system according to the present embodiment, at least one focusing lens group in the object side focusing lens group and the image side focusing lens group, comprises at least one lens having negative refractive power, thereby it being possible to suppress variations in spherical aberration as well as chromatic aberration caused upon carrying out the focusing from the infinite distance object to the close distance object.

The conditional expression (6) defines a ratio of refractive index of the lens having the strongest positive refractive power in lenses in the object side focusing lens group and the image side focusing lens group, relative to refractive index of the lens having the strongest negative refractive power in the lenses in the object side focusing lens group and the image side focusing lens group.

With satisfying the conditional expression (6), the variable magnification optical system according to the present embodiment can suppress variations in spherical aberration and other various aberrations upon carrying out focusing from the infinite distance object to the close distance object.

When the value of nP/nN is equal to or exceeds the upper limit value of the conditional expression (6) of the variable magnification optical system according to the present embodiment, positive refractive power of the lens having the strongest positive refractive power, in the lenses in the object side focusing lens group and the image side focusing lens group becomes too strong, and it becomes difficult to suppress variations in spherical aberration and other various aberrations caused upon carrying out the focusing from the infinite distance object to the close distance object.

Meanwhile, by setting the upper limit value of the conditional expression (6) to 1.05, it is possible to secure the advantageous effect of the present embodiment more surely. Further, in order to secure the advantageous effect of the present embodiment more surely, it is preferable to set the upper limit value of the conditional expression (6) to 1.03. Furthermore, it is preferable to set the upper limit value of the conditional expression (6) to 1.00 and further to 0.95.

On the other hand, when the value of nP/nN in the conditional expression (6) of the variable magnification optical system according to the present embodiment, is equal to or falls below the lower limit value, negative refractive power of the lens having the strongest negative refractive power, in lenses in the object side focusing lens group and said image side focusing lens group, becomes too strong, and it becomes difficult to suppress variations in spherical aberration and other various aberrations caused upon carrying out the focusing from the infinite distance object to the close distance object. Meanwhile, by setting the lower limit value of the conditional expression (6) to 0.67, it is possible to secure the advantageous effect more surely. Further, in order to secure the advantageous effect of the present embodiment more surely, it is preferable to set the lower limit value of the conditional expression (6) to 0.70. Furthermore, it is preferable to set the lower limit value of the conditional expression (6) to 0.75, further to 0.80, and further to 0.83.

In the variable magnification optical system according to the present embodiment, it is desirable that the following conditional expression (7) is satisfied:

$$0.40 < |fF1|/|f1| < 2.60 \quad (7)$$

where fF1 denotes a focal length of said object side focusing lens group, and f1 denotes a focal length of said first lens group.

The conditional expression (7) defines a ratio of a focal length of the object side focusing lens group, relative to a focal length of the first lens group. With satisfying the conditional expression (7), the variable magnification optical system according to the present embodiment can effectively suppress variations in spherical aberration and other various aberrations upon carrying out the focusing from the infinite distance object to the close distance object, and can suppress variations in spherical aberration and other various aberrations upon varying the magnification from the wide angle end state to the telephoto end state.

When the value of |fF1|/|f1| is equal to or exceeds the upper limit value of the conditional expression (7) of the variable magnification optical system according to the present embodiment, refractive power of the first lens group becomes strong, and it becomes difficult to suppress variations in spherical aberration and other various aberrations caused upon varying the magnification from the wide angle end state to the telephoto end state. Meanwhile, by setting the upper limit value of the conditional expression (7) to 2.55, it is possible to secure the advantageous effect more surely. Further, in order to secure the advantageous effect of the present embodiment more surely, it is preferable to set the upper limit value of the conditional expression (7) to 2.50. Furthermore, it is preferable to set the upper limit value of the conditional expression (7) to 2.30, and further to 2.10.

On the other hand, when the value of |fF1|/|f1| in the conditional expression (7) of the variable magnification optical system according to the present embodiment, is equal to or falls below the lower limit value, refractive power of the object side focusing lens group, becomes strong, and it becomes difficult to suppress variations in spherical aberration and other various aberrations upon carrying out the focusing from the infinite distance object to the close distance object. Meanwhile, by setting the lower limit value of the conditional expression (7) to 0.45, it is possible to secure the advantageous effect more surely. Further, in order to secure the advantageous effect of the present embodiment more surely, it is preferable to set the lower limit value of the conditional expression (7) to 0.47. Furthermore, it is preferable to set the lower limit value of the conditional expression (7) to 0.50, further to 0.55, and further to 0.60.

In the variable magnification optical system according to the present embodiment, it is desirable that the following conditional expression (8) is satisfied:

$$0.20 < |fF2|/|f1| < 3.80 \quad (8)$$

where fF2 denotes a focal length of the focusing lens group disposed in the most image side in said image side focusing lens group, and f1 denotes a focal length of said first lens group.

The conditional expression (8) defines a ratio of a focal length of the focusing lens group disposed in the most image side in the image side focusing lens group, relative to a focal length of the first lens group. With satisfying the conditional expression (8), the variable magnification optical system according to the present embodiment can effectively suppress variations in spherical aberration and other various aberrations upon carrying out the focusing from the infinite distance object to the close distance object, and can suppress variations in spherical aberration and other various aberrations upon varying the magnification from the wide angle end state to the telephoto end state.

When the value of |fF2|/|f1| is equal to or exceeds the upper limit value of the conditional expression (8) of the variable magnification optical system according to the present embodiment, refractive power of the first lens group becomes strong, and it becomes difficult to suppress variations in spherical aberration and other various aberrations caused upon varying the magnification from the wide angle end state to the telephoto end state. Meanwhile, by setting the upper limit value of the conditional expression (8) to 3.60, it is possible to secure the advantageous effect more surely. Further, in order to secure the advantageous effect of the present embodiment more surely, it is preferable to set the upper limit value of the conditional expression (8) to 3.40. Furthermore, it is preferable to set the upper limit value of the conditional expression (8) to 3.00, further to 2.50 and further to 1.90.

On the other hand, when the value of |fF2|/|f1| in the conditional expression (8) of the variable magnification optical system according to the present embodiment, is equal to or falls below the lower limit value, refractive power of the focusing lens group disposed in the most image side in the image side focusing lens group, becomes strong, and it becomes difficult to suppress variations in spherical aberration and other various aberrations upon carrying out the focusing from the infinite distance object to the close distance object. Meanwhile, by setting the lower limit value of the conditional expression (8) to 0.25, it is possible to secure the advantageous effect of the present embodiment more surely. Further, in order to secure the advantageous effect of the present embodiment more surely, it is preferable to set the lower limit value of the conditional expression (8) to 0.28. Furthermore, it is preferable to set the lower limit value of the conditional expression (8) to 0.50, further to 0.70, further to 0.90 and further to 1.20.

Further, in the variable magnification optical system according to the present embodiment, it is desirable that the object side focusing lens group consists of, in order from the object side, a lens having positive refractive power and a lens having negative refractive power. With taking such a configuration, the variable magnification optical system can suppress effectively variations in spherical aberration and other various aberrations generated upon carrying out the focusing from an infinite distance object to a close distance object.

It is desirable that the variable magnification optical system according to the present embodiment, comprises an aperture stop, and said object side focusing lens group is disposed in a more image side than said aperture stop. With this configuration, the focusing lens group may be reduced in weight.

Further, in the variable magnification optical system according to the present embodiment, it is desirable that the following conditional expression (9) is satisfied:

$$0.10 < |fF1|/ft < 3.00 \tag{9}$$

where fF1 denotes a focal length of said object side focusing lens group, and ft denotes a focal length of said variable magnification optical system in the telephoto end state.

The conditional expression (9) defines a ratio of a focal length of the object side focusing lens group relative to a focal length of the variable magnification optical system in the telephoto end state. With satisfying the conditional expression (9), the variable magnification optical system according to the present embodiment can suppress variations in spherical aberration and other various aberrations upon carrying out the focusing from the infinite distance object to the close distance object.

When the value of |fF1|/ft is equal to or exceeds the upper limit value of the conditional expression (9) of the variable magnification optical system according to the present embodiment, the focal length of the object side focusing lens group, becomes large, and an amount of movement of the object side focusing lens group upon carrying out the focusing from the infinite distance object to the close distance object becomes too large and it becomes difficult to correct variations in spherical aberration and other various aberrations upon carrying out the focusing from the infinite distance object to the close distance object. Meanwhile, by setting the upper limit value of the conditional expression (9) to 2.80, it is possible to secure the advantageous effect more surely. Further, in order to secure the advantageous effect of the present embodiment more surely, it is preferable to set the upper limit value of the conditional expression (9) to 2.60. Furthermore, it is preferable to set the upper limit value of the conditional expression (9) to 2.20, further to 1.90 and further to 1.60.

On the other hand, when the value of |fF1|/ft in the conditional expression (9) of the variable magnification optical system according to the present embodiment, is equal to or falls below the lower limit value, refractive power of the object side focusing lens group becomes strong, and it becomes difficult to suppress variations in spherical aberration and other various aberrations upon carrying out the focusing from the infinite distance object to the close distance object. Meanwhile, by setting the lower limit value of the conditional expression (9) to 0.12, it is possible to secure the advantageous effect more surely. Further, in order to secure the advantageous effect of the present embodiment more surely, it is preferable to set the lower limit value of the conditional expression (9) to 0.15.

Further, in the variable magnification optical system according to the present embodiment, it is desirable that the following conditional expression (10) is satisfied:

$$0.10 < |fF2|/ft < 3.00 \tag{10}$$

where fF2 denotes a focal length of the focusing lens group disposed in the most image side in said image side focusing lens group, and ft denotes a focal length of said variable magnification optical system in the telephoto end state.

The conditional expression (10) defines a ratio of a focal length of the focusing lens group disposed in the most image side in said image side focusing lens group relative to a focal length of said variable magnification optical system in the telephoto end state. With satisfying the conditional expression (10), the variable magnification optical system according to the present embodiment can effectively suppress variations in spherical aberration and other various aberrations upon carrying out the focusing from the infinite distance object to the close distance object.

When the value of |fF2|/ft is equal to or exceeds the upper limit value of the conditional expression (10) of the variable magnification optical system according to the present embodiment, the focal length of the focusing lens group disposed in the most image side in the image side focusing lens group, becomes large, and the amount of the movement of the focusing lens group disposed in the most image side upon carrying out the focusing from the infinite distance object to the close distance object, becomes too large, thereby it becoming difficult to correct variations in spherical aberration and other various aberrations upon carrying out the focusing from the infinite distance object to the close distance object. Meanwhile, by setting the upper limit value of the conditional expression (10) to 2.80, it is possible to secure the advantageous effect of the present embodiment more surely. Further, in order to secure the advantageous effect of the present embodiment more surely, it is preferable to set the upper limit value of the conditional expression (10) to 2.60.

On the other hand, when the value of |fF2|/ft| in the conditional expression (10) of the variable magnification optical system according to the present embodiment, is equal to or falls below the lower limit value, refractive power of the focusing lens group disposed in the most image side in the image side focusing lens group, becomes strong, and it becomes difficult to suppress variations in spherical aberration and other various aberrations upon carrying out the focusing from the infinite distance object to the close distance object. Meanwhile, by setting the lower limit value of the conditional expression (10) to 0.12, it is possible to secure the advantageous effect more surely. Further, in order to secure the advantageous effect of the present embodiment more surely, it is preferable to set the lower limit value of the conditional expression (10) to 0.15.

In the variable magnification optical system according to the present embodiment, it is desirable that the following conditional expression (11) is satisfied:

$$|\beta WF1|/|\beta WF2|<4.00 \qquad (11)$$

where |WF1 denotes a transverse magnification of said object side focusing lens group in the wide angle end state upon focusing on an infinite distance object, and βWF2 denotes a transverse magnification of the focusing lens group disposed in the most object side in said image side focusing lens group in the wide angle end state upon focusing on the infinite distance object.

The conditional expression (11) defines a ratio of a transverse magnification of the object side focusing lens group in the wide angle end state upon focusing on an infinite distance object, relative to a transverse magnification of the focusing lens group disposed in the most object side in the image side focusing lens group in the wide angle end state upon focusing on the infinite distance object. With satisfying the conditional expression (11), the variable magnification optical system according to the present embodiment can effectively suppress variations in spherical aberration and other various aberrations upon carrying out the focusing in the wide angle end state from the infinite distance object to the close distance object.

When the value of |βWF1|/|βWF2| is equal to or exceeds the upper limit value of the conditional expression (11) of the variable magnification optical system according to the present embodiment, the transverse magnification of the object side focusing lens group in the wide angle end state upon focusing on an infinite distance object, relative to the transverse magnification of the focusing lens group disposed in the most object side in the image side focusing lens group in the wide angle end state upon focusing on the infinite distance object, becomes large, and it becomes difficult to suppress variations in spherical aberration and other various aberrations, upon carrying out the focusing in the wide angle end state from the infinite distance object to the close distance object.

Meanwhile, by setting the upper limit value of the conditional expression (11) to 3.50, it is possible to secure the advantageous effect of the present embodiment more surely. Further, in order to secure the advantageous effect of the present embodiment more surely, it is preferable to set the upper limit value of the conditional expression (11) to 3.00. Furthermore, it is preferable to set the upper limit value of the conditional expression (11) to 2.50, further to 2.00, further to 1.50 and further to 1.20.

In the variable magnification optical system according to the present embodiment, it is desirable that the following conditional expression (12) is satisfied:

$$||\beta Rw|/|\beta Rt|<4.00 \qquad (12)$$

where βRw denotes a composite transverse magnification from said object side focusing lens group to the image plane in the wide angle end state upon focusing on an infinite distance object, and βRt denotes a composite transverse magnification from the object side focusing lens group to the image plane in the telephoto end state upon focusing on the infinite distance object.

The conditional expression (12) defines a ratio of a composite transverse magnification from the object side focusing lens group to the image plane in the wide angle end state upon focusing on an infinite distance object, relative to a composite transverse magnification from the object side focusing lens group to the image plane in the telephoto end state upon focusing on the infinite distance object. With satisfying the conditional expression (12), the variable magnification optical system according to the present embodiment can effectively suppress variations in spherical aberration and other various aberrations upon carrying out the focusing in the wide angle end state from the infinite distance object to the close distance object.

When the value of |βWF1|/|βWF2| is equal to or exceeds the upper limit value of the conditional expression (12) of the variable magnification optical system according to the present embodiment, the composite transverse magnification from the object side focusing lens group to the image plane in the wide angle end state upon focusing on an infinite distance object, relative to the composite transverse magnification from the object side focusing lens group to the image plane in the telephoto end state upon focusing on the infinite distance object, becomes large, and it becomes difficult to suppress variations in spherical aberration and other various aberrations upon carrying out the focusing in the wide angle end state from the infinite distance object to the close distance object.

Meanwhile, by setting the upper limit value of the conditional expression (12) to 3.50, it is possible to secure the advantageous effect of the present embodiment more surely. Further, in order to secure the advantageous effect of the present embodiment more surely, it is preferable to set the upper limit value of the conditional expression (12) to 3.00. Furthermore, it is preferable to set the upper limit value of the conditional expression (12) to 2.60, further to 2.20 and further to 1.90.

In the variable magnification optical system according to the present embodiment, it is desirable that the following conditional expression (13) is satisfied:

$$15.0°<\omega w<85.0° \qquad (13)$$

where ωw denotes a half angle of view of said variable magnification optical system in the wide angle end state.

The conditional expression (13) defines a condition for defining a most optimum value of an angle of view in the wide angle end state. With satisfying the conditional expression (13), the variable magnification optical system according to the present embodiment can superbly correct various aberrations such as coma aberration, distortion, curvature of field and the like, while having wide angle of view.

In order to secure the advantageous effect of the present embodiment surely, it is preferable to set the upper limit value of the conditional expression (13) to 80.0°. Further, it is preferable to set the upper limit value of the conditional expression (13) to 75.0°, further to 70.0° and further to 65.0°.

In order to secure the advantageous effect of the present embodiment surely, it is preferable to set the lower limit value of the conditional expression (13) to 16.0°. Further, it is preferable to set the lower limit value of the conditional expression (13) to 17.0°, further to 35.0°, further to 37.0°, further to 39.0°, further to 40.0°, and further to 42.0°.

Further, an optical apparatus of the present embodiment is equipped with the variable magnification optical system having the above described configuration, so it is possible to realize an optical apparatus which can suppress variations in aberrations upon varying the magnification from the wide angle end state to the telephoto end state, and which can suppress superbly variations in aberrations upon carrying out the focusing from the infinite distance object to the close distance object.

Further, a method for manufacturing a variable magnification optical system according to the present embodiment, is a method for manufacturing a variable magnification optical system which comprises, in order from an object side, a first lens group and a plurality of lens groups; comprising the steps of:

constructing such that, upon varying a magnification, a distance between said first lens group and said plurality of lens groups is varied, and distances between respective lens groups in said plurality of lens groups are varied;

constructing such that said plurality of lens groups comprise an object side focusing lens group which is moved upon carrying out focusing and at least one image side focusing lens group disposed in a more image side than said object side focusing lens group and moved with a trajectory differing from that of said object side focusing lens group upon carrying out the focusing; and constructing such that the following conditional expressions (1) and (2) are satisfied:

$$0.60 < (-f1N)/|f1| < 1.80 \qquad (1)$$

$$0.2 < BFw/fw < 2.0 \qquad (2)$$

where f1N denotes a focal length of a lens which has a strongest negative refractive power in lenses in said first lens group, f1 denotes a focal length of said first lens groups, BFw denotes a back focus of said variable magnification optical system in the wide angle end state, and fw denotes a focal length of said variable magnification optical system in the wide angle end state.

Thus, it is possible to manufacture the variable magnification optical system which can suppress superbly variations in aberrations upon varying the magnification from the wide angle end state to the telephoto end state and upon carrying out the focusing from the infinite distance object to the close distance object.

Hereinafter, the variable magnification optical systems relating to numerical examples of the present embodiment will be explained with reference to the accompanying drawings.

FIRST EXAMPLE

FIG. 1 is a sectional view of a variable magnification optical system according to a First Example. Meanwhile, in FIG. 1 and FIG. 4, FIG. 7, FIG. 10, FIG. 13, FIG. 16, FIG. 19, FIG. 22, FIG. 25, FIG. 28, and FIG. 31 described later, arrows show movement trajectories of the respective lens groups upon varying magnification from a wide angle end state (W) to a telephoto end state (T).

The variable magnification optical system according to the present Example is composed of, in order from an object side, a first lens group G1 having negative refractive power, a second lens group G2 having positive refractive power, a third lens group G3 having positive refractive power, an aperture stop S, a fourth lens group G4 having negative refractive power, a fifth lens group G5 having positive refractive power, a sixth lens group G6 having positive refractive power and a seventh lens group G7 having negative refractive power.

The first lens group G1 consists of, in order from the object side, a negative meniscus lens L11 having a convex surface facing the object side, a cemented negative lens constructed by a double concave negative lens L12 cemented with a positive meniscus lens L13 having a convex surface facing the object side.

The second lens group G2 consists of a cemented positive lens constructed by a double convex positive lens L21 cemented with a negative meniscus lens L22 having a concave surface facing the object side.

The third lens group G3 consists of a cemented positive lens constructed by a negative meniscus lens L31 having a convex surface facing the object side cemented with a double convex positive lens L32.

The fourth lens group G4 consists of, in order from the object side, a cemented negative lens constructed by a double concave negative lens L41 cemented with a positive meniscus lens L42 having a convex surface facing the object side, and a positive meniscus lens L43 having a convex surface facing the object side.

The fifth lens group G5 consists of a cemented positive lens constructed by a double convex positive lens L51 cemented with a negative meniscus lens L52 having a concave surface facing the object side.

The sixth lens group G6 consists of a double convex positive lens L61.

The seventh lens group G7 consists of a negative meniscus lens L71 having a concave surface facing the object side.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the optical system according to the present Example, focusing from an infinite distance object to a close distance object is carried out by moving, as focusing lens groups, the fifth lens group G5 along the optical axis toward the object side and the sixth lens group G6 along the optical axis toward the object side with a different trajectory from that of the fifth lens group G5.

Table 1 below shows various values of the variable magnification optical system relating to the present Example.

In Table 1, "f" denotes a focal length, and "BF" denotes a back focus, that is, a distance along the optical axis from the most image side lens surface to the image plane I.

In [Surface Data], "m" denotes an order of an optical surface counted from the object side, "r" denotes a radius of curvature, "d" denotes a surface-to-surface distance, that is, an interval from an n-th surface to an (n+1)-th surface, where n is an integer, "nd" denotes refractive index for d-line (wavelength λ=587.6 nm) and "vd" denotes an Abbe number for d-line (wavelength λ=587.6 nm). Further, "OP" denotes an object surface, "Variable" denotes a variable surface-to-surface distance, "S" denotes an aperture stop, and "I" denotes an image plane. Meanwhile, radius of curvature r=∞ denotes a plane surface, and refractive index of the air nd=1.00000 is omitted. In addition, an aspherical surface is expressed by attaching "*" to the surface number, and in the column of the radius of curvature "r", a paraxial radius of curvature is shown.

In [Aspherical Data], with respect to an aspherical surface shown in [Surface Data], an aspherical surface coefficient and a conical coefficient are shown in the case where the aspherical surface is exhibited by the following expression:

$$x = (h^2/r)/[1 + \{1 - \kappa(h/r)^2\}^{1/2}] + A4h^4 + A6h^6 + A8h^8 + A10h^{10}$$

where "h" denotes a height in the direction perpendicular to the optical axis, "x" denotes a sag amount that is a distance along the optical axis from the tangent surface at the vertex of the aspherical surface to the aspherical surface at the height "h"; "κ" denotes a conical coefficient; "A4", "A6", "A8" and "A10" denote respective aspherical coefficients, and "r" denotes a paraxial radius of curvature that is a radius of curvature of a reference sphere. "E-n", where n is an integer, denotes "×10$^{-n}$", for example, "1.234E−05" denotes "1.234×10$^{-5}$". Second order aspherical coefficient "A2" is 0 and omitted.

In [Various Data], "f" denotes a total length of the entire lens system, "FNO" denotes an F-number, "2ω" denotes an angle of view (unit "°"), "Ymax" denotes a maximum image height, and "TL" denotes a total length of the variable magnification optical system according to the present Example, that is, a distance along the optical axis from the first lens surface to the image plane I, "β" denotes an imaging magnification between the object and the image, "d0" denotes a distance along the optical axis from the object plane OP to the first surface, d0=0.000 corresponds to "upon focusing on an infinite distance object", d=641.690 corresponds to "upon focusing on a close distance object", and "dn" denotes a variable distance from the n-th surface to the (n+1)-th surface. Meanwhile, regarding "f" and "β", "f" denotes an infinite distance and "β" denotes a close distance, "W" denotes a wide angle end state, "M" denotes an intermediate focal length state, "T" denotes a tele photo end state.

In [Lens Group Data], a starting surface ST and a focal length f of each lens group are shown.

In [Values for Conditional Expressions], values corresponding to respective conditional expressions of the variable magnification optical system according to the present Example, are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

Meanwhile, the explanation of reference symbols in Table 1 described above, is the same in Tables for the other Examples described herein later.

TABLE 1

First Example

[Surface Data]

| m | r | d | nd | νd |
|---|---|---|---|---|
| OP | ∞ | | | |
| 1 | 270.0000 | 2.900 | 1.74389 | 49.53 |
| *2 | 33.2562 | 13.215 | | |
| 3 | −1900.2102 | 2.100 | 1.59349 | 67.00 |
| 4 | 35.8236 | 7.700 | 2.00100 | 29.12 |
| 5 | 79.6938 | Variable | | |
| 6 | 271.3181 | 7.400 | 1.83481 | 42.73 |
| 7 | −36.9149 | 1.500 | 1.75520 | 27.57 |
| 8 | −164.0000 | Variable | | |
| 9 | 39.7511 | 1.500 | 1.85000 | 27.03 |
| 10 | 25.6246 | 10.800 | 1.59319 | 67.90 |
| 11 | −134.6401 | Variable | | |
| 12 (S) | ∞ | 2.350 | | |
| 13 | −65.9523 | 1.300 | 1.80100 | 34.92 |
| 14 | 18.5797 | 4.700 | 1.90366 | 31.27 |
| 15 | 51.6074 | 0.919 | | |
| 16 | 45.9293 | 2.500 | 1.94595 | 17.98 |
| 17 | 120.0000 | Variable | | |
| 18 | 47.5350 | 7.100 | 1.48749 | 70.31 |
| 19 | −24.2409 | 1.300 | 1.69895 | 30.13 |
| 20 | −74.7188 | Variable | | |
| 21 | 113.0000 | 4.200 | 1.58913 | 61.15 |
| *22 | −108.0000 | Variable | | |
| *23 | −30.5616 | 1.500 | 1.58913 | 61.15 |
| 24 | −81.9388 | BF | | |
| I | ∞ | | | |

[Aspherical Data]
m:2
κ = 0.0000
A4 = 2.97162E−06
A6 = 1.62510E−09
A8 = 2.42658E−13
A10 = 4.56491E−16
A12 = 8.02650E−19
m:22
κ = 1.0000
A4 = 8.43912E−06
A6 = 6.68890E−10
A8 = 1.69267E−11
A10 = −5.36609E−14
m:23

TABLE 1-continued

First Example

κ = 1.0000
A4 = 8.13845E−06
A6 = −4.05875E−09
A8 = 1.66491E−11
A10 = −5.84964E−14

[Various Data]
Variable magnification ratio 2.99

|       | W      | M      | T      |        |         |         |
| ----- | ------ | ------ | ------ | ------ | ------- | ------- |
| f     | 22.7   | 50.0   | 67.9   |        |         |         |
| FNO   | 2.92   | 2.92   | 2.92   |        |         |         |
| 2ω    | 91.10  | 45.68  | 33.64  |        |         |         |
| Ymax  | 19.32  | 21.60  | 21.60  |        |         |         |
| TL    | 188.45 | 157.95 | 163.95 |        |         |         |
| BF    | 11.75  | 20.19  | 25.26  |        |         |         |
|       | W      | M      | T      | W      | M       | T       |
| f, β  | 22.700 | 50.000 | 67.900 | −0.033 | −0.033  | −0.033  |
| d0    | 0.000  | 0.000  | 0.000  | 641.690| 1469.10 | 2002.79 |
| d5    | 63.985 | 10.998 | 3.100  | 63.985 | 10.998  | 3.100   |
| d8    | 1.000  | 1.763  | 1.000  | 1.000  | 1.763   | 1.000   |
| d11   | 1.900  | 12.973 | 26.707 | 1.900  | 12.973  | 26.707  |
| d17   | 20.431 | 12.752 | 12.052 | 20.013 | 11.839  | 10.654  |
| d20   | 8.701  | 16.480 | 16.780 | 8.112  | 16.125  | 16.831  |
| d22   | 7.699  | 9.815  | 6.069  | 8.705  | 11.084  | 7.415   |

[Lens Group Data]

| Group | ST | f       |
| ----- | -- | ------- |
| 1     | 1  | −46.132 |
| 2     | 6  | 102.733 |
| 3     | 9  | 64.434  |
| 4     | 12 | −89.031 |
| 5     | 18 | 92.237  |
| 6     | 21 | 94.399  |
| 7     | 23 | −83.639 |

[Values for Conditional Expressions]

(1)  $(-f1N)/|f1| = 1.111$
(2)  $BFw/fw = 0.518$
(3)  $(-fRN)/ft = 1.232$
(4)  $MTF1/MTF2 = 1.038$
(5)  $(-fFN)/|fF| = 0.563$
(6)  $nP/nN = 0.876$
(7)  $|fF1|/|f1| = 1.999$
(8)  $|fF2|/|f1| = 2.046$
(9)  $|fF1|/ft = 1.358$
(10) $|fF2|/ft = 1.390$
(11) $|βWF1|/|βWF2| = 0.719$
(12) $|βRw|/|βRt| = 1.616$
(13) $ωw = 45.55°$

FIGS. 2A, 2B and 2C are graphs showing various aberrations upon focusing on an infinite distance object, respectively, in the wide angle end state, in the intermediate focal length state and in the telephoto end state, of the variable magnification optical system according to the First Example.

FIGS. 3A, 3B and 3C are graphs showing various aberrations upon focusing on a close distance object, respectively, in the wide angle end state, in the intermediate focal length state and in the telephoto end state, of the variable magnification optical system according to the First Example.

In the graphs showing aberrations as drawn in FIG. 2 and FIG. 3, "FNO" denotes an F-number, "NA" denotes a numerical aperture, and "Y" denotes an image height. In graphs showing spherical aberration, the value of the numerical aperture or F-number corresponding to the maximum aperture is shown. In graphs showing astigmatism and distortion, the maximum value of the image height is shown. In graphs showing coma aberration, the value for each image height is shown. "d" denotes d-line (wavelength λ=587.6 nm), and "g" denotes g-line (wavelength λ=435.8 nm). In graphs showing astigmatism, a solid line indicates a sagittal image plane, and a broken line indicates a meridional image plane. Meanwhile, in graphs showing various aberrations in the other Examples as described below, the same symbols as in the present Example are employed.

As is apparent from the above-mentioned graphs showing various aberrations, the variable magnification optical system relating to the present Example can correct superbly various aberrations over the wide angle end state to the telephoto end state and has excellent imaging performance, and further has excellent imaging performance even upon focusing on a close distance object.

SECOND EXAMPLE

Figure 4:
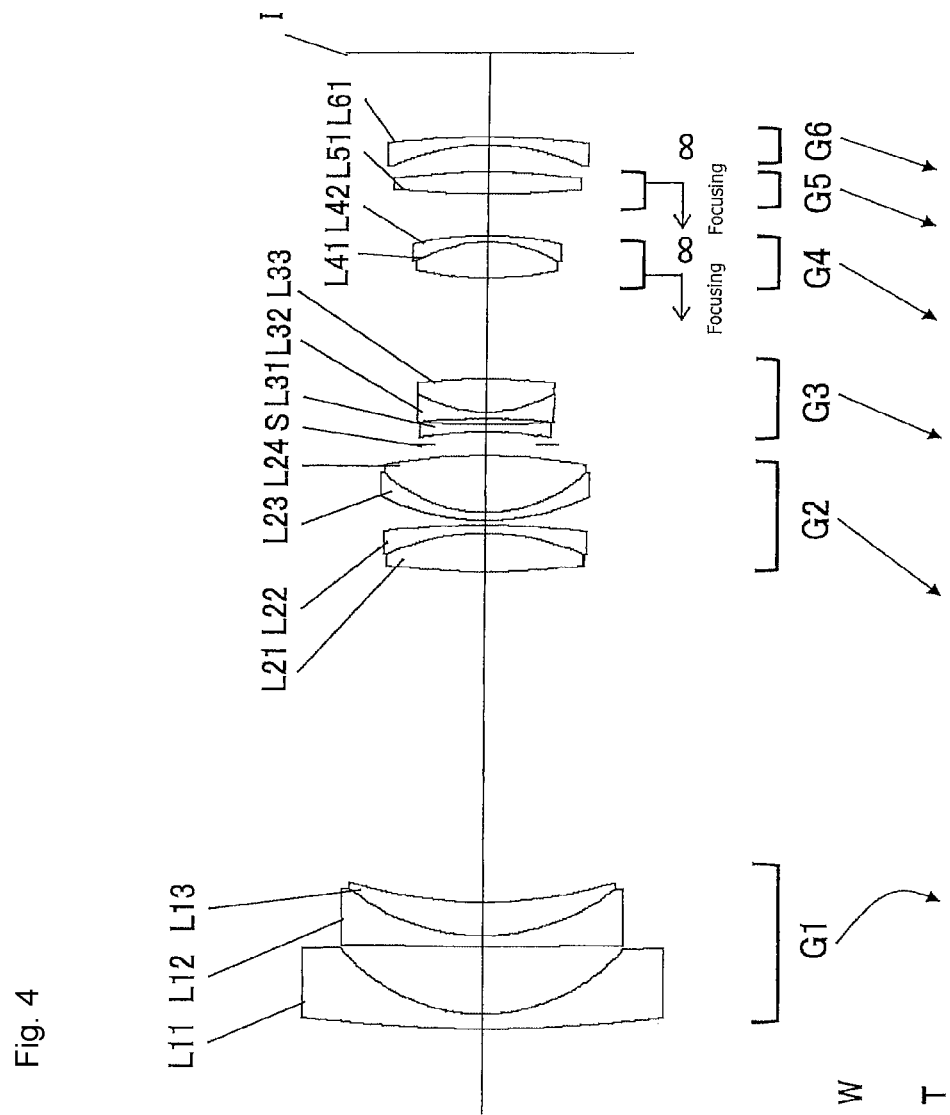
FIG. 4 is a sectional view of a variable magnification optical system according to a Second Example.

FIG. 4 is a view showing a lens configuration of a variable magnification optical system according to a Second Example.

The variable magnification optical system according to the present Example is composed of, in order from an object side, a first lens group G1 having negative refractive power, a second lens group G2 having positive refractive power, an aperture stop S, a third lens group G3 having negative refractive power, a fourth lens group G4 having positive refractive power, a fifth lens group G5 having positive refractive power, and a sixth lens group G6 having negative refractive power.

The first lens group G1 consists of, in order from the object side, a negative meniscus lens L11 having a convex surface facing the object side, and a cemented negative lens constructed by a negative meniscus lens L12 having a convex surface facing the object side cemented with a positive meniscus lens L13 having a convex surface facing the object side.

The second lens group G2 consists of, in order from the object side, a cemented positive lens constructed by a double convex positive lens L21 cemented with a negative meniscus lens L22 having a concave surface facing the object side, and a cemented positive lens constructed by a negative meniscus lens L23 having a convex surface facing the object side cemented with a double convex positive lens L24.

The third lens group G3 consists of, in order from the object side, a double concave negative lens L31, and a cemented positive lens constructed by a double concave negative lens L32 cemented with a double convex positive lens L33.

The fourth lens group G4 consists of a cemented positive lens constructed by a double convex positive lens L41 cemented with a negative meniscus lens L42 having a concave surface facing the object side.

The fifth lens group G5 consists of a double convex positive lens L51.

The sixth lens group G6 consists of a negative meniscus lens L61 having a concave surface facing the object side.

In the variable magnification optical system according to the present Example, upon varying magnification between the wide angle end state and the telephoto end state, all lens groups of the first lens group G1 to the sixth lens group G6 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, and a distance between the fifth lens group G5 and the sixth lens group G6, are varied.

In the optical system according to the present Example, focusing from an infinite distance object to a close distance object is carried out by moving, as focusing lens groups, the fourth lens group G4 along the optical axis toward the object side and the fifth lens group G5 along the optical axis toward the object side with a different trajectory from that of the fourth lens group G4.

Table 2 below shows various values of the variable magnification optical system relating to the present Example.

TABLE 2

| Second Example | | | | |
|---|---|---|---|---|
| [Surface Data] | | | | |
| m | r | d | nd | νd |
| OP | ∞ | | | |
| 1 | 217.2239 | 2.900 | 1.74389 | 49.53 |
| *2 | 30.2414 | 13.112 | | |
| 3 | 1223.5572 | 2.100 | 1.59349 | 67.00 |
| 4 | 35.8181 | 6.436 | 2.00069 | 25.46 |
| 5 | 72.5839 | Variable | | |
| 6 | 128.9112 | 7.447 | 1.81600 | 46.59 |
| 7 | −39.6982 | 1.500 | 1.85000 | 27.03 |
| 8 | −142.9408 | 1.000 | | |
| 9 | 40.8283 | 1.500 | 1.80518 | 25.45 |
| 10 | 25.0719 | 10.948 | 1.60300 | 65.44 |
| 11 | −92.3055 | Variable | | |
| 12 (S) | ∞ | 2.486 | | |
| 13 | −55.5201 | 1.300 | 1.90265 | 35.72 |
| 14 | 121.6217 | 1.190 | | |
| 15 | −124.4061 | 1.300 | 1.67270 | 32.18 |
| 16 | 22.4038 | 6.400 | 1.80809 | 22.74 |
| 17 | −97.2368 | Variable | | |
| 18 | 62.1388 | 6.900 | 1.48749 | 70.32 |
| 19 | −23.2151 | 1.300 | 1.78472 | 25.64 |
| 20 | −50.9732 | Variable | | |
| 21 | 186.2633 | 4.200 | 1.58913 | 61.15 |
| *22 | −79.5614 | Variable | | |
| *23 | −33.8149 | 1.500 | 1.58913 | 61.15 |
| 24 | −131.2649 | BF | | |
| I | ∞ | | | |

[Aspherical Surface Data]
m:2
κ = 0.0000
A4 = 3.46899E−06
A6 = 3.81982E−09
A8 = −6.40834E−12
A10 = 1.09738E−14
A12 = −4.82160E−18
m:22
κ = 1.0000
A4 = 6.88818E−06
A6 = −6.09818E−10
A8 = 8.44660E−12
A10 = −2.63571E−14
m:23
κ = 1.0000
A4 = 8.06346E−06
A6 = −8.60497E−09

TABLE 2-continued

Second Example

A8 = 2.28581E−11
A10 = −5.12367E−14
[Various Data]
Variable magnification ratio 2.99

|  | W | M | T |  |  |  |
|---|---|---|---|---|---|---|
| f | 22.7 | 50.0 | 67.9 |  |  |  |
| FNO | 2.92 | 2.92 | 2.92 |  |  |  |
| 2ω | 91.24 | 45.92 | 33.78 |  |  |  |
| Ymax | 19.34 | 21.60 | 21.60 |  |  |  |
| TL | 188.49 | 155.49 | 159.75 |  |  |  |
| BF | 16.19 | 19.69 | 24.21 |  |  |  |
|  | W | M | T | W | M | T |
| f, β | 22.700 | 50.000 | 67.900 | −0.033 | −0.033 | −0.033 |
| d0 | 0.000 | 0.000 | 0.000 | 643.745 | 1470.35 | 2002.57 |
| d5 | 63.857 | 10.035 | 2.501 | 63.857 | 10.035 | 2.501 |
| d11 | 2.202 | 10.972 | 22.702 | 2.202 | 10.972 | 22.702 |
| d17 | 19.524 | 10.852 | 10.688 | 19.122 | 9.959 | 9.322 |
| d20 | 8.007 | 19.445 | 19.346 | 7.507 | 19.082 | 19.339 |
| d22 | 5.193 | 10.974 | 6.787 | 6.095 | 12.231 | 8.161 |

[Lens Group Data]

| Group | ST | f |
|---|---|---|
| 1 | 1 | −42.007 |
| 2 | 6 | 36.073 |
| 3 | 12 | −74.292 |
| 4 | 18 | 96.221 |
| 5 | 21 | 95.186 |
| 6 | 23 | −77.759 |

[Values for Conditional Expressions]
(1)   (−f1N)/|f1| = 1.132
(2)   BFw/fw = 0.713
(3)   (−fRN)/ft = 1.145
(4)   MTF1/MTF2 = 0.995
(5)   (−fFN)/|fF| = 0.583
(6)   nP/nN = 0.833
(7)   |fF1|/|f1| = 2.291
(8)   |fF2|/|f1| = 2.266
(9)   |fF1|/ft = 1.147
(10)  |fF2|/ft = 1.402
(11)  |βWF1|/|βWF2| = 0.762
(12)  |βRw|/|βRt| = 1.663
(13)  ωw = 45.62°

FIG. 5A, FIG. 5B and FIG. 5C are graphs showing various aberrations upon focusing on an infinite distance object, respectively, in the wide angle end state, in the intermediate focal length state and in the telephoto end state, of the variable magnification optical system according to the Second Example.

FIG. 6A, FIG. 6B and FIG. 6C are graphs showing various aberrations upon focusing on a close distance object, respectively, in the wide angle end state, in the intermediate focal length state and in the telephoto end state, of the variable magnification optical system according to the Second Example.

As is apparent from the above-mentioned graphs showing various aberrations, the variable magnification optical system relating to the present Example can correct superbly various aberrations over the wide angle end state to the telephoto end state and has excellent imaging performance, and further has excellent imaging performance even upon focusing on a close distance object.

THIRD EXAMPLE

Figure 7:
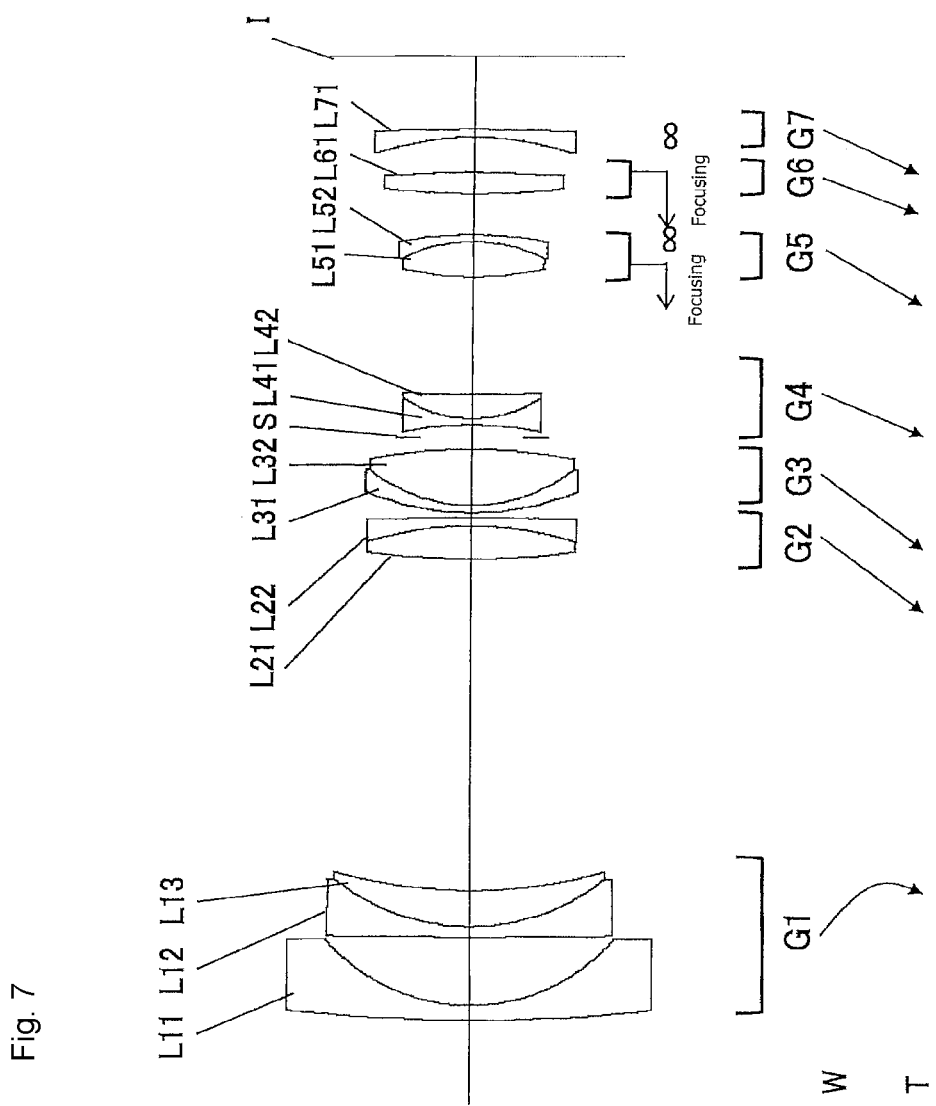
FIG. 7 is a sectional view of a variable magnification optical system according to a Third Example.

FIG. 7 is a view showing a lens configuration of a variable magnification optical system according to a Third Example of the present application.

The variable magnification optical system according to the present Example is composed of, in order from an object side, a first lens group G1 having negative refractive power, a second lens group G2 having positive refractive power, a third lens group G3 having positive refractive power, an aperture stop S, a fourth lens group G4 having negative refractive power, a fifth lens group G5 having positive refractive power, a sixth lens group G6 having positive refractive power, and a seventh lens group G7 having negative refractive power.

The first lens group G1 consists of, in order from the object side, a negative meniscus lens L11 having a convex surface facing the object side, and a cemented negative lens constructed by a negative meniscus lens L12 having a convex surface facing the object side cemented with a positive meniscus lens L13 having a convex surface facing the object side.

The second lens group G2 consists of a cemented positive lens constructed by a double convex positive lens L21 cemented with a negative meniscus lens L22 having a concave surface facing the object.

The third lens group G3 consists of a cemented positive lens constructed by a negative meniscus lens L31 having a convex surface facing the object side cemented with a double convex positive lens L32.

The fourth lens group G4 consists of a cemented negative lens constructed by a double concave negative lens L41 cemented with a positive meniscus lens L42 having a convex surface facing the object side.

The fifth lens group G5 consists of a cemented positive lens constructed by a double convex positive lens L51 cemented with a negative meniscus lens L52 having a concave surface facing the object side.

The sixth lens group G6 consists of a double convex positive lens L61.

The seventh lens group G7 consists of a negative meniscus lens L71 having a concave surface facing the object side.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the variable magnification optical system according to the present Example, focusing from an infinite distance object to a close distance object is carried out by moving, as focusing lens groups, the fifth lens group G5 along the optical axis toward the object side and the sixth lens group G6 along the optical axis toward the object side with a different trajectory from the fifth lens group G5.

Table 3 below shows various values of the variable magnification optical system relating to the present Example.

TABLE 3

Third Example

[Surface Data]

| m OP | r ∞ | d | nd | vd |
|---|---|---|---|---|
| 1 | 259.2015 | 2.900 | 1.74389 | 49.53 |
| *2 | 30.9799 | 13.410 | | |
| 3 | 1201.6909 | 2.100 | 1.59349 | 66.99 |
| 4 | 36.4155 | 6.936 | 2.00100 | 29.14 |
| 5 | 81.5436 | Variable | | |
| 6 | 124.3745 | 6.555 | 1.80400 | 46.60 |
| 7 | −55.7538 | 1.500 | 1.72825 | 28.38 |
| 8 | −633.0468 | Variable | | |
| 9 | 44.9659 | 1.500 | 1.85000 | 27.03 |
| 10 | 27.3358 | 10.990 | 1.59319 | 67.90 |
| 11 | −89.5168 | Variable | | |
| 12 (S) | ∞ | 2.562 | | |
| 13 | −58.2664 | 1.300 | 1.68893 | 31.16 |
| 14 | 20.8969 | 4.742 | 1.80809 | 22.74 |
| 15 | 201.5296 | Variable | | |
| 16 | 52.2605 | 6.900 | 1.48749 | 70.31 |
| 17 | −26.1209 | 1.300 | 1.69895 | 30.13 |
| 18 | −72.7540 | Variable | | |
| 19 | 130.0000 | 4.200 | 1.58913 | 61.15 |
| *20 | −100.4826 | Variable | | |
| *21 | −44.3630 | 1.500 | 1.58913 | 61.15 |
| 22 | −412.9422 | BF | | |
| I | ∞ | | | |

[Aspherical Surface Data]
m:2
κ = 0.0000
A4 = 3.40299E−06
A6 = 1.78453E−09
A8 = −2.01869E−13
A10 = 1.07948E−15
A12 = 2.74510E−19
m:20
κ = 1.0000
A4 = 8.80591E−06
A6 = −1.07404E−09
A8 = 1.74456E−11
A10 = −2.66494E−14
m:21
κ = 1.0000
A4 = 6.66893E−06
A6 = −5.20154E−09
A8 = 5.00802E−12
A10 = −7.75803E−15

[Various Data]
Variable magnification ratio 2.99

| | W | M | T | | | |
|---|---|---|---|---|---|---|
| f | 22.7 | 50.0 | 67.9 | | | |
| FNO | 2.92 | 2.92 | 2.92 | | | |
| 2ω | 91.30 | 45.88 | 33.64 | | | |
| Ymax | 19.36 | 21.60 | 21.60 | | | |
| TL | 188.49 | 156.49 | 165.34 | | | |
| BF | 14.19 | 20.41 | 24.73 | | | |
| | W | M | T | W | M | T |
| f, β | 22.700 | 50.000 | 67.900 | −0.033 | −0.033 | −0.033 |
| d0 | 0.000 | 0.000 | 0.000 | 643.522 | 1473.82 | 2010.17 |

TABLE 3-continued

Third Example

| | | | | | | |
|---|---|---|---|---|---|---|
| d5 | 64.909 | 10.197 | 2.263 | 64.909 | 10.197 | 2.263 |
| d8 | 1.000 | 1.000 | 1.000 | 1.000 | 1.000 | 1.000 |
| d11 | 2.200 | 12.573 | 28.831 | 2.200 | 12.573 | 28.831 |
| d15 | 22.896 | 13.304 | 11.893 | 22.388 | 12.281 | 10.318 |
| d18 | 8.047 | 19.430 | 19.884 | 7.707 | 19.294 | 20.259 |
| d20 | 6.853 | 11.181 | 8.344 | 7.701 | 12.340 | 9.543 |

[Lens Group Data]

| Group | ST | f |
|---|---|---|
| 1 | 1 | −45.334 |
| 2 | 6 | 112.275 |
| 3 | 9 | 63.547 |
| 4 | 12 | −98.234 |
| 5 | 16 | 92.914 |
| 6 | 19 | 96.856 |
| 7 | 21 | −84.494 |

[Values for Conditional Expressions]

| | | |
|---|---|---|
| (1) | $(-f1N)/|f1|$ | = 1.049 |
| (2) | $BFw/fw$ | = 0.625 |
| (3) | $(-fRN)/ft$ | = 1.244 |
| (4) | $MTF1/MFT2$ | = 1.313 |
| (5) | $(-fFN)/|fF|$ | = 0.635 |
| (6) | $nP/nN$ | = 0.876 |
| (7) | $|fF1|/|f1|$ | = 2.050 |
| (8) | $|fF2|/|f1|$ | = 2.137 |
| (9) | $|fF1|/ft$ | = 1.368 |
| (10) | $|fF2|/ft$ | = 1.426 |
| (11) | $|\beta WF1|/|\beta WF2|$ | = 0.723 |
| (12) | $|\beta Rw|/|\beta Rt|$ | = 2.084 |
| (13) | $\omega w$ | = 45.65° |

FIG. 8A, FIG. 8B and FIG. 8C are graphs showing various aberrations upon focusing on an infinite distance object, respectively, in the wide angle end state, in the intermediate focal length state and in the telephoto end state, of the variable magnification optical system according to the Third Example.

FIG. 9A, FIG. 9B and FIG. 9C are graphs showing various aberrations upon focusing on a close distance object, respectively, in the wide angle end state, in the intermediate focal length state and in the telephoto end state, of the variable magnification optical system according to the Third Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

FOURTH EXAMPLE

Figure 10:
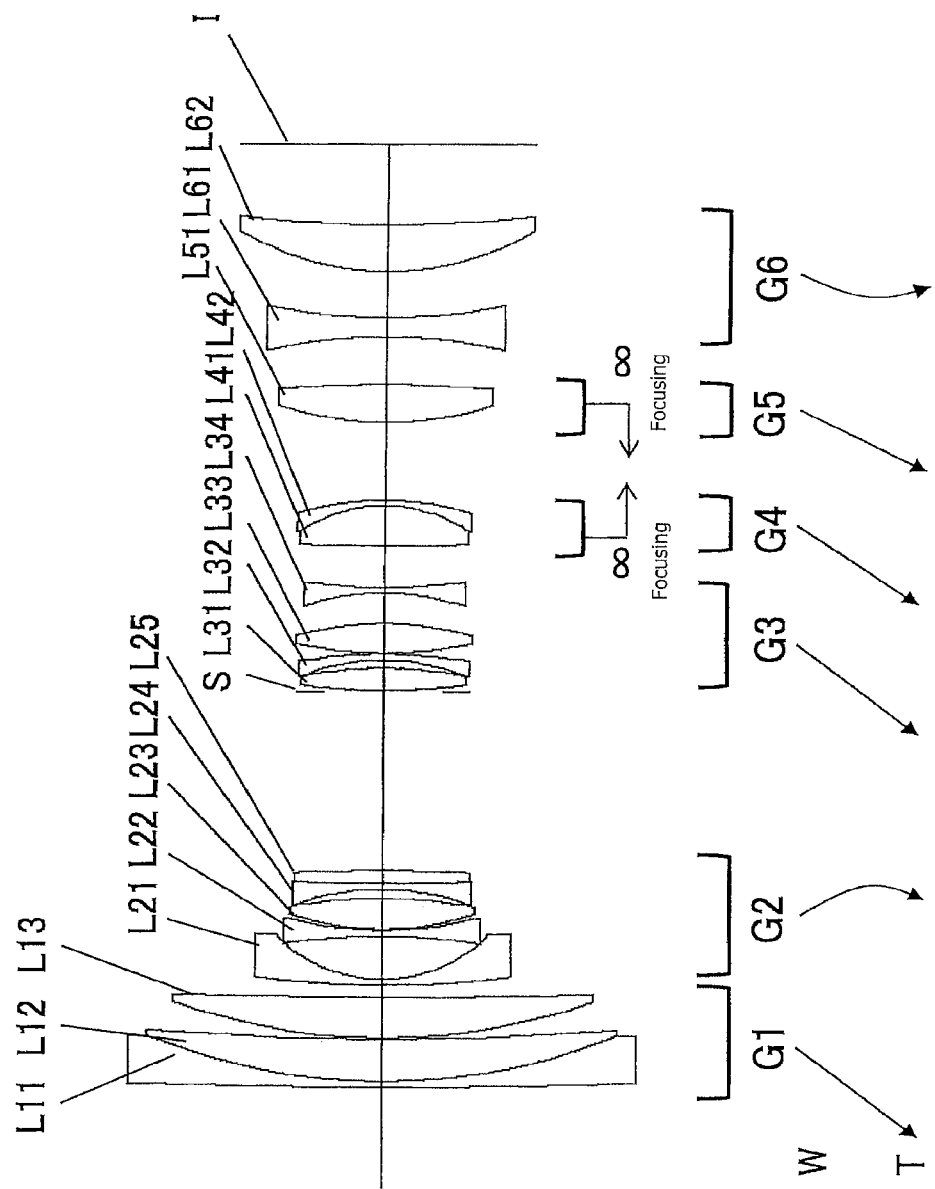
FIG. 10 is a sectional view of a variable magnification optical system according to a Fourth Example.

FIG. 10 is a view showing a lens configuration of of a variable magnification optical system according to a Fourth Example of the present application.

The variable magnification optical system according to the present Example is composed of, in order from an object side, a first lens group G1 having positive refractive power, a second lens group G2 having negative refractive power, an aperture stop S, a third lens group G3 having positive refractive power, a fourth lens group G4 having positive refractive power, a fifth lens group G5 having positive refractive power, and a sixth lens group G6 having negative refractive power.

The first lens group G1 consists of, in order from the object side, a cemented negative lens constructed by a negative meniscus lens L11 having a convex surface facing the object side cemented with a positive meniscus lens L12 having a convex surface facing the object side, and a positive meniscus lens L13 having a convex surface facing the object side.

The second lens group G2 consists of, in order from the object side, a negative meniscus lens L21 having a convex surface facing the object side, a double concave negative lens L22, a double convex positive lens L23 and a cemented negative lens constructed by a double concave negative lens L24 cemented with a double convex positive lens L25.

The third lens group G3 consists of, in order from the object side, a double convex positive lens L31, a negative meniscus lens L32 having a concave surface facing the object side, a double convex positive lens L33 and a double concave negative lens L34.

The fourth lens group G4 consists of a cemented positive lens constructed by a double convex positive lens L41 cemented with a negative meniscus lens L42 having a concave surface facing the object side.

The fifth lens group G5 consists of a double convex positive lens L51.

The sixth lens group G6 consists of, in order from the object side, a double concave negative lens L61, and a positive meniscus lens L62 having a convex surface facing the object side.

In the variable magnification optical system according to the present Example, upon varying magnification between the wide angle end state and the telephoto end state, all lens groups of the first lens group G1 to the sixth lens group G6 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, and a distance between the fifth lens group G5 and the sixth lens group G6, are varied.

In the variable magnification optical system according to the present Example, focusing from an infinite distance object to a close distance object is carried out by moving, as focusing lens groups, the fourth lens group G4 along the optical axis toward the image side and the fifth lens group G5 along the optical axis toward the object side.

Table 4 below shows various values of the variable magnification optical system relating to the present Example.

TABLE 4

Fourth Example

[Surface Data]

| m OP | r ∞ | d | nd | νd |
|---|---|---|---|---|
| 1 | 1059.3029 | 1.000 | 1.84666 | 23.80 |
| 2 | 88.2318 | 6.929 | 1.90265 | 35.72 |
| 3 | 403.3118 | 0.200 | | |
| 4 | 87.3429 | 6.677 | 1.81600 | 46.59 |
| 5 | 899.1448 | Variable | | |
| *6 | 145.1405 | 1.000 | 1.81600 | 46.59 |
| 7 | 21.3498 | 7.013 | | |
| 8 | −93.6905 | 1.000 | 1.77250 | 49.62 |
| 9 | 52.8889 | 0.200 | | |
| 10 | 40.8152 | 5.067 | 1.80518 | 25.45 |
| 11 | −74.9610 | 1.472 | | |
| 12 | −36.2791 | 1.000 | 1.80400 | 46.60 |
| 13 | 404.7262 | 2.056 | 2.00069 | 25.46 |
| 14 | −319.9567 | Variable | | |
| 15 (S) | ∞ | 0.200 | | |
| 16 | 88.2548 | 3.685 | 1.80400 | 46.60 |
| 17 | −54.7142 | 1.284 | | |
| 18 | −30.7175 | 1.000 | 1.68893 | 31.16 |
| 19 | −74.0526 | 0.200 | | |
| 20 | 56.5407 | 4.903 | 1.71999 | 50.27 |
| 21 | −44.3610 | 4.918 | | |
| 22 | −36.9664 | 1.000 | 1.72342 | 38.03 |
| 23 | 80.5817 | Variable | | |
| 24 | 573.8232 | 6.525 | 1.59349 | 67.00 |
| 25 | −22.0116 | 1.000 | 1.71736 | 29.57 |
| 26 | −42.4849 | Variable | | |
| 27 | 50.5370 | 6.205 | 1.55332 | 71.68 |
| *28 | −153.3313 | Variable | | |
| *29 | −95.1749 | 3.228 | 1.59551 | 39.21 |
| 30 | 84.3183 | 7.544 | | |
| 31 | 40.5660 | 7.785 | 1.59551 | 39.21 |
| 32 | 180.7170 | BF | | |
| II | ∞ | | | |

[Aspherical Surface Data]
m:6
κ = 1.0000
A4 = 1.07708E−06
A6 = −2.41884E−09
A8 = 5.80958E−12
A10 = −5.58700E−15
m:28
κ = 1.0000
A4 = 2.10709E−06
A6 = 4.40633E−09
A8 = −1.52762E−11
A10 = 2.31569E−14
m:29
κ = 1.0000
A4 = −6.15448E−06
A6 = 7.32819E−09
A8 = −2.45254E−11
A10 = 3.72863E−14

[Various Data]
Variable magnification ratio 2.99

| | W | M | T | | | |
|---|---|---|---|---|---|---|
| f | 22.7 | 50.3 | 67.9 | | | |
| FNO | 2.92 | 2.92 | 2.92 | | | |
| 2ω | 91.78 | 46.78 | 34.60 | | | |
| Ymax | 19.23 | 21.60 | 21.60 | | | |
| TL | 155.45 | 174.13 | 187.93 | | | |
| BF | 13.25 | 21.65 | 20.92 | | | |
| | W | M | T | W | M | T |
| f, β | 22.700 | 50.288 | 67.900 | −0.033 | −0.033 | −0.033 |
| d0 | 0.000 | 0.000 | 0.000 | 638.473 | 1426.83 | 1927.07 |
| d5 | 2.000 | 25.012 | 34.560 | 2.000 | 25.012 | 34.560 |
| d14 | 29.544 | 7.040 | 2.000 | 29.544 | 7.040 | 2.000 |

TABLE 4-continued

Fourth Example

| | | | | | | |
|---|---|---|---|---|---|---|
| d23 | 6.941 | 4.850 | 4.000 | 8.321 | 5.940 | 5.254 |
| d26 | 12.867 | 12.278 | 14.712 | 10.219 | 9.978 | 12.178 |
| d28 | 7.757 | 20.212 | 28.652 | 9.025 | 21.422 | 29.932 |

[Lens Group Data]

| Group | ST | f |
|---|---|---|
| 1 | 1 | 131.146 |
| 2 | 6 | −21.329 |
| 3 | 15 | 56.760 |
| 4 | 24 | 81.373 |
| 5 | 27 | 69.446 |
| 6 | 29 | −1467.881 |

[Values for Conditional Expressions]
(1) (−f1N)/|f1| = 0.867
(2) BFw/fw = 0.584
(3) (−fRN)/ft = 1.098
(4) MTF1/MTF2 = 0.980
(5) (−fFN)/|fF| = 0.936
(6) nP/nN = 0.928
(7) |fF1|/|f1| = 0.620
(8) |fF2|/|f1| = 0.530
(9) |fF1|/ft = 1.198
(10) |fF2|/ft = 1.023
(11) |βWF1|/|βWF2| = 0.014
(12) |βRw|/|βRt| = 0.005
(13) ωw = 45.89°

FIG. 11A, FIG. 11B and FIG. 11C are graphs showing various aberrations upon focusing on an infinite distance object, respectively, in the wide angle end state, in the intermediate focal length state and in the telephoto end state, of the variable magnification optical system according to the Fourth Example.

FIG. 12A, FIG. 12B and FIG. 12C are graphs showing various aberrations upon focusing on a close distance object, respectively, in the wide angle end state, in the intermediate focal length state and in the telephoto end state, of the variable magnification optical system according to the Fourth Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

FIFTH EXAMPLE

Figure 13:
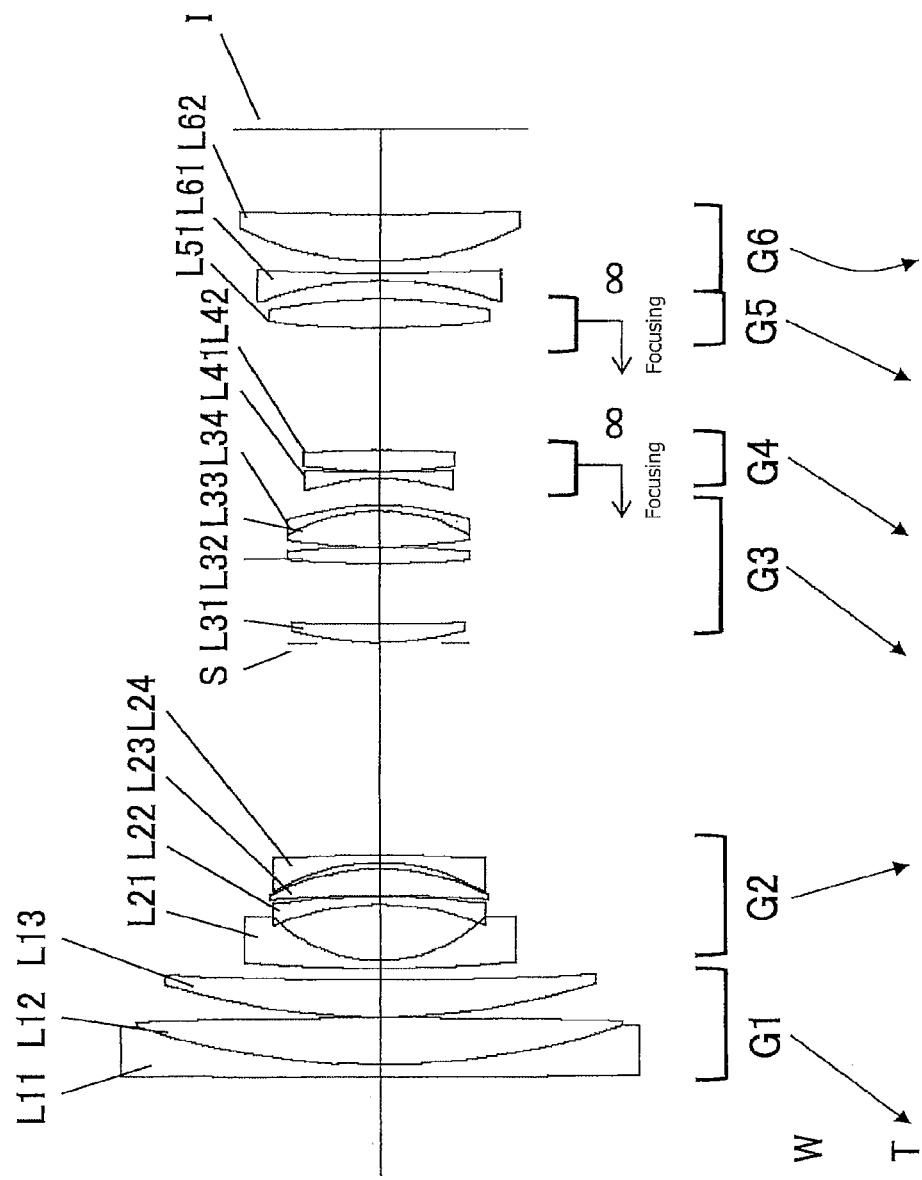
FIG. 13 is a sectional view of a variable magnification optical system according to a Fifth Example.

FIG. 13 is a view showing a lens configuration of a variable magnification optical system according to a Fifth Example.

The variable magnification optical system according to the present Example is composed of, in order from an object side, a first lens group G1 having positive refractive power, a second lens group G2 having negative refractive power, an aperture stop S, a third lens group G3 having positive refractive power, a fourth lens group G4 having negative refractive power, a fifth lens group G5 having positive refractive power, and a sixth lens group G6 having negative refractive power.

The first lens group G1 consists of, in order from the object side, a cemented positive lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a negative meniscus lens L22 having a concave surface facing the object side, a positive meniscus lens L23 having a concave surface facing the object side, and a negative meniscus lens L24 having a concave surface facing the object side.

The third lens group G3 consists of, in order from the object side, a positive meniscus lens L31 having a convex surface facing the object side, a double convex positive lens L32, and a cemented positive lens constructed by a double convex positive lens L33 cemented with a negative meniscus lens L34 having a concave surface facing the object side.

The fourth lens group G4 consists of, in order from the object side, a double concave negative lens L41 and a double convex positive lens L42.

The fifth lens group G5 consists of a double convex positive lens L51.

The sixth lens group G6 consists of, in order from the object side, a double concave negative lens L61 and a positive meniscus lens L62 having a convex surface facing the object side.

In the variable magnification optical system according to the present Example, upon varying magnification between the wide angle end state and the telephoto end state, all lens groups of the first lens group G1 to the sixth lens group G6 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, and a distance between the fifth lens group G5 and the sixth lens group G6, are varied.

In the variable magnification optical system according to the present Example, focusing from an infinite distance object to a close distance object is carried out by moving, as focusing lens groups, the fourth lens group G4 along the optical axis toward the object side and the fifth lens group G5 along the optical axis toward the object side with a different trajectory from that of the fourth lens group G4.

Table 5 below shows various values of the variable magnification optical system relating to the present Example.

TABLE 5

Fifth Example

[Surface Data]

| m | r | d | nd | vd |
|---|---|---|---|---|
| OP | ∞ | | | |
| 1 | 3049.4158 | 2.000 | 1.84666 | 23.80 |
| 2 | 109.9340 | 7.861 | 1.81600 | 46.59 |
| 3 | −1409.8119 | 0.200 | | |
| 4 | 101.3915 | 6.059 | 1.81600 | 46.59 |
| 5 | 503.4410 | Variable | | |
| *6 | 239.3378 | 1.300 | 1.81600 | 46.59 |
| 7 | 22.0458 | 9.224 | | |
| 8 | −40.1436 | 1.300 | 1.77250 | 49.62 |
| 9 | −121.4951 | 0.200 | | |
| 10 | −196.1454 | 4.421 | 1.95000 | 29.37 |
| 11 | −34.6549 | 1.015 | | |
| 12 | −29.7495 | 1.300 | 1.59349 | 67.00 |
| 13 | −185.4662 | Variable | | |
| 14 (S) | ∞ | 0.200 | | |
| 15 | 47.0680 | 3.025 | 1.88300 | 40.66 |
| 16 | 271.9137 | 10.130 | | |
| 17 | 176.7677 | 2.592 | 1.59319 | 67.90 |
| 18 | −179.0400 | 0.200 | | |
| 19 | 86.4232 | 5.895 | 1.59319 | 67.90 |
| 20 | −27.4209 | 1.000 | 1.95000 | 29.37 |
| 21 | −41.6214 | Variable | | |
| 22 | −33.9616 | 1.000 | 1.72825 | 28.38 |
| 23 | 151.3178 | 0.200 | | |
| 24 | 84.0645 | 3.506 | 1.71999 | 50.27 |
| 25 | −174.4171 | Variable | | |
| 26 | 140.7071 | 4.753 | 1.54814 | 45.78 |
| *27 | −72.5378 | Variable | | |
| *28 | −60.3860 | 1.300 | 1.74950 | 35.25 |
| 29 | 326.8097 | 1.986 | | |
| 30 | 45.0000 | 7.770 | 1.64000 | 60.19 |
| 31 | 459.8861 | BF | | |
| I | ∞ | | | |

[Aspherical Surface Data]
m:6
$\kappa = 1.0000$
$A4 = 8.90328E{-}07$
$A6 = -2.96841E{-}09$
$A8 = 5.16084E{-}12$
$A10 = -3.05458E{-}15$
m:27
$\kappa = 1.0000$
$A4 = 2.61448E{-}06$
$A6 = 8.65353E{-}09$
$A8 = -3.00982E{-}11$
$A10 = 4.50822E{-}14$
m:28
$\kappa = 1.0000$
$A4 = -6.11667E{-}06$
$A6 = 9.18242E{-}09$
$A8 = -3.76607E{-}11$
$A10 = 4.75789E{-}14$

[Various Data]
Variable magnification ratio 2.99

| | W | M | T | | | |
|---|---|---|---|---|---|---|
| f | 22.7 | 49.7 | 67.9 | | | |
| FNO | 2.92 | 2.92 | 2.92 | | | |
| 2ω | 91.48 | 45.84 | 32.90 | | | |
| Ymax | 19.18 | 21.60 | 21.60 | | | |
| TL | 157.45 | 170.49 | 182.85 | | | |
| BF | 14.08 | 21.92 | 17.11 | | | |
| | W | M | T | W | M | T |
| f, β | 22.701 | 49.700 | 67.907 | −0.033 | −0.033 | −0.033 |
| d0 | 0.000 | 0.000 | 0.000 | 640.708 | 1420.26 | 1939.82 |
| d5 | 2.000 | 24.596 | 37.406 | 2.000 | 24.596 | 37.406 |
| d13 | 35.154 | 8.040 | 2.000 | 35.154 | 8.040 | 2.000 |
| d21 | 4.461 | 8.442 | 11.773 | 4.175 | 8.108 | 11.453 |
| d25 | 20.335 | 18.256 | 18.682 | 18.556 | 15.932 | 15.718 |
| d27 | 2.986 | 10.795 | 17.440 | 5.050 | 13.453 | 20.723 |

TABLE 5-continued

Fifth Example

[Lens Group Data]

| Group | ST | f |
|---|---|---|
| 1 | 1 | 141.872 |
| 2 | 6 | −24.424 |
| 3 | 14 | 30.546 |
| 4 | 22 | −75.468 |
| 5 | 26 | 88.014 |
| 6 | 28 | −713.321 |

[Values for Conditional Expressions]

(1) $(-f1N)/|f1| = 0.950$
(2) $BFw/fw = 0.620$
(3) $(-fRN)/ft = 1.000$
(4) $MTF1/MTF2 = 0.098$
(5) $(-fFN)/|fF| = 0.504$
(6) $nP/nN = 0.995$
(7) $|fF1|/|f1| = 0.532$
(8) $|fF2|/|f1| = 0.620$
(9) $|fF1|/ft = 1.111$
(10) $|fF2|/ft = 1.296$
(11) $|\beta WF1|/|\beta WF2| = 2.449$
(12) $|\beta Rw|/|\beta Rt| = 1.034$
(13) $\omega w = 45.74°$ FIG. 14A, FIG. 14B and FIG. 14C are graphs showing various aberrations upon focusing on an infinite distance object, respectively, in the wide angle end state, in the intermediate focal length state and in the telephoto end state, of the variable magnification optical system according to the Fifth Example.

FIG. 15A, FIG. 15B and FIG. 15C are graphs showing various aberrations upon focusing on a close distance object, respectively, in the wide angle end state, in the intermediate focal length state and in the telephoto end state, of the variable magnification optical system according to the Fifth Example.

As is apparent from the above-mentioned graphs showing various aberrations, the variable magnification optical system relating to the present Example can correct superbly various aberrations over the wide angle end state to the telephoto end state and has excellent imaging performance, and further has excellent imaging performance even upon focusing on a close distance object.

SIXTH EXAMPLE

Figure 16:
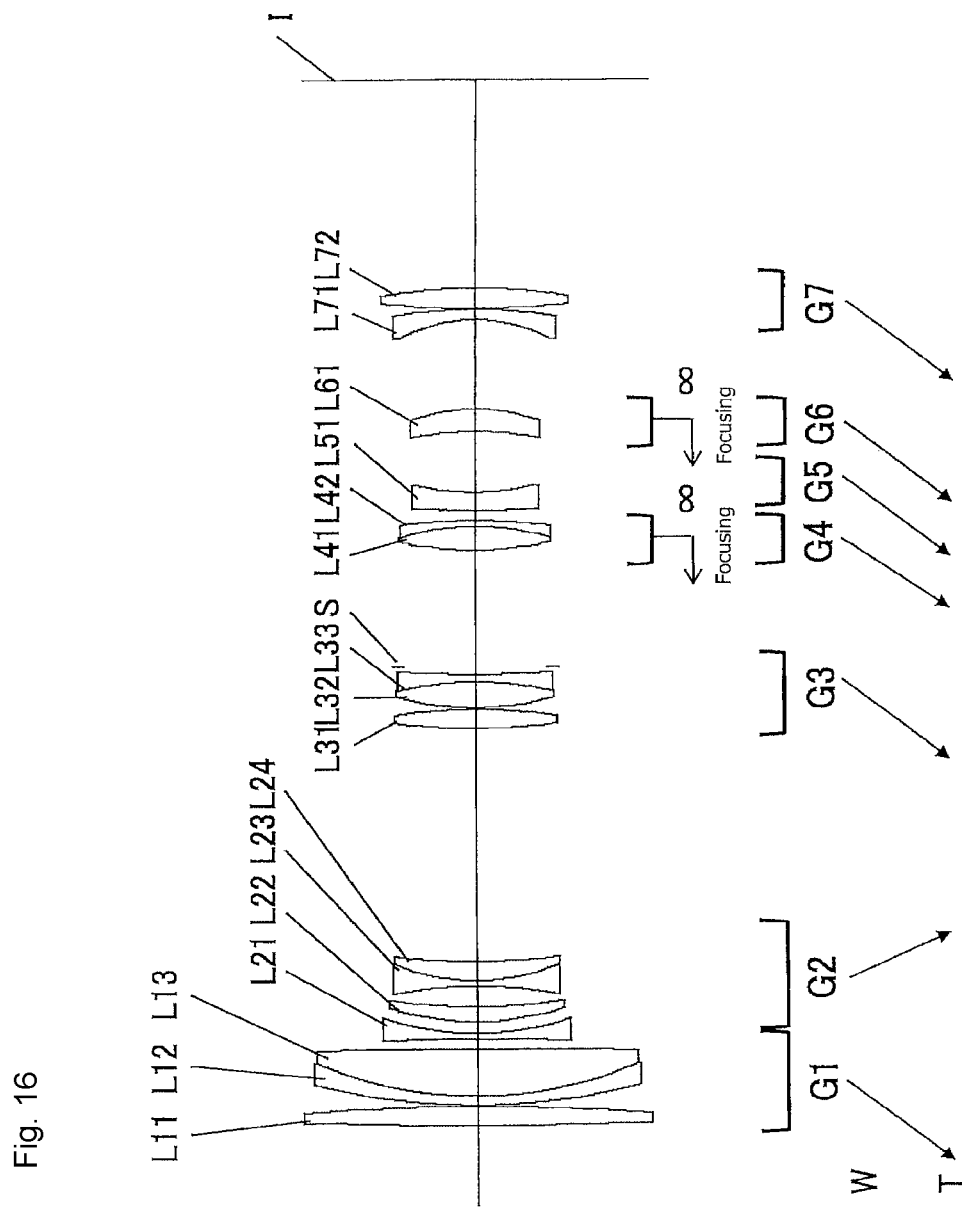
FIG. 16 is a sectional view of a variable magnification optical system according to a Sixth Example.

FIG. 16 is a view showing a lens configuration of a variable magnification optical system according to a Sixth Example of the present application.

The variable magnification optical system according to the present Example is composed of, in order from an object side, a first lens group G1 having positive refractive power, a second lens group G2 having negative refractive power, a third lens group G3 having positive refractive power, an aperture stop S, a fourth lens group G4 having positive refractive power, a fifth lens group G5 having negative refractive power, a sixth lens group G6 having positive refractive power, and a seventh lens group G7 having negative refractive power.

The first lens group G1 consists of, in order from the object side, a double convex positive lens L11, and a cemented positive lens constructed by a negative meniscus lens L12 having a convex surface facing the object side cemented with a double convex positive lens L13.

The second lens group G2 consists of, in order from the object side, a double concave negative lens L21, a positive meniscus lens L22 having a convex surface facing the object side and a cemented negative lens constructed by a double concave negative lens L23 cemented with a positive meniscus lens L24 having a convex surface facing the object side.

The third lens group G3 consists of, in order from the object side, a double convex positive lens L31, and a cemented positive lens constructed by a double convex positive lens L32 cemented with a double concave negative lens L33.

The fourth lens group G4 consists of a cemented positive lens constructed by a double convex positive lens L41 cemented with a negative meniscus lens L42 having a concave surface facing the object side.

The fifth lens group G5 consists of a negative meniscus lens L51 having a convex surface facing the object side.

The sixth lens group G6 consists of a positive meniscus lens L61 having a concave surface facing the object side.

The seventh lens group G7 consists of, in order from the object side, a negative meniscus lens L71 having a concave surface facing the object side and a double convex positive lens L72.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the variable magnification optical system according to the present Example, focusing from an infinite distance object to a close distance object is carried out by moving, as focusing lens groups, the fourth lens group G4 along the optical axis toward the object side and the sixth lens group G6 along the optical axis toward the object with a different trajectory from that of the fourth lens group G4.

Table 6 below shows various values of the variable magnification optical system relating to the present Example.

TABLE 6

Sixth Example

[Surface Data]

| m | r | d | nd | νd |
|---|---|---|---|---|
| OP | ∞ | | | |
| 1 | 829.7998 | 3.542 | 1.48749 | 70.32 |
| 2 | −352.7135 | 0.200 | | |
| 3 | 102.3920 | 1.700 | 1.67270 | 32.18 |
| 4 | 65.2892 | 8.627 | 1.49700 | 81.73 |
| 5 | −4480.3970 | Variable | | |
| 6 | −331.7733 | 1.000 | 1.77250 | 49.62 |
| 7 | 47.4606 | 2.120 | | |
| 8 | 45.4437 | 2.785 | 1.80518 | 25.45 |
| 9 | 90.1171 | 3.854 | | |
| 10 | −70.4901 | 1.000 | 1.67003 | 47.14 |
| 11 | 34.7167 | 3.536 | 1.75520 | 27.57 |
| 12 | 116.6754 | Variable | | |
| 13 | 100.8918 | 3.650 | 1.80610 | 40.97 |
| 14 | −72.8434 | 0.200 | | |
| 15 | 48.3355 | 4.843 | 1.49700 | 81.73 |
| 16 | −53.3052 | 1.443 | 1.85026 | 32.35 |
| 17 | 226.4472 | 1.323 | | |
| 18(S) | ∞ | Variable | | |
| 19 | 56.3197 | 4.471 | 1.51680 | 63.88 |
| 20 | −38.8956 | 1.000 | 1.80100 | 34.92 |
| 21 | −92.0195 | Variable | | |
| 22 | 513.7755 | 3.255 | 1.85026 | 32.35 |
| 23 | 39.1334 | Variable | | |
| 24 | −52.5225 | 4.182 | 1.71736 | 29.57 |
| 25 | −30.1949 | Variable | | |
| 26 | −25.8031 | 1.873 | 1.81600 | 46.59 |
| 27 | −90.1071 | 0.200 | | |
| 28 | 139.7088 | 3.802 | 1.79504 | 28.69 |
| 29 | −94.4559 | BF | | |
| I | ∞ | | | |

[Various Data]
Variable magnification ratio 4.05

| | W | M | T |
|---|---|---|---|
| f | 72.1 | 100.0 | 292.0 |
| FNO | 4.74 | 4.81 | 5.88 |
| 2ω | 34.32 | 24.20 | 8.28 |
| Ymax | 21.60 | 21.60 | 21.60 |
| TL | 193.32 | 211.66 | 248.32 |
| BF | 38.32 | 39.78 | 62.52 |

| | W | M | T | W | M | T |
|---|---|---|---|---|---|---|
| f, β | 72.100 | 99.963 | 292.002 | −0.033 | −0.033 | −0.033 |
| d0 | 0.000 | 0.000 | 0.000 | 2117.00 | 2908.95 | 8607.60 |
| d5 | 2.000 | 28.621 | 75.058 | 2.000 | 28.621 | 75.058 |
| d12 | 43.058 | 34.009 | 2.000 | 43.058 | 34.009 | 2.000 |
| d18 | 21.601 | 19.944 | 21.366 | 21.096 | 19.010 | 19.414 |
| d21 | 2.000 | 3.657 | 2.235 | 2.505 | 4.591 | 4.188 |
| d23 | 11.246 | 10.437 | 10.009 | 10.564 | 10.137 | 9.509 |
| d25 | 16.489 | 16.614 | 16.522 | 17.171 | 16.914 | 17.022 |

[Lens Group Data]

| Group | ST | f |
|---|---|---|
| 1 | 1 | 167.538 |
| 2 | 6 | −41.098 |
| 3 | 13 | 50.455 |
| 4 | 19 | 95.000 |
| 5 | 22 | −49.977 |
| 6 | 24 | 91.830 |
| 7 | 26 | −136.049 |

[Values for Conditiona Expressions]

(1) $(-f1N)/|f1| = 1.629$
(2) $BFw/fw = 0.531$
(3) $(-fRN)/ft = 0.154$
(4) $MTF1/MTF2 = 3.903$
(5) $(-fFN)/|fF| = 0.924$

TABLE 6-continued

Sixth Example

| | |
|---|---|
| (6) | nP/nN = 0.842 |
| (7) | |fF1|/|f1| = 0.567 |
| (8) | |fF2|/|f1| = 0.548 |
| (9) | |fF1|/ft = 0.325 |
| (10) | |fF2|/ft = 0.314 |
| (11) | |βWF1|/|βwF2| = 1.096 |
| (12) | |βRw|/|βRt| = 0.934 |
| (13) | ωw = 17.16° |

FIG. 17A, FIG. 17B and FIG. 17C are graphs showing various aberrations upon focusing on an infinite distance object, respectively, in the wide angle end state, in the intermediate focal length state and in the telephoto end state, of the variable magnification optical system according to the Sixth Example.

FIG. 18A, FIG. 18B and FIG. 18C are graphs showing various aberrations upon focusing on a close distance object, respectively, in the wide angle end state, in the intermediate focal length state and in the telephoto end state, of the variable magnification optical system according to the Sixth Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

SEVENTH EXAMPLE

Figure 19:
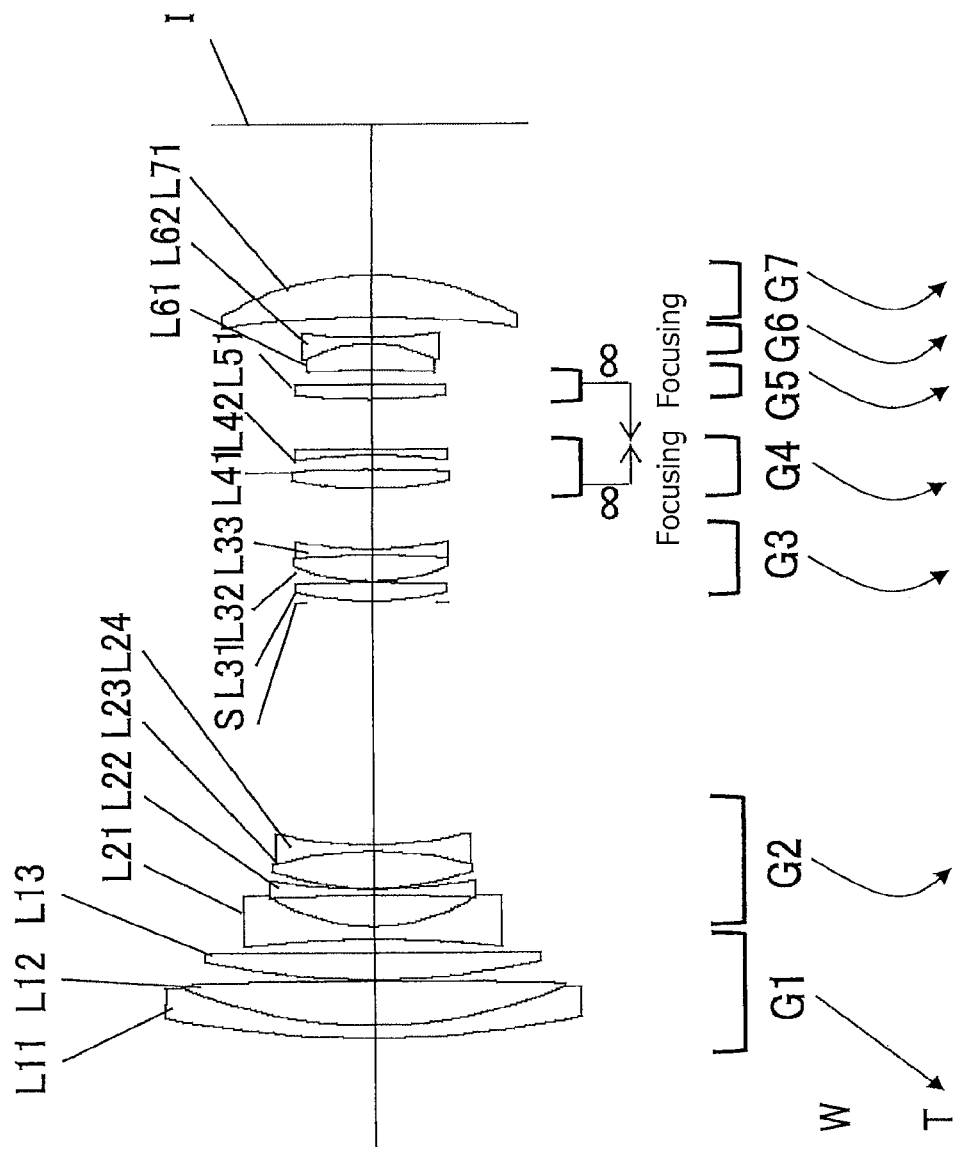
FIG. 19 is a sectional view of a variable magnification optical system according to a Seventh Example.

FIG. 19 is a view showing a lens configuration of a variable magnification optical system according to a Seventh Example of the present application.

The variable magnification optical system according to the present Example is composed of, in order from an object side, a first lens group G1 having positive refractive power, a second lens group G2 having negative refractive power, an aperture stop S, a third lens group G3 having positive refractive power, a fourth lens group G4 having positive refractive power, a fifth lens group G5 having positive refractive power, a sixth lens group G6 having negative refractive power, and a seventh lens group G7 having positive refractive power.

The first lens group G1 consists of, in order from the object side, a cemented positive lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a double concave negative lens L21, a double concave negative lens L22, and a cemented positive lens constructed by a double convex positive lens L23 cemented with a double concave negative lens L24.

The third lens group G3 consists of, in order from the object side, a double convex positive lens L31, and a cemented positive lens constructed by a double convex positive lens L32 cemented with a double concave negative lens L33.

The fourth lens group G4 consists of, in order from the object side, a double convex positive lens L41 and a negative meniscus lens L42 having a concave surface facing the object side.

The fifth lens group G5 consists of a double convex positive lens L51.

The sixth lens group G6 consists of a cemented negative lens constructed by a positive meniscus lens L61 having a concave surface facing the object side cemented with a double concave negative lens L62.

The seventh lens group G7 consists of a positive meniscus lens L71 having a concave surface facing the object side.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the variable magnification optical system according to the present Example, focusing from an infinite distance object to a close distance object is carried out by moving, as focusing lens groups, the fourth lens group G4 along the optical axis toward the image side and the fifth lens group G5 along the optical axis toward the object side.

Table 7 below shows various values of the variable magnification optical system relating to the present Example.

TABLE 7

Seventh Example

[Surface Data]

| m | r | d | nd | νd |
|---|---|---|---|---|
| OP | ∞ | | | |
| 1 | 137.2611 | 2.000 | 1.85000 | 27.03 |
| 2 | 66.9538 | 6.897 | 1.59319 | 67.90 |

TABLE 7-continued

| Seventh Example | | | | |
|---|---|---|---|---|
| 3 | −677.5498 | 0.200 | | |
| 4 | 107.1491 | 4.136 | 1.61800 | 63.34 |
| 5 | 9353.1970 | Variable | | |
| *6 | −150.8738 | 2.000 | 1.90265 | 35.72 |
| 7 | 25.5606 | 4.779 | | |
| 8 | −260.6181 | 1.000 | 1.81600 | 46.59 |
| 9 | 86.2883 | 0.200 | | |
| 10 | 41.4737 | 5.687 | 1.84666 | 23.78 |
| 11 | −48.7116 | 1.000 | 1.81600 | 46.59 |
| 12 | 54.7043 | Variable | | |
| 13(S) | ∞ | 0.200 | | |
| 14 | 44.1680 | 2.899 | 1.77250 | 49.62 |
| 15 | −280.6415 | 0.200 | | |
| 16 | 27.1646 | 4.022 | 1.59319 | 67.90 |
| 17 | −146.4206 | 1.000 | 1.95000 | 29.37 |
| 18 | 51.2305 | Variable | | |
| 19 | 50.9241 | 2.999 | 1.83481 | 42.73 |
| 20 | −182.3279 | 2.176 | | |
| 21 | −80.2256 | 1.000 | 1.88300 | 40.66 |
| 22 | −715.7217 | Variable | | |
| 23 | 101.2327 | 2.235 | 1.83481 | 42.73 |
| *24 | −257.5032 | Variable | | |
| *25 | −283.1336 | 4.085 | 1.58144 | 40.98 |
| 26 | −18.4049 | 1.000 | 1.90366 | 31.27 |
| 27 | 87.0702 | Variable | | |
| 28 | −136.5964 | 6.525 | 1.59319 | 67.90 |
| 29 | −38.7359 | | | |
| I | ∞ | | | |

[Aspherical Surface Data]

m: 6

K = 1.0000
A4 = 1.67289E−07
A6 = −1.03260E−09
A8 = 5.37315E−12
A10 = −4.58982E−15 m: 24

K = 1.0000
A4 = 4.43454E−06
A6 = 2.09008E−08
A8 = −1.49527E−10
A10 = 8.49155E−13 m: 25

K = 1.0000
A4 = −2.21915E−05
A6 = 1.15956E−07
A8 = −1.94063E−09
A10 = 9.93961E−12

[Various Data]
Variable magnification ratio 8.50

| | W | M | T |
|---|---|---|---|
| f | 24.7 | 70.0 | 210.0 |
| FNO | 3.47 | 5.31 | 6.52 |
| 2ω | 85.94 | 32.52 | 11.08 |
| Ymax | 19.90 | 21.60 | 21.60 |
| TL | 141.66 | 173.63 | 194.45 |
| BF | 23.35 | 32.36 | 13.26 |

| | W | M | T | W | M | T |
|---|---|---|---|---|---|---|
| f, β | 24.700 | 70.005 | 209.991 | −0.033 | −0.033 | −0.033 |
| d0 | 0.000 | 0.000 | 0.000 | 706.534 | 2031.32 | 6175.90 |
| d5 | 2.002 | 22.984 | 54.077 | 2.002 | 22.984 | 54.077 |
| d12 | 37.630 | 16.703 | 2.000 | 37.630 | 16.703 | 2.000 |
| d18 | 9.388 | 7.991 | 4.000 | 9.688 | 8.290 | 4.039 |
| d22 | 7.722 | 6.619 | 11.160 | 6.491 | 5.369 | 9.139 |
| d24 | 2.215 | 7.801 | 20.136 | 3.147 | 8.752 | 21.938 |
| d27 | 3.110 | 22.940 | 33.576 | 3.110 | 22.940 | 33.576 |

TABLE 7-continued

Seventh Example

[Lens Group Data]

| Group | ST | f |
|---|---|---|
| 1 | 1 | 113.050 |
| 2 | 6 | −19.624 |
| 3 | 13 | 42.460 |
| 4 | 19 | 84.928 |
| 5 | 23 | 87.292 |
| 6 | 25 | −33.119 |
| 7 | 28 | 88.941 |

[Values for Conditional Expressions]

| | |
|---|---|
| (1) | (−f1N)/|f1| = 1.378 |
| (2) | BFw/fw = 0.945 |
| (3) | (−fRN)/ft = 0.080 |
| (4) | MTF1/MTF2 = 0.022 |
| (5) | (−fFN)/|fF| = 1.206 |
| (6) | nP/nN = 0.974 |
| (7) | |fF1|/|f1| = 0.751 |
| (8) | |fF2|/|f1| = 0.772 |
| (9) | |fF1|/ft = 0.404 |
| (10) | |fF2|/ft = 0.416 |
| (11) | |βWF1|/|βWF2| = 0.616 |
| (12) | |βRw|/|βRt| = 1.858 |
| (13) | ωw = 42.97° |

FIG. 20A, FIG. 20B and FIG. 20C are graphs showing various aberrations upon focusing on an infinite distance object, respectively, in the wide angle end state, in the intermediate focal length state and in the telephoto end state, of the variable magnification optical system according to the Seventh Example.

FIG. 21A, FIG. 21B and FIG. 21C are graphs showing various aberrations upon focusing on a close distance object, respectively, in the wide angle end state, in the intermediate focal length state and in the telephoto end state, of the variable magnification optical system according to the Seventh Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

EIGHTH EXAMPLE

Figure 22:
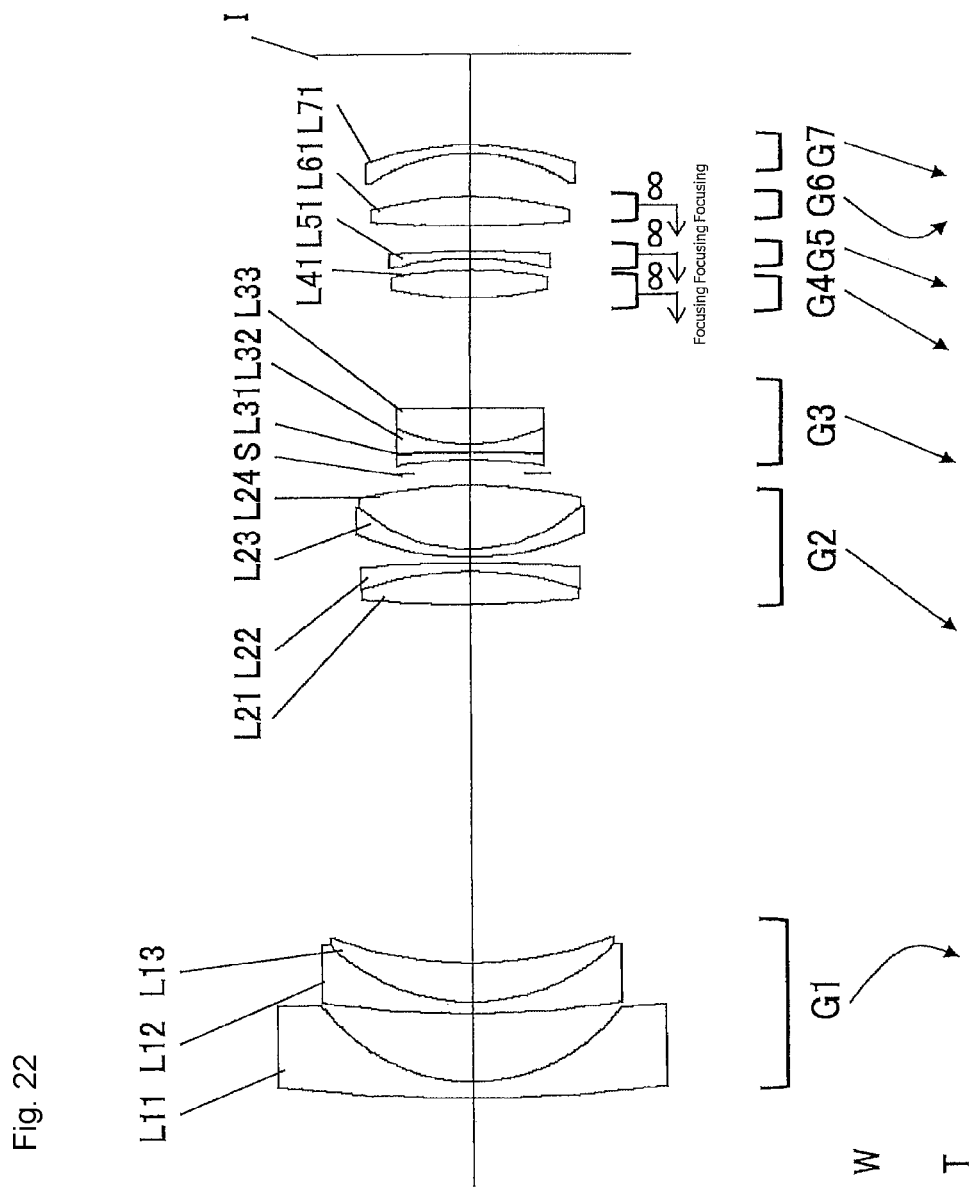
FIG. 22 is a sectional view of a variable magnification optical system according to an Eighth Example.

FIG. 22 is a view showing a lens configuration of a variable magnification optical system according to an Eighth Example of the present application.

The variable magnification optical system according to the present Example is composed of, in order from an object side, a first lens group G1 having negative refractive power, a second lens group G2 having positive refractive power, an aperture stop S, a third lens group G3 having negative refractive power, a fourth lens group G4 having positive refractive power, a fifth lens group G5 having negative refractive power, a sixth lens group G6 having positive refractive power, and a seventh lens group G7 having negative refractive power.

The first lens group G1 consists of, in order from the object side, a negative meniscus lens L11 having a convex surface facing the object side, and a cemented positive lens constructed by a negative meniscus lens L12 having a convex surface facing the object side cemented with a positive meniscus lens L13 having a convex surface facing the object side.

The second lens group G2 consists of, in order from the object side, a cemented positive lens constructed by a double convex positive lens L21 cemented with a negative meniscus lens L22 having a concave surface facing the object side, and a cemented positive lens constructed by a negative meniscus lens L23 having a convex surface facing the object side cemented with a double convex positive lens L24.

The third lens group G3 consists of, in order from the object side, a negative meniscus lens L31 having a concave surface facing the object side and a cemented positive lens constructed by a double concave negative lens L32 cemented with a positive meniscus lens L33 having a convex surface facing the object side.

The fourth lens group G4 consists of a double convex positive lens L41.

The fifth lens group G5 consists of a negative meniscus lens L51 having a concave surface facing the object side.

The sixth lens group G6 consists of a double convex positive lens L61.

The seventh lens group G7 consists of a negative meniscus lens L71 having a concave surface facing the object side.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the variable magnification optical system according to the present Example, focusing from an infinite distance object to a close distance object is carried out by moving, as focusing lens groups, the fourth lens group G4 along the optical axis toward the object side, and the fifth lens group G5 and the sixth lens group G6 along the optical axis toward the object side with different trajectories, respectively, from that of the fourth lens group G4.

Table 8 below shows various values of the variable magnification optical system relating to the present Example.

TABLE 8

Eighth Example

[Surface Data]

| m | r | d | nd | νd |
|---|---|---|---|---|
| OP | ∞ | | | |
| 1 | 250.0000 | 2.900 | 1.74389 | 49.53 |
| *2 | 28.0269 | 12.424 | | |
| 3 | 154.1167 | 2.100 | 1.59349 | 67.00 |
| 4 | 32.5416 | 6.969 | 2.00069 | 25.46 |
| 5 | 61.8764 | Variable | | |
| 6 | 175.0869 | 5.997 | 1.81600 | 46.59 |
| 7 | −52.8034 | 1.500 | 1.85000 | 27.03 |
| 8 | −204.9882 | 1.000 | | |
| 9 | 45.2860 | 1.500 | 1.80518 | 25.45 |
| 10 | 26.6188 | 11.527 | 1.60300 | 65.44 |
| 11 | −76.6492 | Variable | | |
| 12(S) | ∞ | 2.465 | | |
| 13 | −64.5009 | 1.300 | 1.90265 | 35.72 |
| 14 | −217.6883 | 0.200 | | |
| 15 | −214.1041 | 1.300 | 1.67270 | 32.18 |
| 16 | 26.6878 | 6.400 | 1.80809 | 22.74 |
| 17 | 502.6822 | Variable | | |
| 18 | 65.6282 | 5.000 | 1.48749 | 70.32 |
| 19 | −65.3105 | Variable | | |
| 20 | −52.0851 | 1.300 | 1.84666 | 23.80 |
| 21 | −201.9547 | Variable | | |
| 22 | 185.0000 | 5.300 | 1.58913 | 61.15 |
| *23 | −50.5905 | Variable | | |
| *24 | −27.3977 | 1.500 | 1.58913 | 61.15 |
| 25 | −49.4756 | BF | | |
| I | ∞ | | | |

[Aspherical Data]

m: 2

$K = 0.0000$
$A4 = 3.95960E{-}06$
$A6 = 3.76748E{-}09$
$A8 = -5.23494E{-}12$
$A10 = 1.04782E{-}14$
$A12 = -4.82160E{-}18$ m: 23

$K = 1.0000$
$A4 = 6.76320E{-}06$
$A6 = -8.33082E{-}09$
$A8 = 3.88079E{-}11$
$A10 = -7.09278E{-}14$ m: 24

$K = 1.0000$
$A4 = 5.00393E{-}06$
$A6 = -8.92918E{-}09$
$A8 = 2.86537E{-}11$
$A10 = -5.32582E{-}14$

[Various Data]
Variable magnification ratio 2.99

| | W | M | T |
|---|---|---|---|
| f | 22.7 | 50.0 | 67.9 |
| FNO | 3.03 | 3.00 | 3.03 |
| 2ω | 91.04 | 45.96 | 33.62 |
| Ymax | 19.30 | 21.60 | 21.60 |
| TL | 188.49 | 155.49 | 167.35 |
| BF | 16.20 | 23.37 | 32.67 |

TABLE 8-continued

| | Eighth Example | | | | | |
|---|---|---|---|---|---|---|
| | W | M | T | W | M | T |
| f, β | 22.700 | 49.999 | 67.899 | −0.033 | −0.033 | −0.033 |
| d0 | 0.000 | 0.000 | 0.000 | 644.489 | 1474.05 | 2002.27 |
| d5 | 64.883 | 10.266 | 5.946 | 64.883 | 10.266 | 5.946 |
| d11 | 2.200 | 12.775 | 27.038 | 2.200 | 12.775 | 27.038 |
| d17 | 20.035 | 8.462 | 6.571 | 19.026 | 7.439 | 4.593 |
| d19 | 2.030 | 3.706 | 4.816 | 1.360 | 3.164 | 4.349 |
| d21 | 4.601 | 9.046 | 14.467 | 4.908 | 8.936 | 15.092 |
| d23 | 7.862 | 17.178 | 5.159 | 9.234 | 18.853 | 6.979 |

[Lens Group Data]

| Group | ST | f |
|---|---|---|
| 1 | 1 | −42.744 |
| 2 | 6 | 40.599 |
| 3 | 12 | −105.371 |
| 4 | 18 | 68.000 |
| 5 | 20 | −83.229 |
| 6 | 22 | 68.000 |
| 7 | 24 | −106.909 |

[Values for Conditional Expressions]

| (1) | $(-f1N)/|f1| = 0.998$ |
|---|---|
| (2) | $BFw/fw = 0.713$ |
| (3) | $(-fRN)/ft = 1.575$ |
| (4) | $MTF1/MTF2 = 0.809$ |
| (5) | $(-fFN)/|fF| = 1.224$ |
| (6) | $nP/nN = 0.806$ |
| (7) | $|fF1|/|f1| = 1.591$ |
| (8) | $|fF2|/|f1| = 1.591$ |
| (9) | $|fF1|/ft = 1.001$ |
| (10) | $|fF2|/ft = 1.001$ |
| (11) | $|\beta WF1|/|\beta WF2| = 0.350$ |
| (12) | $|\beta Rw|/|\beta Rt| = 1.387$ |
| (13) | $\omega w = 45.52°$ |

FIG. 23A, FIG. 23B and FIG. 23C are graphs showing various aberrations upon focusing on an infinite distance object, respectively, in the wide angle end state, in the intermediate focal length state and in the telephoto end state, of the variable magnification optical system according to the Eighth Example.

FIG. 24A, FIG. 24B and FIG. 24C are graphs showing various aberrations upon focusing on a close distance object, respectively, in the wide angle end state, in the intermediate focal length state and in the telephoto end state, of the variable magnification optical system according to the Eighth Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

NINTH EXAMPLE

Figure 25:
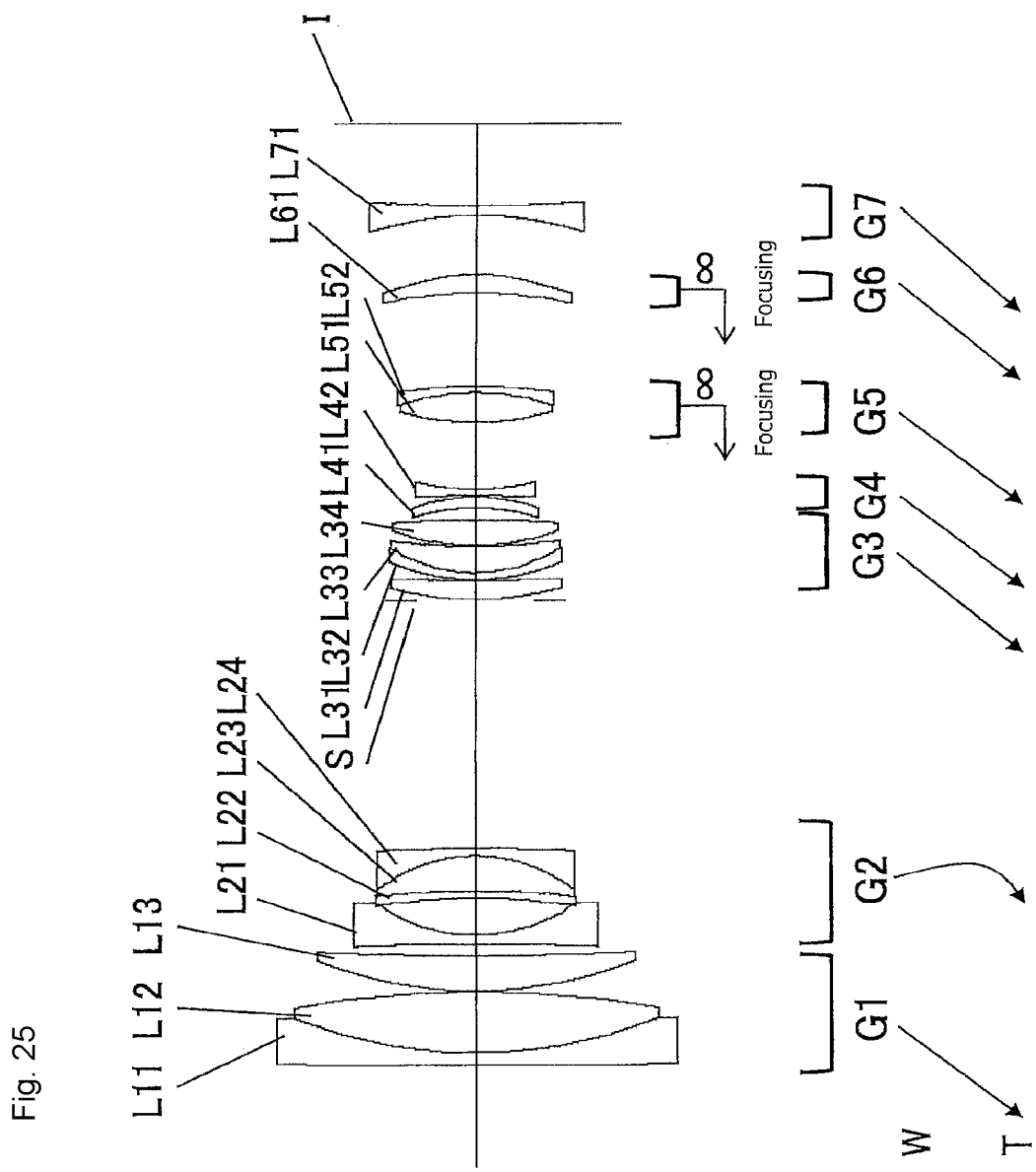
FIG. 25 is a sectional view of a variable magnification optical system according to a Ninth Example.

FIG. 25 is a view showing a lens configuration of a variable magnification optical system according to a Ninth Example.

The variable magnification optical system according to the present Example is composed of, in order from an object side, a first lens group G1 having positive refractive power, a second lens group G2 having negative refractive power, an aperture stop S, a third lens group G3 having positive refractive power, a fourth lens group G4 having negative refractive power, a fifth lens group G5 having positive refractive power, a sixth lens group G6 having positive refractive power, and a seventh lens group G7 having negative refractive power.

The first lens group G1 consists of, in order from the object side, a cemented negative lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a double concave negative lens L21, and a cemented negative lens constructed by a negative meniscus lens L22 having a concave surface facing the object side cemented with a positive meniscus lens L23 having a concave surface facing the object side cemented with a negative meniscus lens L24 having a concave surface facing the object side.

The third lens group G3 consists of, in order from the object side, a positive meniscus lens L31 having a convex surface facing the object side, a cemented positive lens constructed by a negative meniscus lens L32 having a convex surface facing the object side cemented with a positive meniscus lens L33 having a convex surface facing the object side, and a double convex positive lens L34.

The fourth lens group G4 consists of, in order from the object side, a positive meniscus lens L41 having a concave surface facing the object side and a double concave negative lens L42.

The fifth lens group G5 consists of a cemented positive lens constructed by a double convex positive lens L51 cemented with a negative meniscus lens L52 having a concave surface facing the object side.

The sixth lens group G6 consists of a positive meniscus lens L61 having a concave surface facing the object side.

The seventh lens group G7 consists of a double concave negative lens L71.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the variable magnification optical system according to the present Example, focusing from an infinite distance object to a close distance object is carried out by moving, as focusing lens groups, the fifth lens group G5 along the optical axis toward the object side, and the sixth lens group G6 along the optical axis toward the object side with a different trajectory from that of the fifth lens group G5.

Table 9 below shows various values of the variable magnification optical system relating to the present Example.

TABLE 9

Ninth Example

[Surface Data]

| m | r | d | nd | νd |
|---|---|---|---|---|
| OP | ∞ | | | |
| 1 | 3442.9453 | 2.000 | 2.00100 | 29.12 |
| 2 | 67.9723 | 9.758 | 1.59319 | 67.90 |
| 3 | −152.3923 | 0.200 | | |
| 4 | 58.4962 | 5.618 | 1.81600 | 46.59 |
| 5 | 401.1678 | Variable | | |
| *6 | −290.9507 | 1.400 | 1.88300 | 40.66 |
| 7 | 23.9500 | 5.968 | | |
| 8 | −85.0139 | 1.200 | 1.83481 | 42.73 |
| 9 | −120.7468 | 5.617 | 1.84666 | 23.80 |
| 10 | −22.1853 | 1.200 | 1.81600 | 46.59 |
| 11 | −285.7763 | Variable | | |
| 12(S) | ∞ | 0.200 | | |
| 13 | 43.7782 | 3.108 | 1.69680 | 55.52 |
| 14 | 471.1855 | 0.200 | | |
| 15 | 32.7556 | 1.000 | 1.83481 | 42.73 |
| 16 | 21.7787 | 4.328 | 1.59319 | 67.90 |
| 17 | 90.7958 | 0.200 | | |
| 18 | 34.8267 | 4.022 | 1.58144 | 40.98 |
| 19 | −155.1147 | Variable | | |
| *20 | −30.2170 | 1.817 | 1.90200 | 25.26 |
| 21 | −25.8045 | 0.200 | | |
| 22 | −168.2619 | 1.000 | 1.90366 | 31.27 |
| 23 | 32.2596 | Variable | | |
| 24 | 38.3747 | 4.859 | 1.49700 | 81.73 |
| 25 | −32.4370 | 1.000 | 2.00069 | 25.46 |
| 26 | −70.7616 | Variable | | |
| 27 | −63.4136 | 3.063 | 1.56732 | 42.58 |
| *28 | −25.4716 | Variable | | |
| *29 | −40.3736 | 1.500 | 1.81600 | 46.59 |
| 30 | 223.1585 | BF | | |
| I | ∞ | | | |

[Aspherical Surface Data]

m: 6

K = 1.0000
A4 = 1.12990E−06
A6 = −1.48448E−09
A8 = 2.59485E−12
A10 = −2.03608E−15 m: 20

K = 1.0000
A4 = −1.25538E−05
A6 = 2.12431E−08
A8 = −1.35330E−10
A10 = 4.53472E−13 m: 28

K = 1.0000
A4 = 2.57266E−05

TABLE 9-continued

Ninth Example

A6 = 5.03605E−08
A8 = −2.10329E−10
A10 = 3.98690E−13
m: 29 x = 1.0000
A4 = 1.23110E−05
A6 = 2.00664E−08
A8 = −1.99371E−10
A10 = 2.96093E−13

[Various Data]
Variable magnification ratio 8.97

|       | W      | M      | T      |
|-------|--------|--------|--------|
| f     | 24.8   | 70.0   | 222.0  |
| FNO   | 3.69   | 5.39   | 6.42   |
| 2ω    | 85.32  | 33.28  | 10.80  |
| Ymax  | 20.30  | 21.60  | 21.60  |
| TL    | 152.38 | 168.67 | 204.50 |
| BF    | 13.25  | 40.90  | 75.50  |

|       | W      | M      | T       | W       | M       | T       |
|-------|--------|--------|---------|---------|---------|---------|
| f, β  | 24.750 | 70.000 | 222.000 | −0.033  | −0.033  | −0.033  |
| d0    | 0.000  | 0.000  | 0.000   | 708.545 | 2047.97 | 6602.17 |
| d5    | 2.000  | 19.489 | 42.969  | 2.000   | 19.489  | 42.969  |
| d11   | 40.184 | 17.902 | 2.000   | 40.184  | 17.902  | 2.000   |
| d19   | 2.003  | 3.971  | 9.577   | 2.003   | 3.971   | 9.577   |
| d23   | 10.844 | 6.751  | 7.946   | 10.369  | 6.000   | 6.221   |
| d26   | 15.034 | 12.261 | 4.050   | 14.947  | 12.499  | 5.206   |
| d28   | 9.603  | 7.938  | 3.000   | 10.165  | 8.452   | 3.568   |

[Lens Group Data]

| Group | ST | f       |
|-------|----|---------|
| 1     | 1  | 93.169  |
| 2     | 6  | −21.680 |
| 3     | 12 | 24.825  |
| 4     | 20 | −35.481 |
| 5     | 24 | 85.936  |
| 6     | 27 | 72.909  |
| 7     | 29 | −41.791 |

[Values for Conditional Expressions]

| (1)  | $(-f1N)/|f1| = 0.744$           |
| (2)  | $BFw/fw = 0.536$                |
| (3)  | $(-fRN)/ft = 0.188$             |
| (4)  | $MTF1/MTF2 = 3.034$             |
| (5)  | $(-fFN)/|fF| = 0.832$           |
| (6)  | $nP/nN = 0.786$                 |
| (7)  | $|fF1|/|f1| = 0.922$            |
| (8)  | $|fF2|/|f1| = 0.783$            |
| (9)  | $|fF1|/ft = 0.387$              |
| (10) | $|fF2|/ft = 0.328$              |
| (11) | $|βWF1|/|βWF2| = 0.607$         |
| (12) | $|βRw|/|βRt| = 0.815$           |
| (13) | $ωw = 42.66°$                   |

FIG. 26A, FIG. 26B and FIG. 26C are graphs showing various aberrations upon focusing on an infinite distance object, respectively, in the wide angle end state, in the intermediate focal length state and in the telephoto end state, of the variable magnification optical system according to the Ninth Example.

FIG. 27A, FIG. 27B and FIG. 27C are graphs showing various aberrations upon focusing on a close distance object, respectively, in the wide angle end state, in the intermediate focal length state and in the telephoto end state, of the variable magnification optical system according to the Ninth Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

TENTH EXAMPLE

Figure 28:
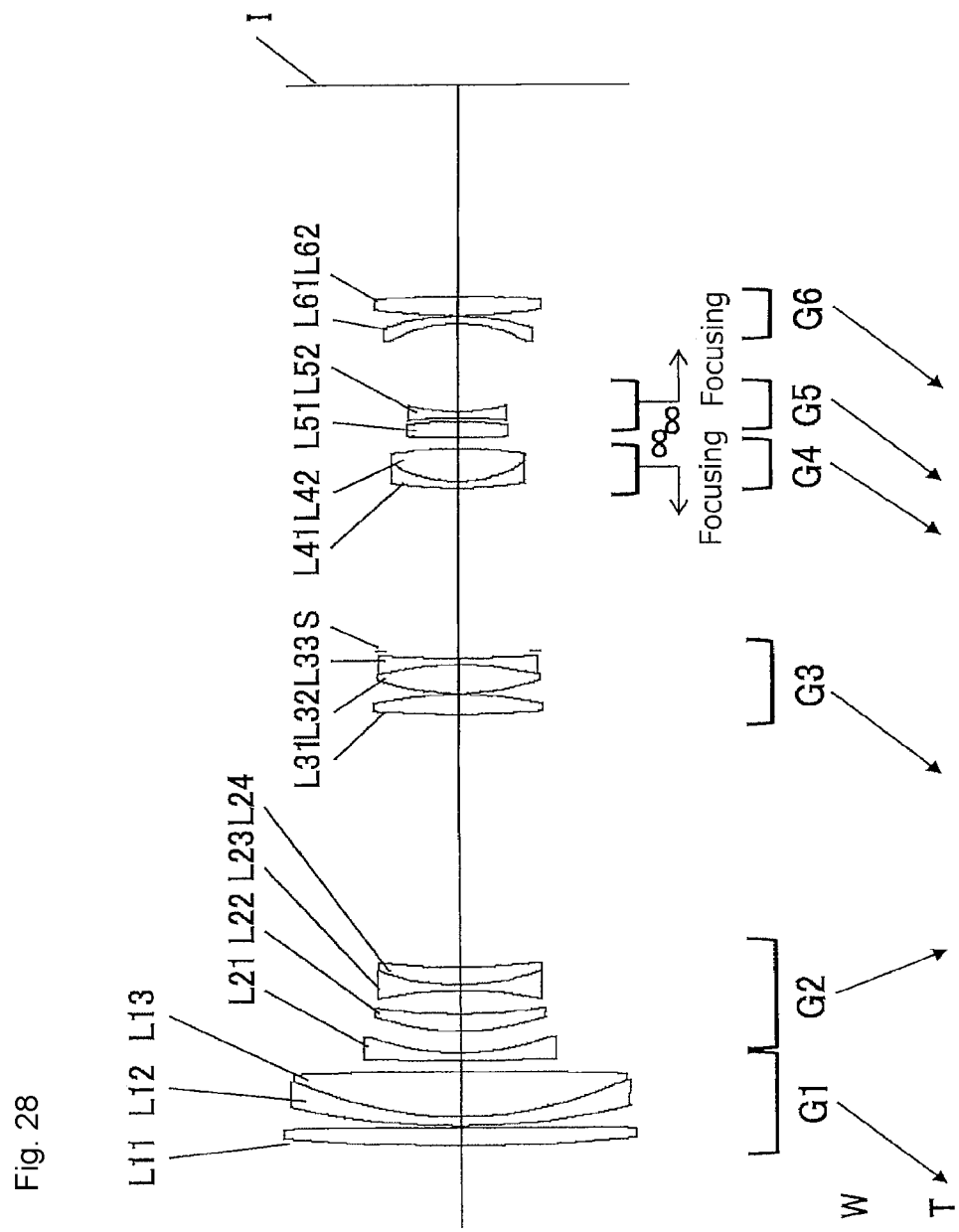
FIG. 28 is a sectional view of a variable magnification optical system according to a Tenth Example.

FIG. 28 is a view showing a lens configuration of a variable magnification optical system according to a Tenth Example.

The variable magnification optical system according to the present Example is composed of, in order from an object side, a first lens group G1 having positive refractive power, a second lens group G2 having negative refractive power, a third lens group G3 having positive refractive power, an aperture stop S, a fourth lens group G4 having positive refractive power, a fifth lens group G5 having negative refractive power, and a sixth lens group G6 having positive refractive power.

The first lens group G1 consists of, in order from the object side, a double convex positive lens L11, and a cemented positive lens constructed by a negative meniscus lens L12 having a convex surface facing the object side cemented with a double convex positive lens L13.

The second lens group G2 consists of, in order from the object side, a negative meniscus lens L21 having a convex surface facing the object side, a positive meniscus lens L22 having a convex surface facing the object side, and a cemented negative lens constructed by a double concave negative lens L23 cemented with a positive meniscus lens L24 having a convex surface facing the object side.

The third lens group G3 consists of, in order from the object side, a double convex positive lens L31, and a cemented positive lens constructed by a double convex positive lens L32 cemented with a double concave negative lens L33.

The fourth lens group G4 consists of a cemented positive lens constructed by a negative meniscus lens L41 having a convex surface facing the object side cemented with a double convex positive lens L42.

The fifth lens group G5 consists of, in order from the object side, a double convex positive lens L51 and a double concave negative lens L52.

The sixth lens group G6 consists of, in order from the object side, a negative meniscus lens L61 having a concave surface facing the object side and a double convex positive lens L62.

In the variable magnification optical system according to the present Example, upon varying magnification between the wide angle end state and the telephoto end state, all lens groups of the first lens group G1 to the sixth lens group G6 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, and a distance between the fifth lens group G5 and the sixth lens group G6, are varied.

In the variable magnification optical system according to the present Example, focusing from an infinite distance object to a close distance object is carried out by moving, as focusing lens groups, the fourth lens group G4 along the optical axis toward the object side and the fifth lens group G5 along the optical axis toward the image side.

Table 10 below shows various values of the variable magnification optical system relating to the present Example.

TABLE 10

Tenth Example

[Surface Data]

| m | r | d | nd | νd |
|---|---|---|---|---|
| OP | ∞ | | | |
| 1 | 339.1302 | 3.342 | 1.48749 | 70.32 |
| 2 | −1748.8042 | 0.200 | | |
| 3 | 113.3340 | 1.700 | 1.62004 | 36.40 |
| 4 | 62.3111 | 8.286 | 1.49700 | 81.73 |
| 5 | −790.8224 | Variable | | |
| 6 | 452.0591 | 1.300 | 1.80400 | 46.60 |
| 7 | 41.1492 | 4.042 | | |
| 8 | 41.3304 | 3.091 | 1.68893 | 31.16 |
| 9 | 98.8092 | 4.158 | | |
| 10 | −68.4923 | 1.000 | 1.70000 | 48.10 |
| 11 | 36.0772 | 3.318 | 1.80518 | 25.45 |
| 12 | 117.8747 | Variable | | |
| 13 | 180.8711 | 3.540 | 1.80400 | 46.60 |
| 14 | −64.2101 | 0.200 | | |
| 15 | 40.7438 | 5.229 | 1.49700 | 81.73 |
| 16 | −52.5435 | 1.200 | 1.85026 | 32.35 |
| 17 | 200.0407 | 1.376 | | |
| 18(S) | ∞ | Variable | | |
| 19 | 68.3281 | 1.200 | 1.71736 | 29.57 |
| 20 | 20.1023 | 6.000 | 1.56732 | 42.58 |
| 21 | −61.5874 | Variable | | |
| 22 | 188.7697 | 2.905 | 1.72825 | 28.38 |
| 23 | −56.4394 | 0.719 | | |
| 24 | −72.6983 | 1.000 | 1.80400 | 46.60 |
| 25 | 30.9300 | Variable | | |
| 26 | −22.2025 | 1.300 | 1.69680 | 55.52 |
| 27 | −38.2594 | 0.200 | | |
| 28 | 95.0769 | 3.373 | 1.80610 | 40.97 |
| 29 | −205.8129 | BF | | |
| I | ∞ | | | |

TABLE 10-continued

Tenth Example

[Various Data]
Variable magnification ratio 4.05

|  | W | M | T |
|---|---|---|---|
| f | 72.1 | 100.0 | 292.0 |
| FNO | 4.68 | 4.86 | 5.88 |
| 2ω | 33.86 | 24.02 | 8.26 |
| Ymax | 21.60 | 21.60 | 21.60 |
| TL | 193.32 | 209.38 | 244.81 |
| BF | 38.32 | 41.53 | 60.32 |

|  | W | M | T | W | M | T |
|---|---|---|---|---|---|---|
| f, β | 72.100 | 100.000 | 292.000 | −0.033 | −0.033 | −0.033 |
| d0 | 0.000 | 0.000 | 0.000 | 2108.51 | 2898.12 | 8529.76 |
| d5 | 2.000 | 26.301 | 76.285 | 2.000 | 26.301 | 76.285 |
| d12 | 45.791 | 35.345 | 2.000 | 45.791 | 35.345 | 2.000 |
| d18 | 29.471 | 29.387 | 29.007 | 28.880 | 29.181 | 28.801 |
| d21 | 2.000 | 3.362 | 2.000 | 2.786 | 4.328 | 3.858 |
| d25 | 16.057 | 14.780 | 16.521 | 15.862 | 14.019 | 14.868 |

[Lens Group Data]

| Group | ST | f |
|---|---|---|
| 1 | 1 | 171.900 |
| 2 | 6 | −43.196 |
| 3 | 13 | 51.979 |
| 4 | 19 | 82.476 |
| 5 | 22 | −51.000 |
| 6 | 26 | 48383.794 |

[Values for Conditional Expressions]

(1) $(-f1N)/|f1| = 1.315$
(2) $BFw/fw = 0.531$
(3) $(-fRN)/ft = 0.269$
(4) $MTF1/MTF2 = 0.125$
(5) $(-fFN)/|fF| = 0.527$
(6) $nP/nN = 0.913$
(7) $|fF1|/|f1| = 0.480$
(8) $|fF2|/|f1| = 0.297$
(9) $|fF1|/ft = 0.282$
(10) $|fF2|/ft = 0.175$
(11) $|βWF1|/|βWF2| = 0.288$
(12) $|βRw|/|βRt| = 0.911$
(13) $ωw = 16.93°$

FIG. 29A, FIG. 29B and FIG. 29C are graphs showing various aberrations upon focusing on an infinite distance object, respectively, in the wide angle end state, in the intermediate focal length state and in the telephoto end state, of the variable magnification optical system according to the Tenth Example.

FIG. 30A, FIG. 30B and FIG. 30C are graphs showing various aberrations upon focusing on a close distance object, respectively, in the wide angle end state, in the intermediate focal length state and in the telephoto end state, of the variable magnification optical system according to the Tenth Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

ELEVENTH EXAMPLE

FIG. 31 is a view showing a lens configuration of a variable magnification optical system according to an Eleventh Example.

The variable magnification optical system according to the present Example is composed of, in order from an object side, a first lens group G1 having negative refractive power, a second lens group G2 having positive refractive power, a third lens group G3 having positive refractive power, an aperture stop S, a fourth lens group G4 having negative refractive power, a fifth lens group G5 having positive refractive power, a sixth lens group G6 having positive refractive power, and a seventh lens group G7 having negative refractive power.

The first lens group G1 consists of, in order from the object side, a negative meniscus lens L11 having a convex surface facing the object side, and a cemented positive lens constructed by a double concave negative lens L12 cemented with a positive meniscus lens L13 having a convex surface facing the object side.

The second lens group G2 consists of a cemented positive lens constructed by a double convex positive lens L21 cemented with a negative meniscus lens L22 having a concave surface facing the object side.

The third lens group G3 consists of a cemented positive lens constructed by a negative meniscus lens L31 having a convex surface facing the object side cemented with a double convex positive lens L32.

The fourth lens group G4 consists of a cemented negative lens constructed by a double concave negative lens L41 cemented with a positive meniscus lens L42 having a convex surface facing the object side.

The fifth lens group G5 consists of a double convex positive lens L51.

The sixth lens group G6 consists of a double convex positive lens L61.

The seventh lens group G7 consists of a negative meniscus lens L71 having a concave surface facing the object side.

In the variable magnification optical system according to the present Example, upon varying magnification between the wide angle end state and the telephoto end state, all lens groups of the first lens group G1 to the seventh lens group G7 are moved along the optical axis such that a distance between the first lens group G1 and the second lens group G2, a distance between the second lens group G2 and the third lens group G3, a distance between the third lens group G3 and the fourth lens group G4, a distance between the fourth lens group G4 and the fifth lens group G5, a distance between the fifth lens group G5 and the sixth lens group G6 and a distance between the sixth lens group G6 and the seventh lens group G7, are varied.

In the variable magnification optical system according to the present Example, focusing from an infinite distance object to a close distance object is carried out by moving, as focusing lens groups, the fifth lens group G5 along the optical axis toward the object side, and the sixth lens group G6 along the optical axis toward the object side with a different trajectory from that of the fifth lens group G5.

Table 11 below shows various values of the variable magnification optical system relating to the present Example.

TABLE 11

Eleventh Example

[Surface Data]

| m | r | d | nd | vd |
|---|---|---|---|---|
| OP | ∞ | | | |
| 1 | 260.0000 | 2.900 | 1.74389 | 49.53 |
| *2 | 30.1702 | 13.784 | | |
| 3 | −1991.6463 | 2.100 | 1.59349 | 67.00 |
| 4 | 33.7055 | 8.364 | 2.00100 | 29.13 |
| 5 | 89.6077 | Variable | | |
| 6 | 108.4958 | 8.489 | 1.80100 | 34.92 |
| 7 | −30.7757 | 1.500 | 1.80518 | 25.45 |
| 8 | −204.3062 | Variable | | |
| 9 | 45.1018 | 1.500 | 1.85000 | 27.03 |
| 10 | 24.0000 | 9.603 | 1.59319 | 67.90 |
| 11 | −88.4112 | Variable | | |
| 12(S) | ∞ | 1.733 | | |
| 13 | −63.2999 | 1.300 | 1.65100 | 56.24 |
| 14 | 36.0420 | 2.727 | 1.90265 | 35.72 |
| 15 | 90.4648 | Variable | | |
| 16 | 139.2934 | 5.000 | 1.48749 | 70.32 |
| 17 | −72.7540 | Variable | | |
| 18 | 554.8019 | 4.200 | 1.58913 | 61.15 |
| *19 | −54.8898 | Variable | | |
| *20 | −29.0077 | 1.500 | 1.84666 | 23.80 |
| 21 | −45.1973 | BF | | |
| I | ∞ | | | |

[Aspherical Data]

m: 2

K = 0.0000
A4 = 3.70839E−06
A6 = 7.95920E−10
A8 = 7.22303E−12
A10 = −1.14971E−14
A12 = 9.51080E−18
m: 19

K = 1.0000
A4 = 5.13891E−06
A6 = −3.95654E−09
A8 = 1.36188E−11
A10 = −1.64821E−14
m: 20

K = 1.0000
A4 = 4.54393E−06
A6 = −1.30549E−09

TABLE 11-continued

Eleventh Example

A8 = 6.99274E−13
A10 = 4.71450E−15

[Various Data]
Variable magnification ratio 2.99

|  | W | M | T |
|---|---|---|---|
| f | 22.7 | 50.0 | 67.9 |
| FNO | 4.21 | 5.58 | 5.88 |
| 2ω | 92.68 | 46.22 | 33.64 |
| Ymax | 19.70 | 21.60 | 21.60 |
| TL | 188.49 | 156.49 | 166.42 |
| BF | 14.19 | 21.35 | 26.73 |

|  | W | M | T | W | M | T |
|---|---|---|---|---|---|---|
| f, β | 22.700 | 50.000 | 67.900 | −0.033 | −0.033 | −0.033 |
| d0 | 0.000 | 0.000 | 0.000 | 642.626 | 1479.20 | 2020.08 |
| d5 | 62.024 | 9.333 | 2.263 | 62.024 | 9.333 | 2.263 |
| d8 | 1.536 | 1.576 | 1.000 | 1.536 | 1.576 | 1.000 |
| d11 | 2.200 | 6.706 | 19.808 | 2.200 | 6.706 | 19.808 |
| d15 | 25.740 | 8.889 | 12.359 | 25.733 | 7.830 | 10.488 |
| d17 | 3.523 | 29.546 | 31.736 | 2.523 | 29.489 | 32.585 |
| d19 | 14.577 | 14.391 | 7.819 | 15.584 | 15.506 | 8.840 |

[Lens Group Data]

| Group | ST | f |
|---|---|---|
| 1 | 1 | −47.325 |
| 2 | 6 | 90.647 |
| 3 | 9 | 68.586 |
| 4 | 12 | −74.902 |
| 5 | 16 | 98.800 |
| 6 | 18 | 85.000 |
| 7 | 20 | −99.892 |

[Values for Conditional Expressions]

| (1) | $(-f1N)/|f1| = 0.975$ |
|---|---|
| (2) | $BFw/fw = 0.625$ |
| (3) | $(-fRN)/ft = 1.471$ |
| (4) | $MTF1/MTF2 = 1.831$ |
| (7) | $|fF1|/|f1| = 2.088$ |
| (8) | $|fF2|/|f1| = 1.796$ |
| (9) | $|fF1|/ft = 1.455$ |
| (10) | $|fF2|/ft = 1.252$ |
| (11) | $|\beta WF1|/|\beta WF2| = 0.764$ |
| (12) | $|\beta Rw|/|\beta Rt| = 2.455$ |
| (13) | $\omega w = 46.34°$ |

FIG. 32A, FIG. 32B and FIG. 32C are graphs showing various aberrations upon focusing on an infinite distance object, respectively, in the wide angle end state, in the intermediate focal length state and in the telephoto end state, of the variable magnification optical system according to the Eleventh Example.

FIG. 33A, FIG. 33B and FIG. 33C are graphs showing various aberrations upon focusing on a close distance object, respectively, in the wide angle end state, in the intermediate focal length state and in the telephoto end state, of the variable magnification optical system according to the Eleventh Example.

As is apparent from the above-mentioned graphs showing aberrations, the variable magnification optical system relating to the present Example can correct superbly various aberrations over the wide angle end state to the telephoto end state and has excellent imaging performance, and further has excellent imaging performance even upon focusing on a close distance object.

According to each of the above described Examples, it is possible to realize a variable magnification optical system which can suppress superbly variations in aberrations upon varying magnification from a wide angle end state to a telephoto end state and variations in aberrations upon carrying out focusing from an infinite distance object to a close distance object. Further, according to each of the above described Examples, since the focusing lens group(s) is(are) made light in weight and small in size, driving mechanism for the focusing lens group(s) is also downsized, so it is possible to realize high speed as well as noiseless focusing operation without making lens barrel large.

Meanwhile, it is noted that each of the above described Examples is a concrete example of the invention of the present application, and the invention of the present application is not limited to them. The contents described below can be adopted appropriately without deteriorating optical performance of the variable magnification optical systems according to the present embodiment.

Although variable magnification optical systems having a six group configuration and a seven group configuration, were illustrated above as numerical examples of the variable magnification optical systems according to the present embodiment, the present embodiment is not limited to them and variable magnification optical systems having other configurations, such as eight group configuration or the like, can be configured. Concretely, a configuration that a lens or a lens group is added to the most object side or the most image side of the variable magnification optical system according to each of the above described Examples is possible. Alternatively, a lens or a lens group may be added between the neighboring lens groups.

Further, in each of the above described Examples, two or three lens groups are adopted as focusing lens groups, but a part in lens group, or four or more lens groups may be adopted for focusing lens group(s). Each of the focusing lens groups may be composed of one or two lens components, and a configuration composed of one lens component is more preferable. Auto focusing can be applied for such focusing group(s), and drive by motor for auto focusing, such as, ultrasonic motor, stepping motor, and VCM motor may be suitably adopted.

Further, in the variable magnification optical systems according to each of the above described Examples, any lens group in the entirety thereof or a portion thereof can be moved in a direction including a component perpendicular to the optical axis as a vibration reduction lens group, or rotationally moved (swayed) in an in-plane direction including the optical axis, whereby a configuration of a vibration reduction can be taken.

Further, in the variable magnification optical systems according to each of the above described Examples, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if an image plane is shifted, deterioration in depiction performance is little, so that it is preferable. When a lens surface is an aspherical surface, the aspherical surface may be fabricated by a grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Further, in the variable magnification optical system according to each of the above described Examples, it is preferable that the aperture stop S is disposed between the second lens group G2 and the third lens group G3, or between the third lens group G3 and the fourth lens group G4. But, the function may be substituted by a lens frame without disposing a member as an aperture stop.

Moreover, the lens surface(s) of the lenses configuring the variable magnification optical system according to each of the above described Examples, may be coated with anti-reflection coating(s) having a high transmittance in a wide wavelength region. With this contrivance, it is feasible to reduce a flare as well as ghost and attain excellent optical performance with high contrast.

Figure 34:
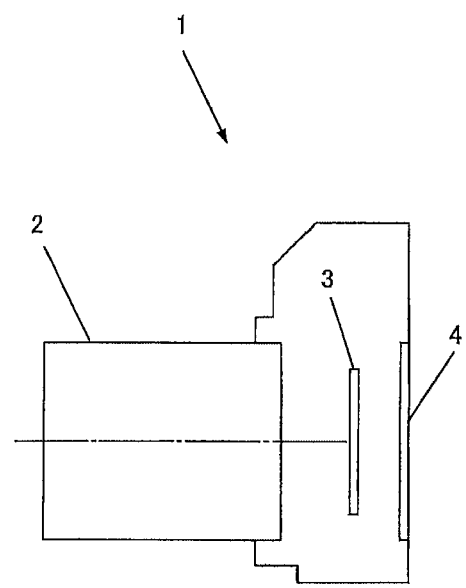
FIG. 34 is a view showing a configuration of a camera equipped with the variable magnification optical system.

Next, a camera equipped with the variable magnification optical system according to the present embodiment, will be explained with referring to FIG. 34. FIG. 34 is a view showing a configuration of the camera equipped with the variable magnification optical system according to the present embodiment. The camera 1, as shown in FIG. 34, is a so-called mirror-less camera of a lens interchangeable type equipped with the variable magnification optical system according to the first Example as an imaging lens 2.

In the present camera 1, a light emitted from an unillustrated object (an object to be photo-taken) is converged by the imaging lens 2, through an unillustrated OLPF (Optical low pass filter), and forms an image of the object on an imaging plane of an imaging portion 3. The light from the object is photo-electrically converted through a photo-electric conversion element provided on the imaging portion 3 to forma picture image of the object. This picture image is displayed on an EVF (electric view finder) 4 provided on the camera 1. Accordingly, a photographer can observe the object to be photo-taken through the EVF.

Further, upon unillustrated release button being depressed by the photographer, the picture image of the object formed by the imaging portion 3 is stored in an unillustrated memory. Thus, the photographer can take a photo of the object by the camera 1.

It is noted here that the variable magnification optical system relating to the First Example mounted on the camera 1 as the imaging lens 2, has superb optical performance as described above and the focusing lens group(s) is (are) made light in weight and small in size. In other words, the present camera 1 can realize high optical performance that variations in aberrations upon varying magnification from the wide angle end state to the telephoto end state as well as variations in aberrations upon carrying out focusing from an infinite distance object to a close distance object, can be suppressed, and realize high speed focusing, by making the focusing lens group(s) small in size and light.

Incidentally, even in a case where a camera in which the variable magnification optical system according to any of the before-mentioned Second to Eleventh Examples is installed as the imaging lens 2, is configured, the camera also can attain the same effects as those of the above-mentioned camera 1. Further, even when the variable magnification optical system according to any of the Examples is installed in a camera of a single lens reflex type equipped with a quick return mirror in which the object image is observed through a finder optical system, the camera also can have the same effects as those of the above-mentioned camera 1.

Figure 35:
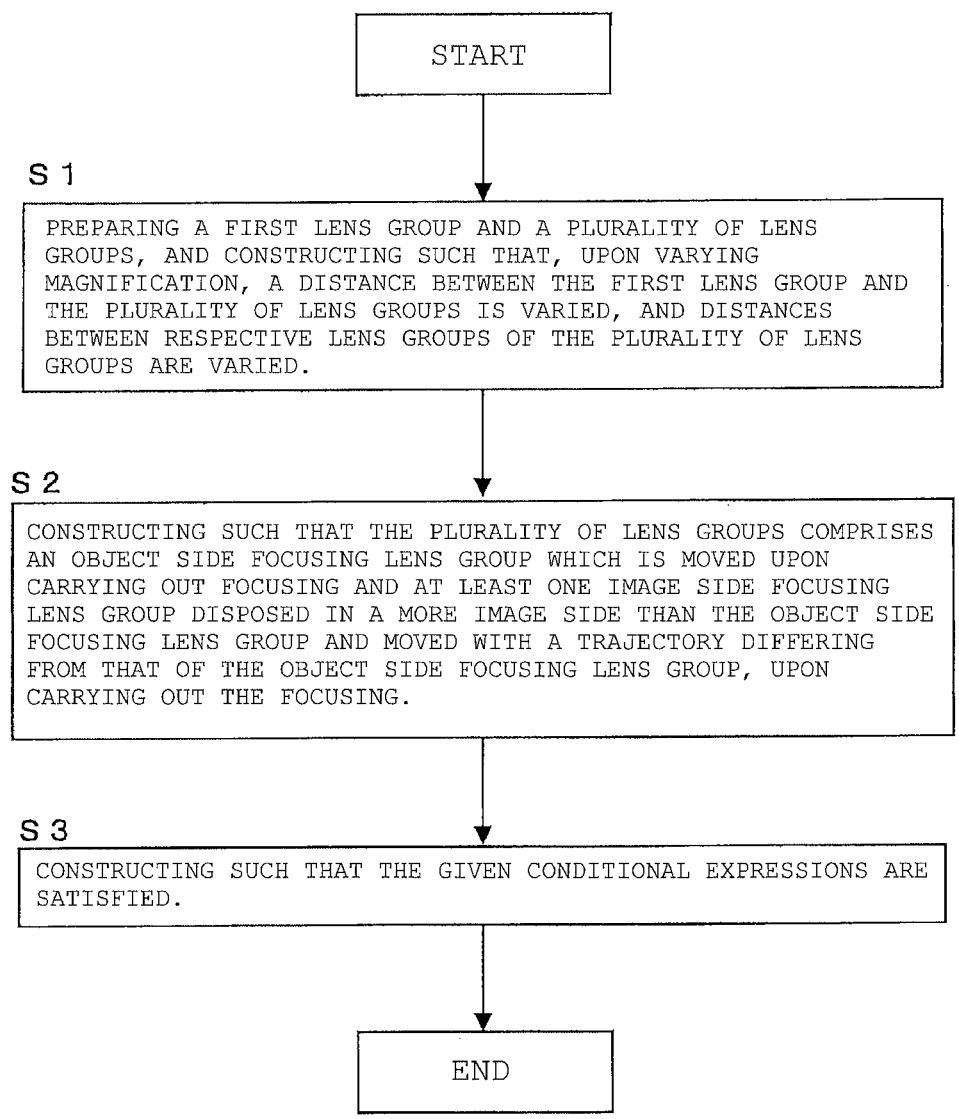
FIG. 35 is a flowchart schematically showing a method for manufacturing the variable magnification optical system.

Next, an outline of a method for manufacturing the variable magnification optical system according to the present embodiment, is described with referring to FIG. 35.

FIG. 35 is a flowchart schematically showing a method for manufacturing the variable magnification optical system according to the present embodiment.

The method for manufacturing the variable magnification optical system according to the present embodiment shown in FIG. 35, is a method for manufacturing a variable magnification optical system which comprises, in order from an object side, a first lens group and a plurality of lens groups; the method comprising the following steps S1 to S3.

Step S1: preparing a first lens group and a plurality of lens groups, and constructing such that, upon varying magnification, a distance between the first lens group and the plurality of lens groups is varied, and distances between respective lens groups of the plurality of lens groups are varied;

Step S2: constructing such that the plurality of lens groups comprises an object side focusing lens group which is moved upon carrying out focusing and at least one image side focusing lens group disposed in a more image side than the object side focusing lens group and moved with a trajectory differing from that of the object side focusing lens group, upon carrying out the focusing; and Step S3: constructing such that said variable magnification optical system satisfies the following conditional expressions (1) and (2):

$$0.60 < (-f1N)/|f1| < 1.80 \quad (1)$$

$$0.2 < BFw/fw < 2.0 \quad (2)$$

where f1N denotes a focal length of a lens which has a strongest negative refractive power in lenses in said first lens group, f1 denotes a focal length of said first lens groups, BFw denotes a back focus of said variable magnification optical system in the wide angle end state, and fw denotes a focal length of said variable magnification optical system in the wide angle end state.

According to the above-stated method for manufacturing the variable magnification optical system according to the present embodiment, it is possible to manufacture a variable magnification optical system which can realize high optical performance that variations in aberrations upon varying magnification from the wide angle end state to the telephoto end state as well as variations in aberrations upon carrying out focusing from an infinite distance object to a close distance object, can be suppressed superbly, and of which focusing lens group(s) is and reduced in weight by which high speed focusing operation can be realized.

EXPLANATION OF REFERENCE SYMBOLS

G1 first lens group
G2 second lens group
G3 third lens group
G4 fourth lens group
G5 fifth lens group
G6 sixth lens group
G7 seventh lens group
S aperture stop
I image plane
1 camera
2 imaging lens

What is claimed is:

1. A variable magnification optical system comprising, in order from an object side, a first lens group and a plurality of lens groups comprising, in order from the object side, a second lens group, a third lens group, a fourth lens group, a fifth lens group, a sixth lens group, and a seventh lens group;
    upon varying a magnification, a distance between said first lens group and said plurality of lens groups being varied, distances between respective lens groups in said plurality of lens groups being varied, and a lens group disposed in the most image side in said plurality of lens groups being moved along the optical axis;
    said plurality of lens groups comprising a first focusing lens group which is moved upon carrying out focusing and a second focusing lens group disposed in a more image side than the first focusing lens group and composed of one or more focusing lens segment groups each moved with a trajectory differing from that of the first focusing lens group, upon carrying out the focusing;
    said first focusing lens group being composed of a single lens component;
    said first focusing lens group being said fourth lens group;
    said one or more focusing lens segment groups each consisting of one or two lens components;
    said lens group disposed in the most image side in said plurality of lens groups having negative refractive power; and
    the following conditional expression being satisfied:

$$0.60 < (-f1N)/|f1| < 1.50$$

where f1N denotes a focal length of a lens which has a strongest negative refractive power in lenses in said first lens group, and f1 denotes a focal length of said first lens group.

2. A variable magnification optical system according to claim 1, wherein
    said first lens group is fixed upon carrying out focusing.

3. A variable magnification optical system according to claim 1, wherein
    at least one of the focusing lens segment groups composing said first focusing lens group and said second focusing lens group comprises at least one lens having negative refractive power; and
    the following conditional expression is satisfied:

$$0.45 < (-fFN)/|fF| < 1.50$$

where fFN denotes a focal length of the lens having the strongest negative refractive power in lenses in said first focusing lens group and said second focusing lens group, and fF denotes a focal length of the focusing lens segment group having the strongest refractive power in said first focusing lens group and said second focusing lens group.

4. A variable magnification optical system according to claim 1, wherein
    the following conditional expression is satisfied:

$$0.40 < -|fF1|/|f1| < 2.60$$

where fF1 denotes a focal length of said first focusing lens group, and f1 denotes a focal length of said first lens group.

5. A variable magnification optical system according to claim 1, comprising an aperture stop, and
    said first focusing lens group being disposed in more image side than said aperture stop.

6. A variable magnification optical system according to claim 1, wherein
    the following conditional expression is satisfied:

$$0.10 < -|fF1|/ft < 3.00$$

where fF1 denotes a focal length of said first focusing lens group, and ft denotes a focal length of said variable magnification optical system in the telephoto end state.

7. A variable magnification optical system according to claim 1, wherein
    the following conditional expression is satisfied:

$$|\beta WF1|/|\beta WF2| < 4.00$$

where ⊕WF1 denotes a transverse magnification of said first focusing lens group in the wide angle end state upon focusing on an infinite distance object, and βWF2 denotes a transverse magnification of the focusing lens segment group disposed in the most object side in said second focusing lens group in the wide angle end state upon focusing on the infinite distance object.

8. An optical apparatus comprising a variable magnification optical system according to claim 1.

* * * * *